US009175478B2

(12) United States Patent
Stearns et al.

(10) Patent No.: US 9,175,478 B2
(45) Date of Patent: Nov. 3, 2015

(54) SNOW FENCE FOR A SOLAR PANEL

(71) Applicant: Vermont Slate & Copper Services, Inc., Morrisville, VT (US)

(72) Inventors: Brian Cecil Stearns, Stowe, VT (US); Alexander Grant Bornemann, Wolcott, VT (US)

(73) Assignee: Vermont Slate & Copper Services, Inc., Morrisville, VT (US)

( * ) Notice: Subject to any disclaimer, the term of this patent is extended or adjusted under 35 U.S.C. 154(b) by 52 days.

(21) Appl. No.: 13/904,179

(22) Filed: May 29, 2013

(65) Prior Publication Data

US 2013/0333305 A1 Dec. 19, 2013

Related U.S. Application Data

(60) Provisional application No. 61/652,735, filed on May 29, 2012, provisional application No. 61/707,498, filed on Sep. 28, 2012.

(51) Int. Cl.

| | |
|---|---|
| ***E04D 13/18*** | (2014.01) |
| ***E04D 13/10*** | (2006.01) |
| ***H02S 20/23*** | (2014.01) |

(Continued)

(52) U.S. Cl.

CPC ............... *E04D 13/10* (2013.01); *F24J 2/4607* (2013.01); *F24J 2/5262* (2013.01); *H02S 20/23* (2014.12); *F24J 2/5211* (2013.01); *F24J 2002/4663* (2013.01); *Y02B 10/12* (2013.01); *Y02B 10/20* (2013.01)

(58) Field of Classification Search

CPC ........ Y02B 10/12; Y02B 10/14; Y02B 10/20; E04D 13/10; F24J 2/4607; F24J 2/5211; F24J 2/5262; F24J 2002/4663; H02S 20/23

USPC .......... 52/173.3; 126/621, 622, 623; 136/251, 136/259; 248/237

See application file for complete search history.

(56) References Cited

U.S. PATENT DOCUMENTS

| | | | |
|---|---|---|---|
| 6,453,623 | B1 | 9/2002 | Nelson et al. |
| 7,174,677 | B1 | 2/2007 | Dressler |

(Continued)

FOREIGN PATENT DOCUMENTS

| | | |
|---|---|---|
| WO | 2012125327 | 9/2012 |
| WO | 2013009375 | 1/2013 |

(Continued)

*Primary Examiner* — Jeanette E Chapman

*Assistant Examiner* — James Buckle, Jr.

(74) *Attorney, Agent, or Firm* — Michael Best & Friedrich LLP

(57) ABSTRACT

A roof mount apparatus for mounting on a roof surface includes a first solar panel having a first frame secured to the roof surface, a second solar panel having a second frame secured to the roof surface, the second solar panel spaced from the first solar panel and defining a slot between the first and second frames, and a snow fence secured to the first and second frames. The snow fence includes a bracket positioned adjacent to a top of the first and second frames, the bracket protruding from the first and second frames to inhibit sliding of snow along at least one of the first and second solar panels, and a coupling device including an elongated portion positioned in the slot and extending substantially perpendicular to the roof surface and a wide portion positioned within a channel to couple the bracket to the first and second frames.

18 Claims, 73 Drawing Sheets

14
24
30
14
16
26
34
26
28

(51) Int. Cl.

| | |
|---|---|
| ***F24J 2/46*** | (2006.01) |
| *F24J 2/52* | (2006.01) |

(56) References Cited

U.S. PATENT DOCUMENTS

| | | | | |
|---|---|---|---|---|
| 7,592,537 | B1 | 9/2009 | West | |
| 7,600,349 | B2 | 10/2009 | Liebendorfer | |
| 8,109,048 | B2 | 2/2012 | West et al. | |
| 8,122,648 | B1 | 2/2012 | Liu | |
| 8,146,299 | B2 | 4/2012 | Stearns et al. | |
| 8,151,522 | B2 | 4/2012 | Stearns et al. | |
| 8,153,700 | B2 | 4/2012 | Stearns et al. | |
| 8,166,713 | B2 | 5/2012 | Stearns et al. | |
| 8,181,398 | B2 | 5/2012 | Stearns et al. | |
| 8,209,914 | B2 | 7/2012 | Stearns et al. | |
| 8,225,557 | B2 | 7/2012 | Stearns et al. | |
| 8,245,454 | B2 | 8/2012 | Stearns et al. | |
| 8,272,174 | B2 | 9/2012 | Stearns et al. | |
| 8,375,654 | B1 | 2/2013 | West et al. | |
| 8,413,388 | B2 | 4/2013 | Stearns et al. | |
| 8,505,864 | B1 * | 8/2013 | Taylor et al. | 248/237 |
| 8,756,881 | B2 | 6/2014 | West et al. | |
| 8,833,714 | B2 * | 9/2014 | Haddock et al. | 248/237 |
| 8,875,455 | B1 | 11/2014 | Yang et al. | |
| 8,946,540 | B1 | 2/2015 | West et al. | |
| 8,984,819 | B1 | 3/2015 | Yang et al. | |
| 8,991,114 | B2 | 3/2015 | West | |
| 9,003,729 | B2 | 4/2015 | West et al. | |
| 9,062,897 | B2 | 6/2015 | West et al. | |
| 2002/0046506 | A1 | 4/2002 | Ullman | |
| 2004/0163338 | A1 | 8/2004 | Liebendorfer | |
| 2006/0010786 | A1 | 1/2006 | Rogers | |
| 2006/0260670 | A1 | 11/2006 | Terunuma et al. | |
| 2008/0053008 | A1 | 3/2008 | Ohkoshi et al. | |
| 2010/0236155 | A1 | 9/2010 | Lanza | |
| 2011/0000519 | A1 | 1/2011 | West | |
| 2011/0000520 | A1 | 1/2011 | West | |
| 2011/0000526 | A1 | 1/2011 | West | |
| 2011/0000544 | A1 | 1/2011 | West | |
| 2011/0214365 | A1 * | 9/2011 | Aftanas | 52/173.3 |
| 2012/0023843 | A1 | 2/2012 | Stearns et al. | |
| 2012/0079781 | A1 * | 4/2012 | Koller | 52/173.3 |
| 2012/0125410 | A1 * | 5/2012 | West et al. | 136/251 |
| 2012/0152326 | A1 | 6/2012 | West et al. | |
| 2012/0192926 | A1 * | 8/2012 | Kambara et al. | 136/251 |
| 2012/0233958 | A1 | 9/2012 | Stearns | |
| 2012/0234378 | A1 | 9/2012 | West et al. | |
| 2012/0255598 | A1 | 10/2012 | West | |
| 2012/0260972 | A1 | 10/2012 | West et al. | |
| 2012/0266946 | A1 | 10/2012 | West et al. | |
| 2012/0279558 | A1 | 11/2012 | West et al. | |
| 2012/0298186 | A1 | 11/2012 | West | |
| 2012/0298188 | A1 | 11/2012 | West et al. | |
| 2012/0298817 | A1 | 11/2012 | West et al. | |
| 2012/0301661 | A1 | 11/2012 | West et al. | |
| 2013/0009025 | A1 | 1/2013 | Stearns | |
| 2013/0074441 | A1 | 3/2013 | Stearns | |
| 2013/0091786 | A1 * | 4/2013 | DuPont et al. | 52/173.3 |
| 2013/0140416 | A1 | 6/2013 | West et al. | |
| 2013/0180572 | A1 | 7/2013 | West | |
| 2013/0180573 | A1 | 7/2013 | West | |
| 2013/0180574 | A1 | 7/2013 | West et al. | |
| 2013/0183084 | A1 | 7/2013 | West et al. | |
| 2014/0026946 | A1 | 1/2014 | West et al. | |
| 2014/0053891 | A1 | 2/2014 | West et al. | |
| 2014/0102997 | A1 | 4/2014 | West et al. | |
| 2014/0130847 | A1 | 5/2014 | West et al. | |
| 2014/0158184 | A1 | 6/2014 | West et al. | |
| 2014/0174511 | A1 | 6/2014 | West et al. | |
| 2014/0175244 | A1 | 6/2014 | West et al. | |
| 2014/0182662 | A1 | 7/2014 | West et al. | |
| 2014/0223838 | A1 | 8/2014 | West et al. | |
| 2014/0246549 | A1 | 9/2014 | West et al. | |
| 2014/0251431 | A1 | 9/2014 | West et al. | |
| 2014/0252288 | A1 | 9/2014 | Stearns | |
| 2014/0299179 | A1 | 10/2014 | West et al. | |
| 2014/0326838 | A1 | 11/2014 | West et al. | |
| 2014/0339179 | A1 | 11/2014 | West et al. | |
| 2014/0360558 | A1 | 12/2014 | West et al. | |
| 2015/0013756 | A1 | 1/2015 | West et al. | |
| 2015/0033658 | A1 | 2/2015 | West et al. | |
| 2015/0040965 | A1 | 2/2015 | West et al. | |
| 2015/0040967 | A1 | 2/2015 | West et al. | |
| 2015/0041251 | A1 | 2/2015 | Hudson et al. | |
| 2015/0068590 | A1 | 3/2015 | West et al. | |
| 2015/0069198 | A1 | 3/2015 | West et al. | |
| 2015/0075100 | A1 | 3/2015 | West et al. | |
| 2015/0075589 | A1 | 3/2015 | West et al. | |
| 2015/0075590 | A1 | 3/2015 | West | |
| 2015/0155820 | A1 | 6/2015 | West | |
| 2015/0155821 | A1 | 6/2015 | West | |
| 2015/0155823 | A1 | 6/2015 | West et al. | |
| 2015/0180405 | A1 | 6/2015 | West et al. | |

FOREIGN PATENT DOCUMENTS

| | | |
|---|---|---|
| WO | 2013043816 | 3/2013 |
| WO | 2015020817 | 2/2015 |
| WO | 2015023526 | 2/2015 |
| WO | 2015039007 | 3/2015 |
| WO | 2015042260 | 3/2015 |

* cited by examiner 316
314
326
328
330
314
326

416
414
426
428
428a
428b
428c
430
414
426

| Roof Pitch | | | 1:12 | | 2:12 | | 3:12 | | 4:12 | | 5:12 | | 6:12 | | 7:12 | | 8:12 | |
|---|---|---|---|---|---|---|---|---|---|---|---|---|---|---|---|---|---|---|
| Roof Pitch (Degrees) | | | 4.76 | | 9.46 | | 14.04 | | 18.43 | | 22.62 | | 26.57 | | 30.26 | | 33.69 | |
| Summer/Winter Solstice<br>Latitude (Degrees) | SSA | WSA | S | W | S | W | S | W | S | W | S | W | S | W | S | W | S | W |
| 30 | 83.5 | 36.5 | 0.00 | 0.01 | 0.00 | 0.00 | 0.00 | 0.00 | 0.04 | 0.00 | 0.18 | 0.00 | 0.31 | 0.00 | 0.44 | 0.00 | 0.56 | 0.00 |
| 31 | 82.5 | 35.5 | 0.00 | 0.08 | 0.00 | 0.00 | 0.00 | 0.00 | 0.01 | 0.00 | 0.14 | 0.00 | 0.27 | 0.00 | 0.40 | 0.00 | 0.52 | 0.00 |
| 32 | 81.5 | 34.5 | 0.00 | 0.15 | 0.00 | 0.00 | 0.00 | 0.00 | 0.00 | 0.00 | 0.11 | 0.00 | 0.24 | 0.00 | 0.37 | 0.00 | 0.49 | 0.00 |
| 33 | 80.5 | 33.5 | 0.00 | 0.23 | 0.00 | 0.00 | 0.00 | 0.00 | 0.00 | 0.00 | 0.08 | 0.00 | 0.21 | 0.00 | 0.33 | 0.00 | 0.45 | 0.00 |
| 34 | 79.5 | 32.5 | 0.00 | 0.31 | 0.00 | 0.00 | 0.00 | 0.00 | 0.00 | 0.00 | 0.05 | 0.00 | 0.18 | 0.00 | 0.30 | 0.00 | 0.42 | 0.00 |
| 35 | 78.5 | 31.5 | 0.00 | 0.39 | 0.00 | 0.03 | 0.00 | 0.00 | 0.00 | 0.00 | 0.02 | 0.00 | 0.14 | 0.00 | 0.26 | 0.00 | 0.38 | 0.00 |
| 36 | 77.5 | 30.5 | 0.00 | 0.48 | 0.00 | 0.10 | 0.00 | 0.00 | 0.00 | 0.00 | 0.00 | 0.00 | 0.11 | 0.00 | 0.23 | 0.00 | 0.35 | 0.00 |
| 37 | 76.5 | 29.5 | 0.00 | 0.57 | 0.00 | 0.18 | 0.00 | 0.00 | 0.00 | 0.00 | 0.00 | 0.00 | 0.08 | 0.00 | 0.20 | 0.00 | 0.31 | 0.00 |
| 38 | 75.5 | 28.5 | 0.00 | 0.67 | 0.00 | 0.25 | 0.00 | 0.00 | 0.00 | 0.00 | 0.00 | 0.00 | 0.05 | 0.00 | 0.17 | 0.00 | 0.28 | 0.00 |
| 39 | 74.5 | 27.5 | 0.00 | 0.77 | 0.00 | 0.33 | 0.00 | 0.00 | 0.00 | 0.00 | 0.00 | 0.00 | 0.02 | 0.00 | 0.13 | 0.00 | 0.24 | 0.00 |
| 40 | 73.5 | 26.5 | 0.00 | 0.88 | 0.00 | 0.42 | 0.00 | 0.06 | 0.00 | 0.00 | 0.00 | 0.00 | 0.00 | 0.00 | 0.10 | 0.00 | 0.21 | 0.00 |
| 41 | 72.5 | 25.5 | 0.00 | 0.99 | 0.00 | 0.51 | 0.00 | 0.13 | 0.00 | 0.00 | 0.00 | 0.00 | 0.00 | 0.00 | 0.07 | 0.00 | 0.18 | 0.00 |
| 42 | 71.5 | 24.5 | 0.00 | 1.11 | 0.00 | 0.60 | 0.00 | 0.21 | 0.00 | 0.00 | 0.00 | 0.00 | 0.00 | 0.00 | 0.04 | 0.00 | 0.15 | 0.00 |
| 43 | 70.5 | 23.5 | 0.00 | 1.24 | 0.00 | 0.70 | 0.00 | 0.29 | 0.00 | 0.00 | 0.00 | 0.00 | 0.00 | 0.00 | 0.01 | 0.00 | 0.11 | 0.00 |
| 44 | 69.5 | 22.5 | 0.00 | 1.38 | 0.00 | 0.80 | 0.00 | 0.37 | 0.00 | 0.03 | 0.00 | 0.00 | 0.00 | 0.00 | 0.00 | 0.00 | 0.08 | 0.00 |
| 45 | 68.5 | 21.5 | 0.00 | 1.53 | 0.00 | 0.91 | 0.00 | 0.46 | 0.00 | 0.10 | 0.00 | 0.00 | 0.00 | 0.00 | 0.00 | 0.00 | 0.05 | 0.00 |

| Roof Pitch | | | 9:12 | | 10:12 | | 11:12 | | 12:12 | |
|---|---|---|---|---|---|---|---|---|---|---|
| Roof Pitch (Degrees) | | | 36.87 | | 39.81 | | 42.51 | | 45 | |
| Summer/Winter Solstice | SSA | WSA | S | W | S | W | S | W | S | W |
| Latitude (Degrees) | | | | | | | | | | |
| 30 | 83.5 | 36.5 | 0.69 | 0.00 | 0.81 | 0.00 | 0.93 | 0.00 | 1.04 | 0.00 |
| 31 | 82.5 | 35.5 | 0.65 | 0.00 | 0.76 | 0.00 | 0.88 | 0.00 | 1.00 | 0.00 |
| 32 | 81.5 | 34.5 | 0.61 | 0.00 | 0.72 | 0.00 | 0.84 | 0.00 | 0.95 | 0.00 |
| 33 | 80.5 | 33.5 | 0.57 | 0.00 | 0.68 | 0.00 | 0.79 | 0.00 | 0.90 | 0.00 |
| 34 | 79.5 | 32.5 | 0.53 | 0.00 | 0.64 | 0.00 | 0.75 | 0.00 | 0.86 | 0.00 |
| 35 | 78.5 | 31.5 | 0.49 | 0.00 | 0.60 | 0.00 | 0.71 | 0.00 | 0.82 | 0.00 |
| 36 | 77.5 | 30.5 | 0.46 | 0.00 | 0.57 | 0.00 | 0.67 | 0.00 | 0.77 | 0.00 |
| 37 | 76.5 | 29.5 | 0.42 | 0.00 | 0.53 | 0.00 | 0.63 | 0.00 | 0.73 | 0.00 |
| 38 | 75.5 | 28.5 | 0.39 | 0.00 | 0.49 | 0.00 | 0.59 | 0.00 | 0.69 | 0.00 |
| 39 | 74.5 | 27.5 | 0.35 | 0.00 | 0.46 | 0.00 | 0.55 | 0.00 | 0.65 | 0.00 |
| 40 | 73.5 | 26.5 | 0.32 | 0.00 | 0.42 | 0.00 | 0.52 | 0.00 | 0.61 | 0.00 |
| 41 | 72.5 | 25.5 | 0.28 | 0.00 | 0.38 | 0.00 | 0.48 | 0.00 | 0.57 | 0.00 |
| 42 | 71.5 | 24.5 | 0.25 | 0.00 | 0.35 | 0.00 | 0.44 | 0.00 | 0.54 | 0.00 |
| 43 | 70.5 | 23.5 | 0.22 | 0.00 | 0.32 | 0.00 | 0.41 | 0.00 | 0.50 | 0.00 |
| 44 | 69.5 | 22.5 | 0.18 | 0.00 | 0.28 | 0.00 | 0.37 | 0.00 | 0.46 | 0.00 |
| 45 | 68.5 | 21.5 | 0.15 | 0.00 | 0.25 | 0.00 | 0.34 | 0.00 | 0.43 | 0.00 |

Legend:
SSA Summer Solstice Sun Elevation Angle (Degrees)
WSA Winter Solstice Sun Elevation Angle (Degrees)
S Summer Solstice Shadelength (in) Downslope of SnowGuard
W Winter Solstice Shadelength (in) Upslope of SnowGuard

Fig. 26B

Jan 1st 45°N latitude

*Fig. 36*

| Daylight in 30min Increments | Roof Pitch | 1:12 | | 2:12 | | 3:12 | | 4:12 | | 5:12 | | 6:12 | | 7:12 | | 8:12 | | 9:12 | | 10:12 | | 11:12 | | 12:12 | |
|---|---|---|---|---|---|---|---|---|---|---|---|---|---|---|---|---|---|---|---|---|---|---|---|---|---|
| | Roof Pitch (Degrees) | 4.76 | | 9.46 | | 14.04 | | 18.43 | | 22.62 | | 26.57 | | 30.26 | | 33.69 | | 36.87 | | 39.81 | | 42.51 | | 45.00 | |
| | Up/Down Slope Shadow | Down | Up | Down | Up | Down | Up | Down | Up | Down | Up | Down | Up | Down | Up | Down | Up | Down | Up | Down | Up | Down | Up | Down | Up |
| | Sun Elevation Angle | | | | | | | | | | | | | | | | | | | | | | | | |
| 0:00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 0:30 | 2.30 | 0.00 | 11.23 | 0.00 | 6.73 | 0.00 | 4.82 | 0.00 | 3.76 | 0.00 | 3.09 | 0.00 | 2.62 | 0.00 | 2.28 | 0.00 | 2.02 | 0.00 | 1.81 | 0.00 | 1.65 | 0.00 | 1.51 | 0.00 | 1.40 |
| 1:00 | 6.30 | 0.00 | 7.16 | 0.00 | 5.00 | 0.00 | 3.84 | 0.00 | 3.11 | 0.00 | 2.62 | 0.00 | 2.25 | 0.00 | 1.98 | 0.00 | 1.77 | 0.00 | 1.59 | 0.00 | 1.45 | 0.00 | 1.33 | 0.00 | 1.23 |
| 1:30 | 10.10 | 0.00 | 5.31 | 0.00 | 4.00 | 0.00 | 3.20 | 0.00 | 2.66 | 0.00 | 2.27 | 0.00 | 1.97 | 0.00 | 1.74 | 0.00 | 1.56 | 0.00 | 1.41 | 0.00 | 1.28 | 0.00 | 1.18 | 0.00 | 1.09 |
| 2:00 | 13.40 | 0.00 | 4.32 | 0.00 | 3.39 | 0.00 | 2.78 | 0.00 | 2.34 | 0.00 | 2.02 | 0.00 | 1.77 | 0.00 | 1.57 | 0.00 | 1.41 | 0.00 | 1.27 | 0.00 | 1.16 | 0.00 | 1.06 | 0.00 | 0.97 |
| 2:30 | 16.30 | 0.00 | 3.70 | 0.00 | 2.98 | 0.00 | 2.48 | 0.00 | 2.11 | 0.00 | 1.83 | 0.00 | 1.61 | 0.00 | 1.43 | 0.00 | 1.28 | 0.00 | 1.16 | 0.00 | 1.05 | 0.00 | 0.96 | 0.00 | 0.88 |
| 3:00 | 18.70 | 0.00 | 3.30 | 0.00 | 2.70 | 0.00 | 2.27 | 0.00 | 1.94 | 0.00 | 1.69 | 0.00 | 1.49 | 0.00 | 1.32 | 0.00 | 1.19 | 0.00 | 1.07 | 0.00 | 0.97 | 0.00 | 0.88 | 0.00 | 0.81 |
| 3:30 | 20.50 | 0.00 | 3.04 | 0.00 | 2.51 | 0.00 | 2.12 | 0.00 | 1.83 | 0.00 | 2.60 | 0.00 | 1.41 | 0.00 | 1.25 | 0.00 | 1.12 | 0.00 | 1.01 | 0.00 | 0.91 | 0.00 | 0.83 | 0.00 | 0.75 |
| 4:00 | 21.60 | 0.00 | 2.90 | 0.00 | 2.41 | 0.00 | 2.04 | 0.00 | 1.76 | 0.00 | 1.54 | 0.00 | 1.36 | 0.00 | 1.21 | 0.00 | 1.08 | 0.00 | 0.97 | 0.00 | 0.88 | 0.00 | 0.79 | 0.00 | 0.72 |
| 4:30 | 22.10 | 0.00 | 2.84 | 0.00 | 2.37 | 0.00 | 2.01 | 0.00 | 1.74 | 0.00 | 1.52 | 0.00 | 1.34 | 0.00 | 1.19 | 0.00 | 1.06 | 0.00 | 0.95 | 0.00 | 0.86 | 0.00 | 0.78 | 0.00 | 0.71 |
| 5:00 | 21.90 | 0.00 | 2.87 | 0.00 | 2.38 | 0.00 | 2.02 | 0.00 | 1.75 | 0.00 | 1.53 | 0.00 | 1.34 | 0.00 | 1.20 | 0.00 | 1.07 | 0.00 | 0.96 | 0.00 | 0.87 | 0.00 | 0.79 | 0.00 | 0.71 |
| 5:30 | 21.00 | 0.00 | 2.98 | 0.00 | 2.47 | 0.00 | 2.09 | 0.00 | 1.80 | 0.00 | 1.57 | 0.00 | 1.38 | 0.00 | 1.23 | 0.00 | 1.10 | 0.00 | 0.99 | 0.00 | 0.90 | 0.00 | 0.81 | 0.00 | 0.74 |
| 6:00 | 19.40 | 0.00 | 3.19 | 0.00 | 2.62 | 0.00 | 2.21 | 0.00 | 1.90 | 0.00 | 1.65 | 0.00 | 1.46 | 0.00 | 1.29 | 0.00 | 1.16 | 0.00 | 1.05 | 0.00 | 0.95 | 0.00 | 0.86 | 0.00 | 0.79 |
| 6:30 | 17.30 | 0.00 | 3.52 | 0.00 | 2.85 | 0.00 | 2.38 | 0.00 | 2.04 | 0.00 | 1.77 | 0.00 | 1.56 | 0.00 | 1.38 | 0.00 | 1.24 | 0.00 | 1.12 | 0.00 | 1.02 | 0.00 | 0.93 | 0.00 | 0.85 |
| 7:00 | 14.60 | 0.00 | 4.04 | 0.00 | 3.21 | 0.00 | 2.64 | 0.00 | 2.24 | 0.00 | 1.94 | 0.00 | 1.70 | 0.00 | 1.51 | 0.00 | 1.35 | 0.00 | 1.22 | 0.00 | 1.11 | 0.00 | 1.02 | 0.00 | 0.93 |
| 7:30 | 11.40 | 0.00 | 4.87 | 0.00 | 3.74 | 0.00 | 3.02 | 0.00 | 2.52 | 0.00 | 2.16 | 0.00 | 1.89 | 0.00 | 1.67 | 0.00 | 1.50 | 0.00 | 1.35 | 0.00 | 1.23 | 0.00 | 1.13 | 0.00 | 1.04 |
| 8:00 | 7.80 | 0.00 | 6.30 | 0.00 | 4.55 | 0.00 | 3.56 | 0.00 | 2.92 | 0.00 | 2.47 | 0.00 | 2.14 | 0.00 | 1.88 | 0.00 | 1.68 | 0.00 | 1.52 | 0.00 | 1.38 | 0.00 | 1.27 | 0.00 | 1.17 |
| 8:30 | 3.90 | 0.00 | 9.15 | 0.00 | 5.92 | 0.00 | 4.37 | 0.00 | 3.47 | 0.00 | 2.88 | 0.00 | 2.46 | 0.00 | 2.15 | 0.00 | 1.91 | 0.00 | 1.72 | 0.00 | 1.57 | 0.00 | 1.44 | 0.00 | 1.33 |

April 1st 45°N latitude

Fig. 37A

| Daylight in 30min Increments | Roof Pitch | 1:12 | | 2:12 | | 3:12 | | 4:12 | | 5:12 | | 6:12 | | 7:12 | | 8:12 | | 9:12 | | 10:12 | | 11:12 | | 12:12 | |
|---|---|---|---|---|---|---|---|---|---|---|---|---|---|---|---|---|---|---|---|---|---|---|---|---|---|
| | Roof Pitch (Degrees) | 4.76 | | 9.46 | | 14.04 | | 18.43 | | 22.62 | | 26.57 | | 30.26 | | 33.69 | | 36.87 | | 39.81 | | 42.51 | | 45.00 | |
| | Up/Down Slope Shadow | Down | Up | Down | Up | Down | Up | Down | Up | Down | Up | Down | Up | Down | Up | Down | Up | Down | Up | Down | Up | Down | Up | Down | Up |
| | Sun Elevation Angle | | | | | | | | | | | | | | | | | | | | | | | | |
| 0:00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 0:30 | 2.60 | 0.00 | 10.77 | 0.00 | 6.56 | 0.00 | 4.73 | 0.00 | 3.70 | 0.00 | 3.05 | 0.00 | 2.59 | 0.00 | 2.26 | 0.00 | 2.00 | 0.00 | 1.80 | 0.00 | 1.63 | 0.00 | 1.50 | 0.00 | 1.38 |
| 1:00 | 7.70 | 0.00 | 6.35 | 0.00 | 4.58 | 0.00 | 3.58 | 0.00 | 2.93 | 0.00 | 2.48 | 0.00 | 2.14 | 0.00 | 1.89 | 0.00 | 1.69 | 0.00 | 1.52 | 0.00 | 1.39 | 0.00 | 1.27 | 0.00 | 1.17 |
| 1:30 | 13.00 | 0.00 | 4.42 | 0.00 | 3.45 | 0.00 | 2.82 | 0.00 | 2.38 | 0.00 | 2.05 | 0.00 | 1.79 | 0.00 | 1.59 | 0.00 | 1.42 | 0.00 | 1.29 | 0.00 | 1.17 | 0.00 | 1.07 | 0.00 | 0.99 |
| 2:00 | 18.20 | 0.00 | 3.37 | 0.00 | 2.75 | 0.00 | 2.31 | 0.00 | 1.98 | 0.00 | 1.72 | 0.00 | 1.51 | 0.00 | 1.35 | 0.00 | 1.21 | 0.00 | 1.09 | 0.00 | 0.99 | 0.00 | 0.90 | 0.00 | 0.82 |
| 2:30 | 23.30 | 0.00 | 2.71 | 0.00 | 2.26 | 0.00 | 1.93 | 0.00 | 1.67 | 0.00 | 1.46 | 0.00 | 1.29 | 0.00 | 1.14 | 0.00 | 1.02 | 0.00 | 0.92 | 0.00 | 0.82 | 0.00 | 0.74 | 0.00 | 0.67 |
| 3:00 | 28.30 | 0.00 | 2.24 | 0.00 | 1.90 | 0.00 | 1.64 | 0.00 | 1.42 | 0.00 | 1.24 | 0.00 | 1.09 | 0.00 | 0.97 | 0.00 | 0.86 | 0.00 | 0.76 | 0.00 | 0.68 | 0.00 | 0.61 | 0.00 | 0.54 |
| 3:30 | 33.00 | 0.00 | 1.90 | 0.00 | 1.63 | 0.00 | 1.41 | 0.00 | 1.22 | 0.00 | 1.07 | 0.00 | 0.93 | 0.00 | 0.82 | 0.00 | 0.72 | 0.00 | 0.63 | 0.00 | 0.55 | 0.00 | 0.48 | 0.00 | 0.42 |
| 4:00 | 37.40 | 0.00 | 1.65 | 0.00 | 1.42 | 0.00 | 1.22 | 0.00 | 1.06 | 0.00 | 0.92 | 0.00 | 0.80 | 0.00 | 0.69 | 0.00 | 0.60 | 0.00 | 0.51 | 0.00 | 0.44 | 0.00 | 0.37 | 0.00 | 0.31 |
| 4:30 | 41.30 | 0.00 | 1.45 | 0.00 | 1.25 | 0.00 | 1.08 | 0.00 | 0.93 | 0.00 | 0.80 | 0.00 | 0.69 | 0.00 | 0.59 | 0.00 | 0.50 | 0.00 | 0.42 | 0.00 | 0.34 | 0.00 | 0.28 | 0.00 | 0.22 |
| 5:00 | 44.70 | 0.00 | 1.30 | 0.00 | 1.12 | 0.00 | 0.96 | 0.00 | 0.82 | 0.00 | 0.70 | 0.00 | 0.59 | 0.00 | 0.50 | 0.00 | 0.41 | 0.00 | 0.33 | 0.00 | 0.26 | 0.00 | 0.19 | 0.00 | 0.13 |
| 5:30 | 47.30 | 0.00 | 1.20 | 0.00 | 1.03 | 0.00 | 0.88 | 0.00 | 0.75 | 0.00 | 0.63 | 0.00 | 0.52 | 0.00 | 0.43 | 0.00 | 0.35 | 0.00 | 0.27 | 0.00 | 0.20 | 0.00 | 0.13 | 0.06 | 0.00 |
| 6:00 | 49.10 | 0.00 | 1.13 | 0.00 | 0.97 | 0.00 | 0.82 | 0.00 | 0.70 | 0.00 | 0.58 | 0.00 | 0.48 | 0.00 | 0.39 | 0.00 | 0.30 | 0.00 | 0.22 | 0.00 | 0.15 | 0.04 | 0.00 | 0.10 | 0.00 |
| 6:30 | 49.80 | 0.00 | 1.11 | 0.00 | 0.94 | 0.00 | 0.80 | 0.00 | 0.68 | 0.00 | 0.56 | 0.00 | 0.46 | 0.00 | 0.37 | 0.00 | 0.28 | 0.00 | 0.21 | 0.00 | 0.14 | 0.06 | 0.00 | 0.12 | 0.00 |
| 7:00 | 49.50 | 0.00 | 1.12 | 0.00 | 0.95 | 0.00 | 0.81 | 0.00 | 0.68 | 0.00 | 0.57 | 0.00 | 0.47 | 0.00 | 0.38 | 0.00 | 0.29 | 0.00 | 0.21 | 0.00 | 0.14 | 0.05 | 0.00 | 0.11 | 0.00 |
| 7:30 | 48.10 | 0.00 | 1.17 | 0.00 | 1.00 | 0.00 | 0.85 | 0.00 | 0.72 | 0.00 | 0.61 | 0.00 | 0.50 | 0.00 | 0.41 | 0.00 | 0.33 | 0.00 | 0.25 | 0.00 | 0.18 | 0.01 | 0.00 | 0.07 | 0.00 |
| 8:00 | 45.80 | 0.00 | 1.26 | 0.00 | 1.08 | 0.00 | 0.93 | 0.00 | 0.79 | 0.00 | 0.67 | 0.00 | 0.56 | 0.00 | 0.47 | 0.00 | 0.38 | 0.00 | 0.30 | 0.00 | 0.23 | 0.00 | 0.17 | 0.02 | 0.00 |

Fig. 37B

| | | | | | | | | | | | | | | | | | | | | | | | | | |
|---|---|---|---|---|---|---|---|---|---|---|---|---|---|---|---|---|---|---|---|---|---|---|---|---|---|
| 8:30 | 42.70 | 0.00 | 1.39 | 0.00 | 1.20 | 0.00 | 1.03 | 0.00 | 0.89 | 0.00 | 0.76 | 0.00 | 0.65 | 0.00 | 0.55 | 0.00 | 0.46 | 0.00 | 0.38 | 0.00 | 0.31 | 0.00 | 0.24 | 0.00 | 0.18 |
| 9:00 | 39.00 | 0.00 | 1.56 | 0.00 | 1.35 | 0.00 | 1.16 | 0.00 | 1.01 | 0.00 | 0.87 | 0.00 | 0.75 | 0.00 | 0.65 | 0.00 | 0.56 | 0.00 | 0.47 | 0.00 | 0.40 | 0.00 | 0.33 | 0.00 | 0.27 |
| 9:30 | 34.80 | 0.00 | 1.79 | 0.00 | 1.54 | 0.00 | 1.33 | 0.00 | 1.15 | 0.00 | 1.01 | 0.00 | 0.88 | 0.00 | 0.77 | 0.00 | 0.67 | 0.00 | 0.58 | 0.00 | 0.51 | 0.00 | 0.44 | 0.00 | 0.37 |
| 10:00 | 30.20 | 0.00 | 2.09 | 0.00 | 1.79 | 0.00 | 1.54 | 0.00 | 1.34 | 0.00 | 1.17 | 0.00 | 1.03 | 0.00 | 0.91 | 0.00 | 0.80 | 0.00 | 0.71 | 0.00 | 0.63 | 0.00 | 0.56 | 0.00 | 0.49 |
| 10:30 | 25.30 | 0.00 | 2.50 | 0.00 | 2.11 | 0.00 | 1.80 | 0.00 | 1.56 | 0.00 | 1.37 | 0.00 | 1.21 | 0.00 | 1.07 | 0.00 | 0.95 | 0.00 | 0.85 | 0.00 | 0.76 | 0.00 | 0.69 | 0.00 | 0.62 |
| 11:00 | 20.30 | 0.00 | 3.07 | 0.00 | 2.53 | 0.00 | 2.14 | 0.00 | 1.84 | 0.00 | 1.61 | 0.00 | 1.42 | 0.00 | 1.26 | 0.00 | 1.13 | 0.00 | 1.01 | 0.00 | 0.92 | 0.00 | 0.83 | 0.00 | 0.76 |
| 11:30 | 15.10 | 0.00 | 3.93 | 0.00 | 3.14 | 0.00 | 2.59 | 0.00 | 2.20 | 0.00 | 1.90 | 0.00 | 1.67 | 0.00 | 1.48 | 0.00 | 1.33 | 0.00 | 1.20 | 0.00 | 1.09 | 0.00 | 1.00 | 0.00 | 0.92 |
| 12:00 | 9.80 | 0.00 | 5.42 | 0.00 | 4.06 | 0.00 | 3.24 | 0.00 | 2.69 | 0.00 | 2.29 | 0.00 | 1.99 | 0.00 | 1.76 | 0.00 | 1.58 | 0.00 | 1.42 | 0.00 | 1.30 | 0.00 | 1.19 | 0.00 | 1.10 |
| 12:30 | 4.60 | 0.00 | 8.47 | 0.00 | 5.62 | 0.00 | 4.20 | 0.00 | 3.36 | 0.00 | 2.80 | 0.00 | 2.40 | 0.00 | 2.10 | 0.00 | 1.87 | 0.00 | 1.68 | 0.00 | 1.53 | 0.00 | 1.40 | 0.00 | 1.30 |

July 1st 45°N latitude

*Fig. 38*

| | Roof Pitch | 1:12 | | 2:12 | | 3:12 | | 4:12 | | 5:12 | | 6:12 | | 7:12 | | 8:12 | | 9:12 | | 10:12 | | 11:12 | | 12:12 | |
|---|---|---|---|---|---|---|---|---|---|---|---|---|---|---|---|---|---|---|---|---|---|---|---|---|---|
| | Roof Pitch (Degrees) | 4.76 | | 9.46 | | 14.04 | | 18.43 | | 22.62 | | 26.57 | | 30.26 | | 33.69 | | 36.87 | | 39.81 | | 42.51 | | 45.00 | |
| | Up/Down Slope Shadow | Down | Up | Down | Up | Down | Up | Down | Up | Down | Up | Down | Up | Down | Up | Down | Up | Down | Up | Down | Up | Down | Up | Down | Up |
| Daylight in 30min Increments | Sun Elevation Angle | | | | | | | | | | | | | | | | | | | | | | | | |
| 0:00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 0:30 | 1.10 | 0.00 | 13.52 | 0.00 | 7.50 | 0.00 | 5.21 | 0.00 | 4.00 | 0.00 | 3.26 | 0.00 | 2.75 | 0.00 | 2.38 | 0.00 | 2.11 | 0.00 | 1.89 | 0.00 | 1.71 | 0.00 | 1.57 | 0.00 | 1.45 |
| 1:00 | 5.50 | 0.00 | 7.72 | 0.00 | 5.27 | 0.00 | 4.00 | 0.00 | 3.23 | 0.00 | 2.70 | 0.00 | 2.32 | 0.00 | 2.04 | 0.00 | 1.81 | 0.00 | 1.63 | 0.00 | 1.49 | 0.00 | 1.36 | 0.00 | 1.26 |
| 1:30 | 10.20 | 0.00 | 5.27 | 0.00 | 3.96 | 0.00 | 3.16 | 0.00 | 2.65 | 0.00 | 2.26 | 0.00 | 1.97 | 0.00 | 1.74 | 0.00 | 1.56 | 0.00 | 1.41 | 0.00 | 1.28 | 0.00 | 1.17 | 0.00 | 1.08 |
| 2:00 | 15.20 | 0.00 | 3.91 | 0.00 | 3.12 | 0.00 | 2.58 | 0.00 | 2.19 | 0.00 | 1.90 | 0.00 | 1.67 | 0.00 | 1.48 | 0.00 | 1.33 | 0.00 | 1.20 | 0.00 | 1.09 | 0.00 | 1.00 | 0.00 | 0.91 |
| 2:30 | 20.30 | 0.00 | 3.07 | 0.00 | 2.53 | 0.00 | 2.14 | 0.00 | 1.84 | 0.00 | 1.61 | 0.00 | 1.42 | 0.00 | 1.26 | 0.00 | 1.13 | 0.00 | 1.01 | 0.00 | 0.92 | 0.00 | 0.83 | 0.00 | 0.76 |
| 3:00 | 25.50 | 0.00 | 2.48 | 0.00 | 2.09 | 0.00 | 1.79 | 0.00 | 1.55 | 0.00 | 1.36 | 0.00 | 1.20 | 0.00 | 1.06 | 0.00 | 0.95 | 0.00 | 0.85 | 0.00 | 0.76 | 0.00 | 0.68 | 0.00 | 0.61 |
| 3:30 | 30.70 | 0.00 | 2.06 | 0.00 | 1.76 | 0.00 | 1.51 | 0.00 | 1.32 | 0.00 | 1.15 | 0.00 | 1.01 | 0.00 | 0.89 | 0.00 | 0.79 | 0.00 | 0.69 | 0.00 | 0.61 | 0.00 | 0.54 | 0.00 | 0.48 |
| 4:00 | 36.00 | 0.00 | 1.72 | 0.00 | 1.48 | 0.00 | 1.28 | 0.00 | 1.11 | 0.00 | 0.97 | 0.00 | 0.84 | 0.00 | 0.73 | 0.00 | 0.64 | 0.00 | 0.55 | 0.00 | 0.47 | 0.00 | 0.41 | 0.00 | 0.34 |
| 4:30 | 41.30 | 0.00 | 1.45 | 0.00 | 1.25 | 0.00 | 1.08 | 0.00 | 0.93 | 0.00 | 0.80 | 0.00 | 0.69 | 0.00 | 0.59 | 0.00 | 0.50 | 0.00 | 0.42 | 0.00 | 0.34 | 0.00 | 0.28 | 0.00 | 0.22 |
| 5:00 | 46.50 | 0.00 | 1.23 | 0.00 | 1.06 | 0.00 | 0.90 | 0.00 | 0.77 | 0.00 | 0.65 | 0.00 | 0.55 | 0.00 | 0.45 | 0.00 | 0.36 | 0.00 | 0.29 | 0.00 | 0.22 | 0.00 | 0.15 | 0.04 | 0.00 |
| 5:30 | 51.50 | 0.00 | 1.05 | 0.00 | 0.89 | 0.00 | 0.75 | 0.00 | 0.63 | 0.00 | 0.52 | 0.00 | 0.42 | 0.00 | 0.33 | 0.00 | 0.24 | 0.00 | 0.17 | 0.03 | 0.00 | 0.10 | 0.00 | 0.16 | 0.00 |
| 6:00 | 56.30 | 0.00 | 0.89 | 0.00 | 0.75 | 0.00 | 0.62 | 0.00 | 0.50 | 0.00 | 0.40 | 0.00 | 0.30 | 0.00 | 0.21 | 0.00 | 0.13 | 0.08 | 0.00 | 0.15 | 0.00 | 0.21 | 0.00 | 0.27 | 0.00 |
| 6:30 | 60.60 | 0.00 | 0.76 | 0.00 | 0.63 | 0.00 | 0.50 | 0.00 | 0.39 | 0.00 | 0.29 | 0.00 | 0.19 | 0.02 | 0.00 | 0.10 | 0.00 | 0.18 | 0.00 | 0.25 | 0.00 | 0.32 | 0.00 | 0.38 | 0.00 |
| 7:00 | 64.30 | 0.00 | 0.65 | 0.00 | 0.53 | 0.00 | 0.41 | 0.00 | 0.30 | 0.00 | 0.20 | 0.02 | 0.00 | 0.11 | 0.00 | 0.19 | 0.00 | 0.27 | 0.00 | 0.35 | 0.00 | 0.42 | 0.00 | 0.48 | 0.00 |
| 7:30 | 66.90 | 0.00 | 0.58 | 0.00 | 0.46 | 0.00 | 0.35 | 0.00 | 0.24 | 0.00 | 0.14 | 0.08 | 0.00 | 0.17 | 0.00 | 0.25 | 0.00 | 0.34 | 0.00 | 0.41 | 0.00 | 0.48 | 0.00 | 0.55 | 0.00 |
| 8:00 | 68.00 | 0.00 | 0.55 | 0.00 | 0.43 | 0.00 | 0.32 | 0.00 | 0.21 | 0.01 | 0.00 | 0.11 | 0.00 | 0.20 | 0.00 | 0.28 | 0.00 | 0.37 | 0.00 | 0.44 | 0.00 | 0.51 | 0.00 | 0.58 | 0.00 |
| 8:30 | 67.50 | 0.00 | 0.57 | 0.00 | 0.45 | 0.00 | 0.33 | 0.00 | 0.22 | 0.00 | 0.00 | 0.10 | 0.00 | 0.19 | 0.00 | 0.27 | 0.00 | 0.35 | 0.00 | 0.43 | 0.00 | 0.50 | 0.00 | 0.57 | 0.00 |
| 9:00 | 65.40 | 0.00 | 0.62 | 0.00 | 0.50 | 0.00 | 0.38 | 0.00 | 0.28 | 0.00 | 0.17 | 0.05 | 0.00 | 0.14 | 0.00 | 0.22 | 0.00 | 0.30 | 0.00 | 0.37 | 0.00 | 0.44 | 0.00 | 0.51 | 0.00 |
| 9:30 | 62.20 | 0.00 | 0.71 | 0.00 | 0.58 | 0.00 | 0.46 | 0.00 | 0.35 | 0.00 | 0.25 | 0.00 | 0.16 | 0.06 | 0.00 | 0.14 | 0.00 | 0.22 | 0.00 | 0.29 | 0.00 | 0.36 | 0.00 | 0.43 | 0.00 |
| 10:00 | 58.10 | 0.00 | 0.83 | 0.00 | 0.69 | 0.00 | 0.57 | 0.00 | 0.46 | 0.00 | 0.35 | 0.00 | 0.26 | 0.00 | 0.17 | 0.04 | 0.00 | 0.12 | 0.00 | 0.19 | 0.00 | 0.26 | 0.00 | 0.32 | 0.00 |
| 10:30 | 53.40 | 0.00 | 0.98 | 0.00 | 0.83 | 0.00 | 0.70 | 0.00 | 0.58 | 0.00 | 0.47 | 0.00 | 0.37 | 0.00 | 0.28 | 0.00 | 0.20 | 0.01 | 0.00 | 0.08 | 0.00 | 0.14 | 0.00 | 0.20 | 0.00 |
| 11:00 | 48.50 | 0.00 | 1.15 | 0.00 | 0.99 | 0.00 | 0.84 | 0.00 | 0.71 | 0.00 | 0.60 | 0.00 | 0.49 | 0.00 | 0.40 | 0.00 | 0.32 | 0.00 | 0.24 | 0.00 | 0.17 | 0.02 | 0.00 | 0.08 | 0.00 |
| 11:30 | 43.30 | 0.00 | 1.36 | 0.00 | 1.17 | 0.00 | 1.01 | 0.00 | 0.87 | 0.00 | 0.74 | 0.00 | 0.63 | 0.00 | 0.53 | 0.00 | 0.44 | 0.00 | 0.37 | 0.00 | 0.29 | 0.00 | 0.23 | 0.00 | 0.17 |
| 12:00 | 38.10 | 0.00 | 1.61 | 0.00 | 1.38 | 0.00 | 1.20 | 0.00 | 1.04 | 0.00 | 0.90 | 0.00 | 0.78 | 0.00 | 0.67 | 0.00 | 0.58 | 0.00 | 0.50 | 0.00 | 0.42 | 0.00 | 0.35 | 0.00 | 0.29 |
| 12:30 | 32.80 | 0.00 | 1.92 | 0.00 | 1.64 | 0.00 | 1.42 | 0.00 | 1.23 | 0.00 | 1.07 | 0.00 | 0.94 | 0.00 | 0.83 | 0.00 | 0.73 | 0.00 | 0.64 | 0.00 | 0.56 | 0.00 | 0.49 | 0.00 | 0.43 |
| 13:00 | 27.50 | 0.00 | 2.31 | 0.00 | 1.95 | 0.00 | 1.68 | 0.00 | 1.46 | 0.00 | 1.28 | 0.00 | 1.12 | 0.00 | 0.99 | 0.00 | 0.88 | 0.00 | 0.79 | 0.00 | 0.70 | 0.00 | 0.63 | 0.00 | 0.56 |
| 13:30 | 22.30 | 0.00 | 2.82 | 0.00 | 2.35 | 0.00 | 2.00 | 0.00 | 1.72 | 0.00 | 1.51 | 0.00 | 1.33 | 0.00 | 1.18 | 0.00 | 1.05 | 0.00 | 0.95 | 0.00 | 0.85 | 0.00 | 0.77 | 0.00 | 0.70 |
| 14:00 | 17.10 | 0.00 | 3.55 | 0.00 | 2.88 | 0.00 | 2.40 | 0.00 | 2.05 | 0.00 | 1.78 | 0.00 | 1.57 | 0.00 | 1.39 | 0.00 | 1.25 | 0.00 | 1.13 | 0.00 | 1.03 | 0.00 | 0.93 | 0.00 | 0.86 |
| 14:30 | 12.10 | 0.00 | 4.66 | 0.00 | 3.61 | 0.00 | 2.93 | 0.00 | 2.46 | 0.00 | 2.11 | 0.00 | 1.85 | 0.00 | 1.63 | 0.00 | 1.46 | 0.00 | 1.32 | 0.00 | 1.20 | 0.00 | 1.10 | 0.00 | 1.02 |
| 15:00 | 7.30 | 0.00 | 6.56 | 0.00 | 4.69 | 0.00 | 3.65 | 0.00 | 2.98 | 0.00 | 2.52 | 0.00 | 2.18 | 0.00 | 1.93 | 0.00 | 1.71 | 0.00 | 1.54 | 0.00 | 1.40 | 0.00 | 1.29 | 0.00 | 1.19 |
| 15:30 | 2.80 | 0.00 | 10.49 | 0.00 | 6.45 | 0.00 | 4.67 | 0.00 | 3.67 | 0.00 | 3.02 | 0.00 | 2.57 | 0.00 | 2.24 | 0.00 | 1.99 | 0.00 | 1.78 | 0.00 | 1.62 | 0.00 | 1.49 | 0.00 | 1.37 |

October 1st 45°N latitude

Fig. 39

| | Roof Pitch | 1:12 | | 2:12 | | 3:12 | | 4:12 | | 5:12 | | 6:12 | | 7:12 | | 8:12 | | 9:12 | | 10:12 | | 11:12 | | 12:12 | |
|---|---|---|---|---|---|---|---|---|---|---|---|---|---|---|---|---|---|---|---|---|---|---|---|---|---|
| | Roof Pitch (Degrees) | 4.76 | | 9.46 | | 14.04 | | 18.43 | | 22.62 | | 26.57 | | 30.26 | | 33.69 | | 36.87 | | 39.81 | | 42.51 | | 45.00 | |
| | Up/Down Slope Shadow | Down | Up | Down | Up | Down | Up | Down | Up | Down | Up | Down | Up | Down | Up | Down | Up | Down | Up | Down | Up | Down | Up | Down | Up |
| Daylight in 30min Increments | Sun Elevation Angle | | | | | | | | | | | | | | | | | | | | | | | | |
| 0:00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 0:30 | 4.60 | 0.00 | 8.47 | 0.00 | 5.62 | 0.00 | 4.20 | 0.00 | 3.36 | 0.00 | 2.80 | 0.00 | 2.40 | 0.00 | 2.10 | 0.00 | 1.87 | 0.00 | 1.66 | 0.00 | 1.53 | 0.00 | 1.40 | 0.00 | 1.30 |
| 1:00 | 9.70 | 0.00 | 5.46 | 0.00 | 4.08 | 0.00 | 3.25 | 0.00 | 2.70 | 0.00 | 2.30 | 0.00 | 2.00 | 0.00 | 1.77 | 0.00 | 1.58 | 0.00 | 1.43 | 0.00 | 1.30 | 0.00 | 1.19 | 0.00 | 1.10 |
| 1:30 | 14.70 | 0.00 | 4.02 | 0.00 | 3.19 | 0.00 | 2.63 | 0.00 | 2.23 | 0.00 | 1.93 | 0.00 | 1.69 | 0.00 | 1.50 | 0.00 | 1.35 | 0.00 | 1.22 | 0.00 | 1.11 | 0.00 | 1.01 | 0.00 | 0.93 |
| 2:00 | 19.50 | 0.00 | 3.18 | 0.00 | 2.61 | 0.00 | 2.20 | 0.00 | 1.89 | 0.00 | 1.65 | 0.00 | 1.45 | 0.00 | 1.29 | 0.00 | 1.16 | 0.00 | 1.04 | 0.00 | 0.94 | 0.00 | 0.86 | 0.00 | 0.78 |
| 2:30 | 24.10 | 0.00 | 2.62 | 0.00 | 2.20 | 0.00 | 1.88 | 0.00 | 1.63 | 0.00 | 1.42 | 0.00 | 1.25 | 0.00 | 1.11 | 0.00 | 0.99 | 0.00 | 0.89 | 0.00 | 0.80 | 0.00 | 0.72 | 0.00 | 0.65 |
| 3:00 | 28.40 | 0.00 | 2.23 | 0.00 | 1.90 | 0.00 | 1.63 | 0.00 | 1.42 | 0.00 | 1.24 | 0.00 | 1.09 | 0.00 | 0.96 | 0.00 | 0.86 | 0.00 | 0.76 | 0.00 | 0.68 | 0.00 | 0.60 | 0.00 | 0.54 |
| 3:30 | 32.30 | 0.00 | 1.95 | 0.00 | 1.67 | 0.00 | 1.44 | 0.00 | 1.25 | 0.00 | 1.09 | 0.00 | 0.96 | 0.00 | 0.84 | 0.00 | 0.74 | 0.00 | 0.65 | 0.00 | 0.57 | 0.00 | 0.50 | 0.00 | 0.44 |
| 4:00 | 35.60 | 0.00 | 1.74 | 0.00 | 1.50 | 0.00 | 1.30 | 0.00 | 1.12 | 0.00 | 0.98 | 0.00 | 0.85 | 0.00 | 0.74 | 0.00 | 0.65 | 0.00 | 0.56 | 0.00 | 0.48 | 0.00 | 0.42 | 0.00 | 0.35 |
| 4:30 | 41.30 | 0.00 | 1.45 | 0.00 | 1.25 | 0.00 | 1.08 | 0.00 | 0.93 | 0.00 | 0.80 | 0.00 | 0.69 | 0.00 | 0.59 | 0.00 | 0.50 | 0.00 | 0.42 | 0.00 | 0.34 | 0.00 | 0.28 | 0.00 | 0.22 |
| 5:00 | 41.50 | 0.00 | 1.44 | 0.00 | 1.24 | 0.00 | 1.07 | 0.00 | 0.92 | 0.00 | 0.79 | 0.00 | 0.68 | 0.00 | 0.58 | 0.00 | 0.49 | 0.00 | 0.41 | 0.00 | 0.34 | 0.00 | 0.27 | 0.00 | 0.21 |
| 5:30 | 40.80 | 0.00 | 1.48 | 0.00 | 1.27 | 0.00 | 1.10 | 0.00 | 0.95 | 0.00 | 0.81 | 0.00 | 0.70 | 0.00 | 0.60 | 0.00 | 0.51 | 0.00 | 0.43 | 0.00 | 0.35 | 0.00 | 0.29 | 0.00 | 0.23 |
| 6:00 | 39.30 | 0.00 | 1.55 | 0.00 | 1.34 | 0.00 | 1.15 | 0.00 | 1.00 | 0.00 | 0.86 | 0.00 | 0.75 | 0.00 | 0.64 | 0.00 | 0.55 | 0.00 | 0.47 | 0.00 | 0.39 | 0.00 | 0.33 | 0.00 | 0.27 |
| 6:30 | 36.80 | 0.00 | 1.68 | 0.00 | 1.44 | 0.00 | 1.25 | 0.00 | 1.08 | 0.00 | 0.94 | 0.00 | 0.82 | 0.00 | 0.71 | 0.00 | 0.61 | 0.00 | 0.53 | 0.00 | 0.45 | 0.00 | 0.39 | 0.00 | 0.33 |
| 7:00 | 33.70 | 0.00 | 1.86 | 0.00 | 1.59 | 0.00 | 1.38 | 0.00 | 1.20 | 0.00 | 1.04 | 0.00 | 0.91 | 0.00 | 0.80 | 0.00 | 0.70 | 0.00 | 0.61 | 0.00 | 0.53 | 0.00 | 0.46 | 0.00 | 0.40 |
| 7:30 | 30.10 | 0.00 | 2.10 | 0.00 | 1.79 | 0.00 | 1.54 | 0.00 | 1.34 | 0.00 | 1.17 | 0.00 | 1.03 | 0.00 | 0.91 | 0.00 | 0.80 | 0.00 | 0.71 | 0.00 | 0.63 | 0.00 | 0.56 | 0.00 | 0.49 |
| 8:00 | 25.90 | 0.00 | 2.45 | 0.00 | 2.06 | 0.00 | 1.77 | 0.00 | 1.53 | 0.00 | 1.34 | 0.00 | 1.18 | 0.00 | 1.05 | 0.00 | 0.93 | 0.00 | 0.83 | 0.00 | 0.75 | 0.00 | 0.67 | 0.00 | 0.60 |
| 8:30 | 21.50 | 0.00 | 2.91 | 0.00 | 2.42 | 0.00 | 2.05 | 0.00 | 1.77 | 0.00 | 1.54 | 0.00 | 1.36 | 0.00 | 1.21 | 0.00 | 1.08 | 0.00 | 0.97 | 0.00 | 0.88 | 0.00 | 0.80 | 0.00 | 0.72 |
| 9:00 | 16.70 | 0.00 | 3.62 | 0.00 | 2.93 | 0.00 | 2.44 | 0.00 | 2.08 | 0.00 | 1.81 | 0.00 | 1.59 | 0.00 | 1.41 | 0.00 | 1.26 | 0.00 | 1.14 | 0.00 | 1.04 | 0.00 | 0.95 | 0.00 | 0.87 |
| 9:30 | 11.70 | 0.00 | 4.78 | 0.00 | 3.65 | 0.00 | 2.98 | 0.00 | 2.50 | 0.00 | 2.14 | 0.00 | 1.87 | 0.00 | 1.66 | 0.00 | 1.48 | 0.00 | 1.34 | 0.00 | 1.22 | 0.00 | 1.12 | 0.00 | 1.03 |
| 10:00 | 6.70 | 0.00 | 6.91 | 0.00 | 4.87 | 0.00 | 3.76 | 0.00 | 3.06 | 0.00 | 2.58 | 0.00 | 2.22 | 0.00 | 1.95 | 0.00 | 1.74 | 0.00 | 1.57 | 0.00 | 1.43 | 0.00 | 1.31 | 0.00 | 1.21 |
| 10:30 | 1.60 | 0.00 | 12.46 | 0.00 | 7.15 | 0.00 | 5.04 | 0.00 | 3.90 | 0.00 | 3.18 | 0.00 | 2.69 | 0.00 | 2.34 | 0.00 | 2.07 | 0.00 | 1.86 | 0.00 | 1.69 | 0.00 | 1.55 | 0.00 | 1.43 |

916
930b
930
930c
926
928b
928
928a
929a
929b
929

1230
1228a
1228b 1216
1228
1230
1230a
1228b 1230b
1230c
1228a
Up to 1"
Gap Between
Panels Without
Spanner Plate
1216
1230

SNOW FENCE FOR A SOLAR PANEL

CROSS REFERENCE TO RELATED APPLICATIONS

This application claims the benefit of and priority to U.S. Provisional Patent Application No. 61/652,735, filed May 29, 2012, and to U.S. Provisional Patent Application No. 61/707,498, filed Sep. 28, 2012, the entire contents of which are hereby incorporated by reference herein.

BACKGROUND

The present invention relates to solar panels and snow fences for solar panels.

SUMMARY

In some embodiments, the invention provides a roof mounted solar panel assembly having a first solar panel and a second solar panel spaced a distance from the first solar panel. The roof defines a roof plane and the first and second solar panels define a solar panel plane across a top surface of the first and second solar panels. A first mount assembly includes a first portion extending substantially perpendicular to the roof plane between the first and second solar panels and below the solar panel plane. The first mount assembly further includes a second portion extending upward from the solar panel plane at a non-parallel angle with respect to the roof plane. In some embodiments, the second portion extends substantially perpendicularly upward with respect to the roof plane. In some embodiments, the second portion extends upward with respect to the roof plane in a curvilinear and/or arcuate fashion.

In some embodiments, the invention provides a snow retention assembly mountable to a solar panel assembly including first and second solar panels positioned on a roof. The snow retention assembly includes a first portion extending between the first solar panel and the second solar panel, and a second portion positioned above the first solar panel and the second solar panel. The first portion extending substantially perpendicular to a plane defined by the roof and the second portion including a substantially perpendicular portion extending away from the roof and a substantially parallel portion extending substantially parallel to the plane defined by the roof. The first portion includes a fastener that couples the snow retention assembly to the first and second solar panels. The second portion is coupled to the first portion and retains at least a portion of snow on the solar panel while permitting flow of fluid along the solar panel. In some embodiments, the first and second solar panels are spaced an adequate distance apart to create a gap to thereby permit fluid to flow along the first solar panel, through the gap and subsequently along the roof surface under the second solar panel.

In some embodiments, the invention provides a roof mount apparatus for mounting on a roof surface. The roof mount apparatus includes a first solar panel having a first frame secured to the roof surface, a second solar panel having a second frame secured to the roof surface, the second solar panel spaced from the first solar panel and defining a slot between the first frame and the second frame, and a snow fence secured to the first frame and the second frame. The snow fence includes a bracket positioned adjacent to a top of the first frame and a top of the second frame, the bracket protruding from the first frame and the second frame to inhibit sliding of snow along at least one of the first solar panel and the second solar panel, and a coupling device including an elongated portion positioned in the slot and extending substantially perpendicular to the roof surface and a wide portion positioned within a channel to couple the bracket to the first frame and the second frame.

In some embodiments, the invention provides a roof mount apparatus for mounting on a roof surface. The roof mount apparatus includes a first solar panel having a first frame secured to the roof surface, a second solar panel having a second frame secured to the roof surface, the second solar panel spaced from the first solar panel and defining a slot between the first frame and the second frame, and a snow fence secured to the first frame and the second frame. The snow fence includes a bracket positioned adjacent to a top of the first frame and a top of the second frame, the bracket protruding from the first frame and the second frame to inhibit sliding of snow along at least one of the first solar panel and the second solar panel, and a coupling device including an elongated portion positioned in the slot and extending substantially perpendicular to the roof surface and a flange secured to the elongated portion. The flange engages the first frame at a location spaced from the top of the first frame and the second frame at a location spaced from the top of the second frame to secure the bracket to the first frame and the second frame.

In some embodiments, the invention provides a roof mount apparatus for mounting on a roof surface. The roof mount apparatus includes a first solar panel having a first frame secured to the roof surface, the first solar panel defining a first top surface, a first bottom surface and a first side surface, a second solar panel having a second frame secured to the roof surface, the second solar panel defining a second top surface, a second bottom surface and a second side surface, the second solar panel spaced from the first solar panel and defining a slot between the first side surface and the second side surface, and a snow fence secured to the first frame and the second frame. The snow fence includes a bracket positioned adjacent to the first top surface and the second top surface, the bracket protruding from the first frame and the second frame to inhibit sliding of snow along at least one of the first solar panel and the second solar panel and a coupling device including an elongated portion positioned in the slot and a flange securable to the elongated portion. The elongated portion extends substantially perpendicular to the roof surface and substantially parallel to the first side surface and the second side surface.

In some embodiments, the invention provides a method of retaining snow on a solar panel while permitting rain water and snow melt to flow off of the solar panel. The method further includes extending a first snow retention portion in a direction substantially parallel to a surface of the solar panel and extending a second snow retention portion at a non-parallel angle with respect to the surface of the solar panel. The method further includes retaining snow on the solar panel with at least one of the first and second snow retention portions and permitting rain and snow melt to flow off of the solar panel past at least one of the first and second snow retention portions.

In some embodiments, the invention provides a method of increasing resistance to flow of snow across a roof-mounted solar panel by at least one of increasing a coefficient of friction of at least a portion of the solar panel and by providing at least one protrusion extending upward from the solar panel. The method also includes permitting flow of rain and snow melt to flow along the solar panel and through at least one gap between the solar panel and the at least one protrusion.

Other aspects of the invention will become apparent by consideration of the detailed description and accompanying drawings.

BRIEF DESCRIPTION OF THE DRAWINGS

FIGS. 36-39 are tables showing the results of the calculations of FIGS. 32-35 during various times of the year.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," etc.) are only used to simplify description of embodiments of the present invention and do not alone indicate or imply that the device or element referred to must have a particular orientation. In addition, terms such as "first" and "second" are used herein for purposes of description and are not intended to indicate or imply relative importance or significance.

Figure 1:
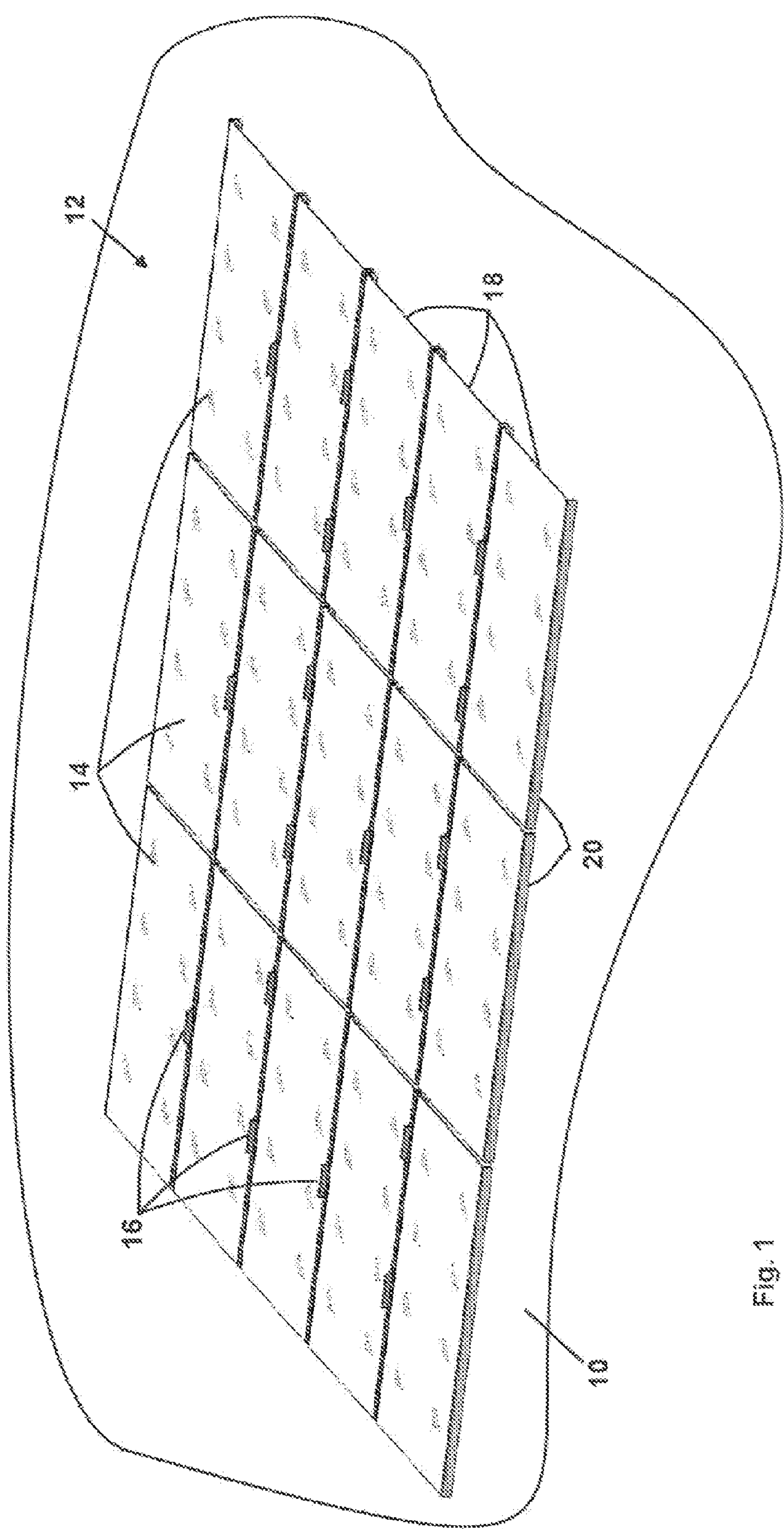
FIG. 1 is a perspective view of a roof with a solar panel array with a plurality of snow fences mounted to the solar panel array.
Figure 2:
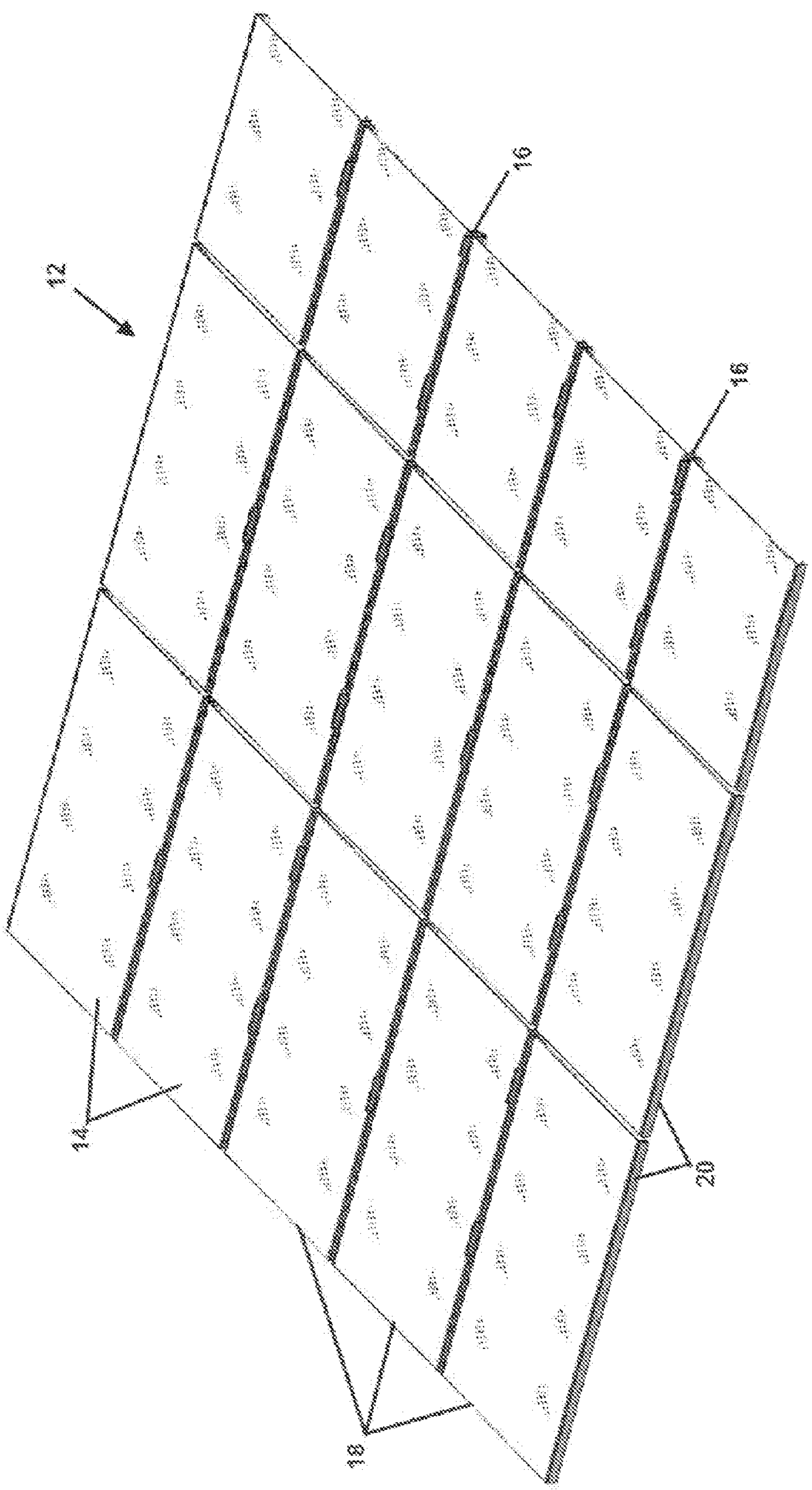
FIG. 2 is a cut away view of the solar panel array and snow fences of FIG. 1.

FIGS. 1 and 2 illustrate a roof 10 having a solar panel assembly 12 including a plurality of solar panels 14 mounted to the roof 10. The solar panels 14 are mounted to the roof 10 by any suitable mounting hardware. A plurality of snow guards or snow fences 16 are mounted to the plurality of solar panels 14 on the roof 10. The illustrated solar panel assembly 12 includes fifteen solar panels 14 in three rows of five panels each. Other quantities, configurations and arrangements of solar panels 14 are possible and the illustrated solar panel assembly 12 is given by way of example only.

Figure 3:
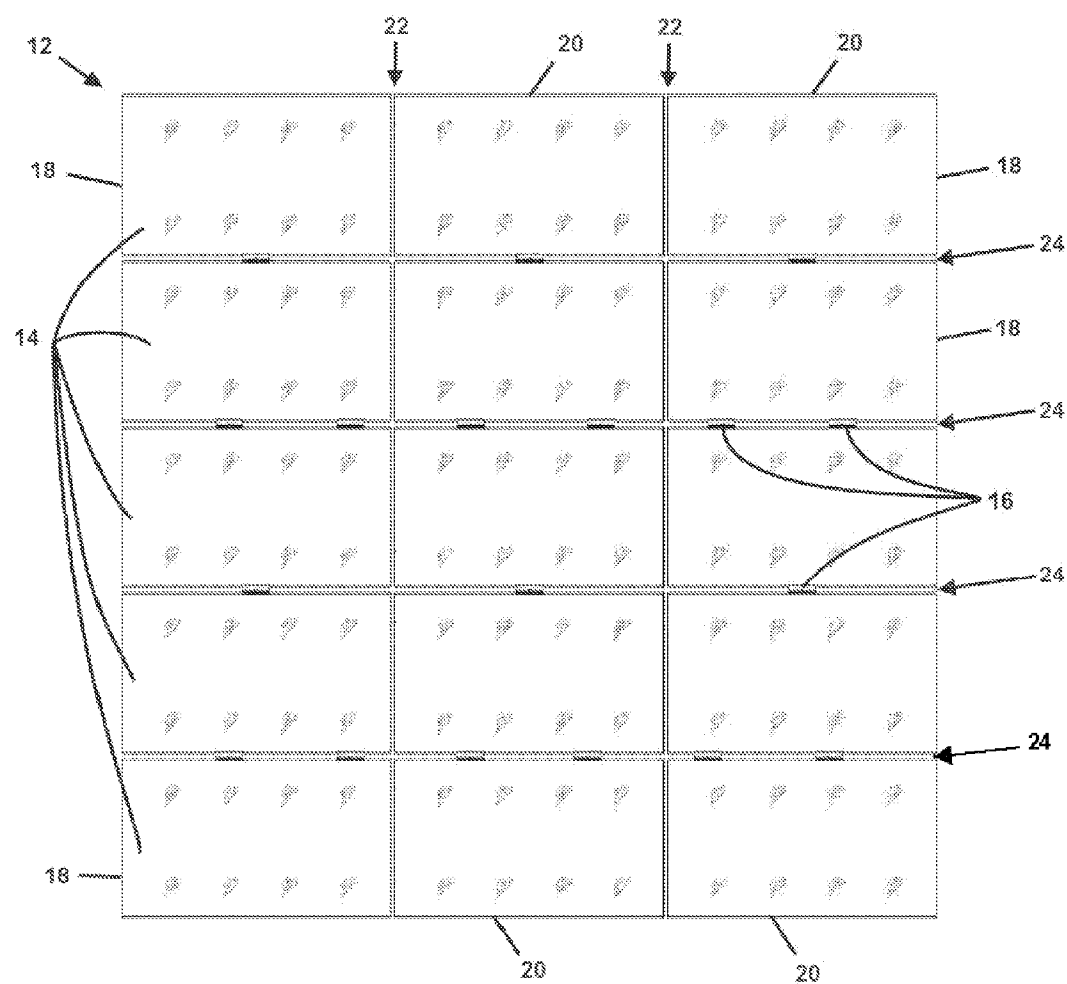
FIG. 3 is a top view of the solar panel array and snow fences of FIG. 1.
Figure 4:
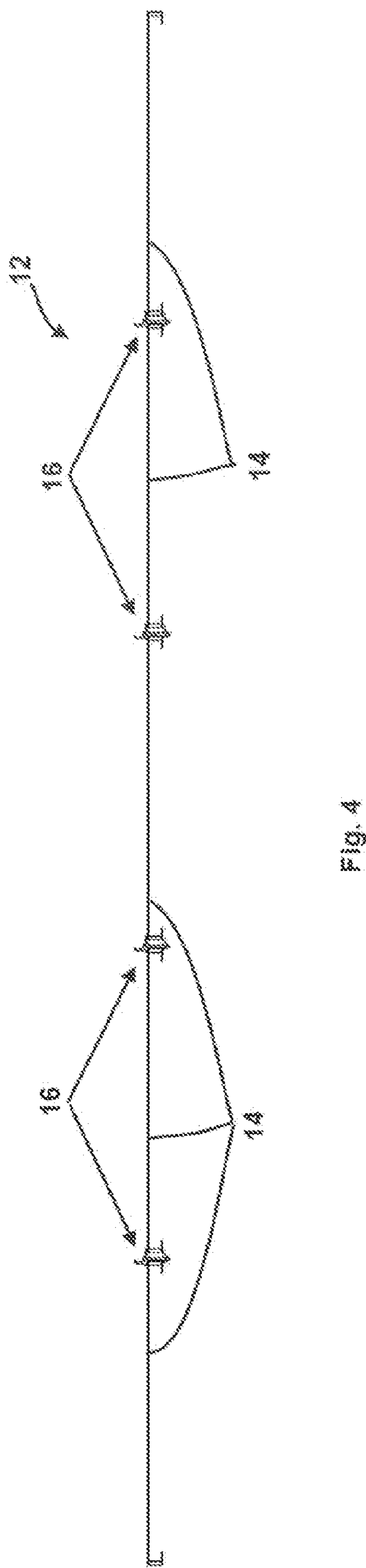
FIG. 4 is a right side view of the solar panel array and snow fences of FIG. 1.
Figure 5:
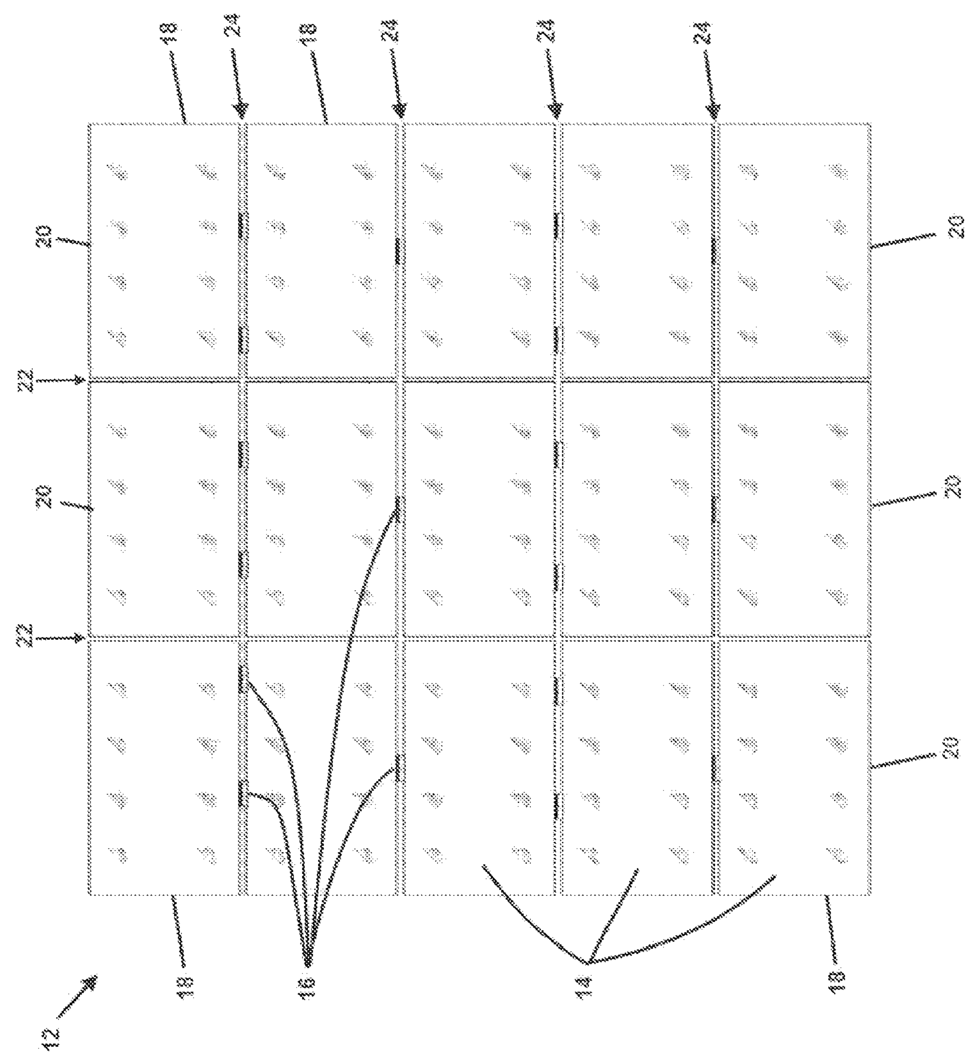
FIG. 5 is a bottom view of the solar panel array and snow fences of FIG. 1.

With reference to FIGS. 3-5, the illustrated solar panels 14 have a substantially rectangular shape having two short sides 18 and two long sides 20. The solar panels 14 define elongate spaces therebetween. Specifically, first elongate spaces 22 are defined between adjacent short sides 18 and second elongate spaces 24 are defined between adjacent long sides 20. In the illustrated embodiment, the second elongate spaces 24 are substantially parallel to an apex of the roof 10. In the illustrated embodiment, the snow fences 16 are positioned in the second elongate spaces 24.

Many of the roof surfaces that the panels are being installed over are asphalt shingles. In regions where snow and ice exist a problem has developed. Prior to installing solar panels on these roofs in snow country, snow would accumulate on the asphalt shingles and slowly melt off due to the fact that the granules on the surface of the shingles created friction that held the snow mass in place. When solar panels are installed over the top of these asphalt shingle surfaces, the smooth and almost frictionless glass panel surface allows the snow mass to dump like an avalanche. This can cause a safety concern and dangerous hazard for the building owner.

There is a need for a device that will allow a mechanic to clamp a device to a solar panel without penetrating the panel thus allowing the mechanic to attach a snow retention device or other hardware to the panel frame. The device can allow a mechanic to attach a stanchion to a solar panel, thus providing an attachment means for supplemental devices such as snow retention, mechanical devices, conduit, electrical related cables, etc.

FIGS. 6-15 illustrate one of the snow fences 16 coupled to adjacent solar panels 14. The solar panels 14 each have a solar panel frame 26 around a perimeter of the respective solar panel 14. The illustrated snow fence 16 includes a coupling device 28 and a bracket 30. The coupling device 28 couples the bracket 30 to the solar panel frames 26. The bracket 30 is substantially L-shaped and has a first portion, a second portion, and a third portion. The first portion rests on top of the solar panel frames 26 and extends substantially parallel to the solar panels 14. The second portion extends upward from the roof and substantially normal with respect to the solar panels 14. The third portion extends downward toward the roof substantially normal with respect to the solar panels 14. The third portion abuts the solar panel frame 26 to inhibit movement of the bracket 30 with respect to the solar panel frame 26.

Figure 6:
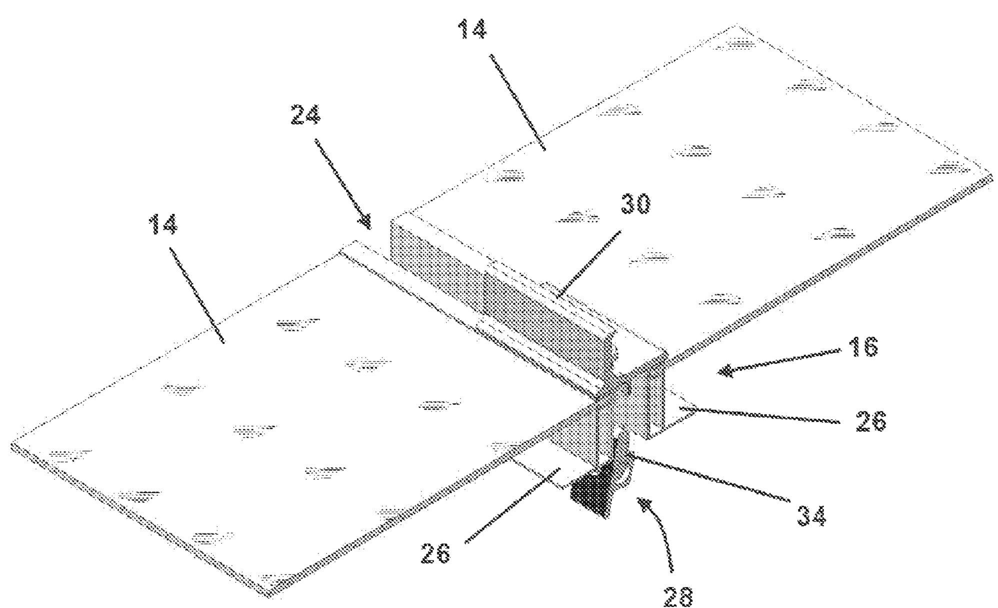
FIG. 6 is a close-up view perspective view of one snow fence mounted on adjacent solar panels with a fastener in a first, unlatched position.
Figure 7:
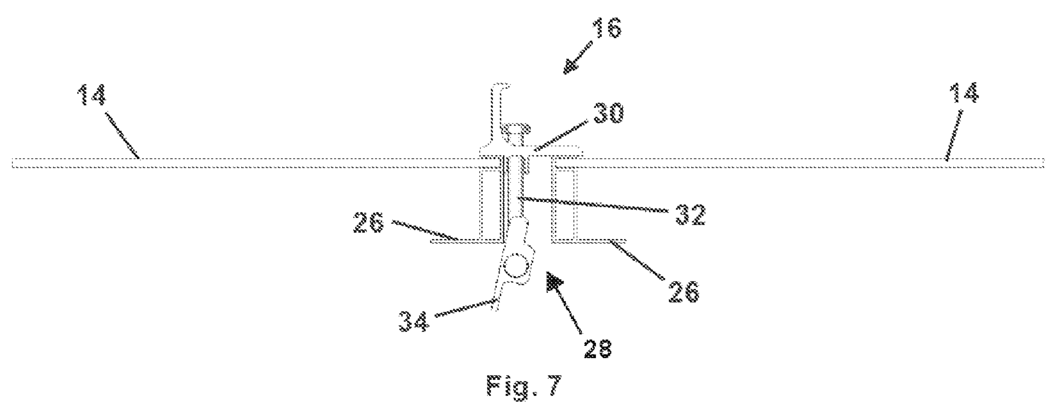
FIG. 7 is a side view of the snow fence mounted on adjacent solar panels of FIG. 6.
Figure 8:
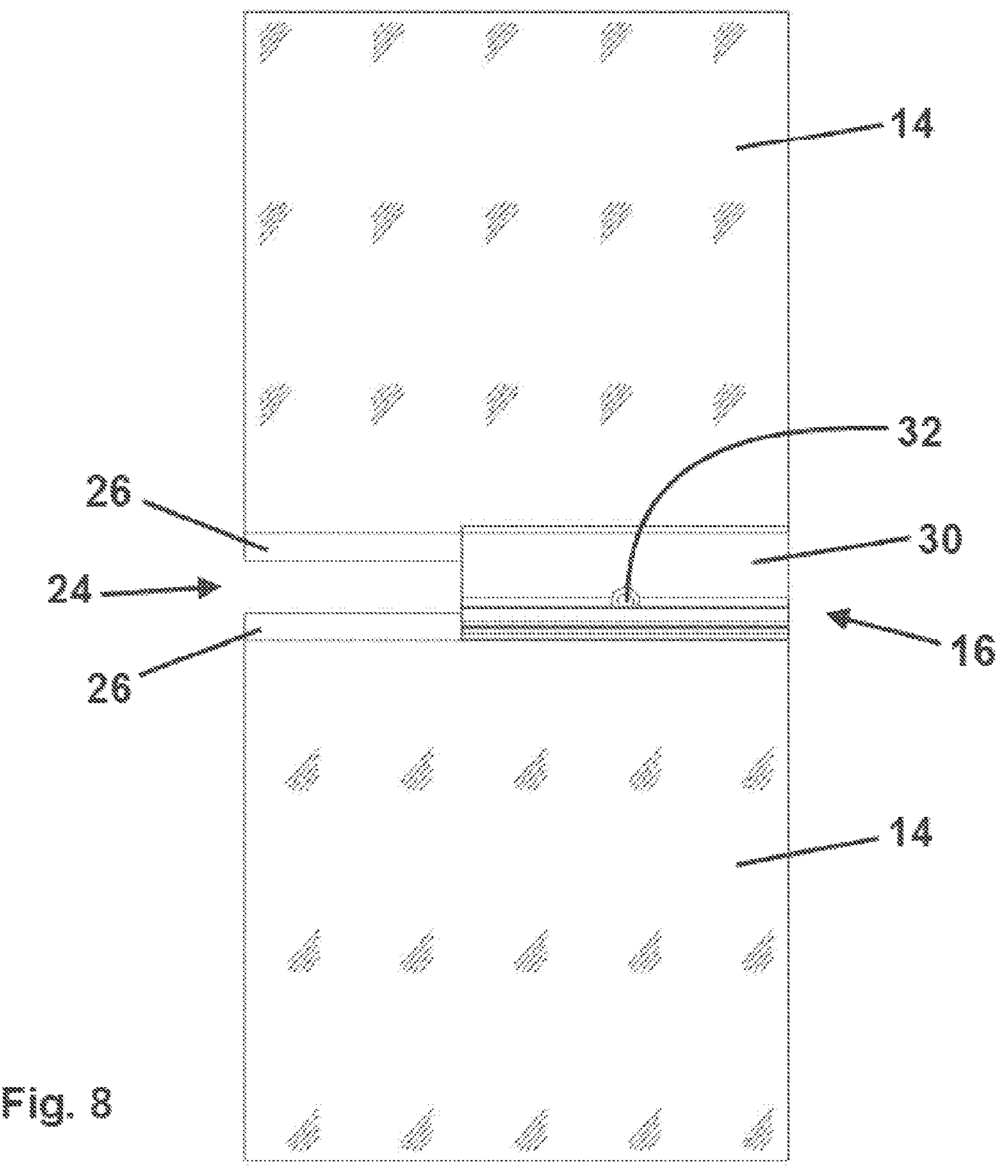
FIG. 8 is a top view of the snow fence mounted on adjacent solar panels of FIG. 6.
Figure 9:
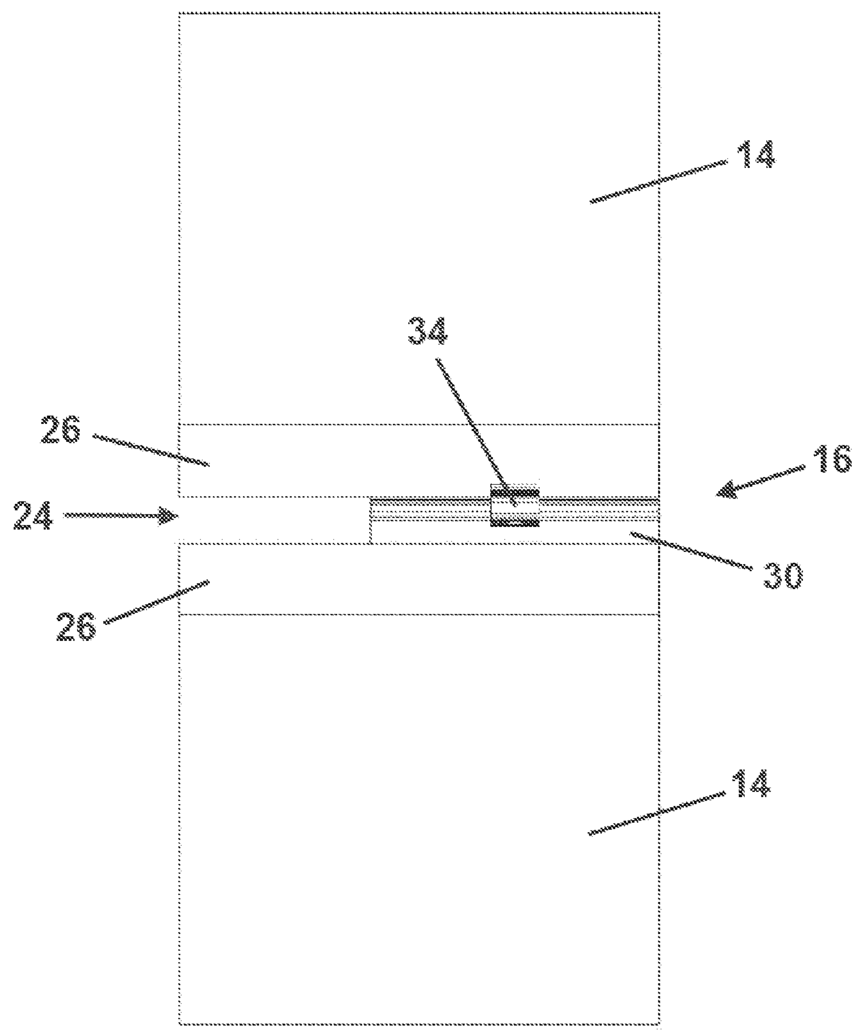
FIG. 9 is a bottom view of the snow fence mounted on adjacent solar panels of FIG. 6.

As best shown in FIG. 7, the coupling device 28 includes an elongate portion 32 and a rotating portion 34. The elongate portion 32 has a first end extending through the first and third portions of the bracket 30 and a distal end to which the rotating portion 34 is coupled. The illustrated coupling device 28 is a bolt that extends between adjacent solar panel frames 26. The rotating portion 34 rotates between an uncoupled position (shown in FIGS. 6-10) and a coupled position (shown in FIGS. 11-15). In some embodiments, the rotating portion 34 can be spring-loaded toward the coupled position, such that, upon insertion of the coupling device 28, once the rotating portion 34 is clear of the solar panel frame 26, the spring biases the rotating portion 34 into the coupled position. The snow fence 16 can be inserted either vertically downward into the second elongate space 24 or can slide along the second elongate space 24 in the longitudinal direction.

The illustrated elongate portion 32 is of sufficient length to couple the rotating portion 34 to the bracket 30 prior to coupling the snow fence 16 to the solar panel frame 26. The coupling device 28 can include a nut and a bolt which can be tightened or loosened to thereby couple and uncouple the coupling device 28 from the solar panel frames 26. The nut and bolt permit a user to adjust the distance between the nut and the rotating portion 34 to account for thickness variations between solar panel frames 26.

Figure 10:
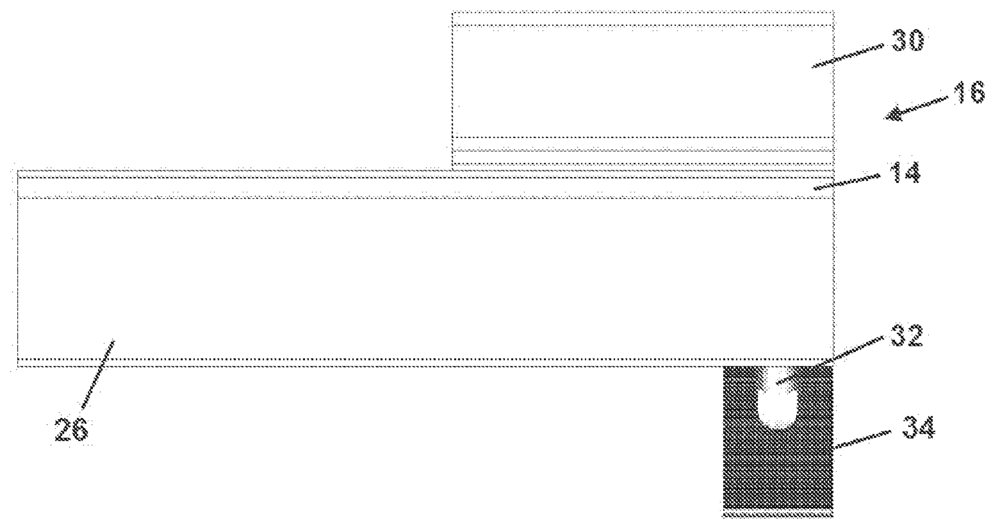
FIG. 10 is an end view of the snow fence mounted on adjacent solar panels of FIG. 6.
Figure 11:
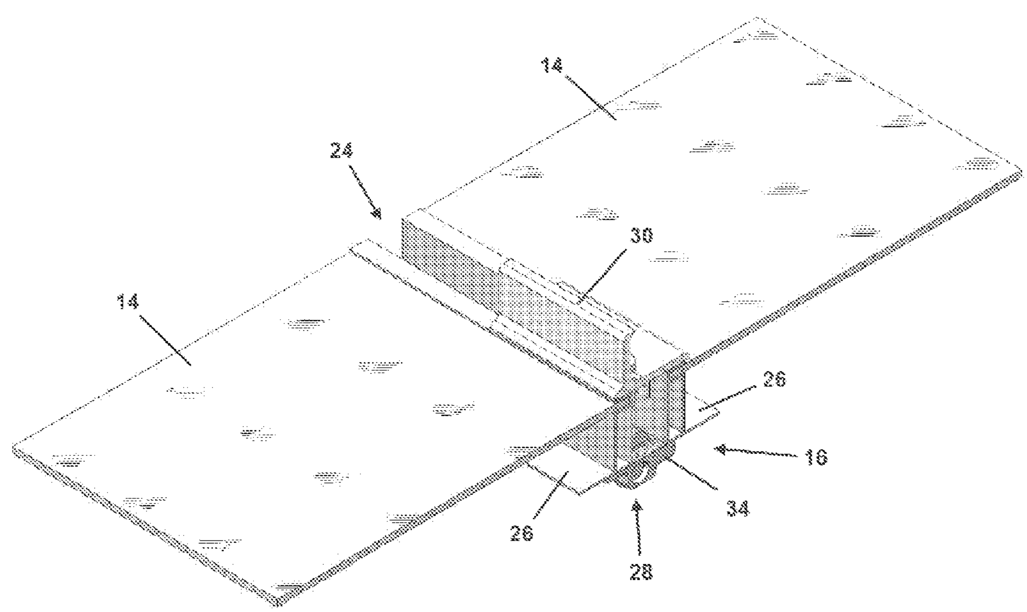
FIG. 11 is a close-up view perspective view of a snow fence according to some embodiments mounted on adjacent solar panels with a fastener in a second, latched position.
Figure 12:
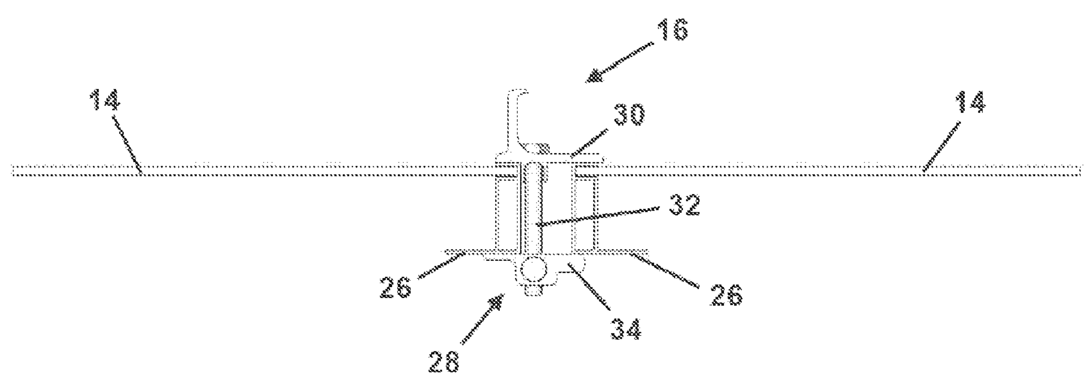
FIG. 12 is a side view of the snow fence mounted on adjacent solar panels of FIG. 11.
Figure 13:
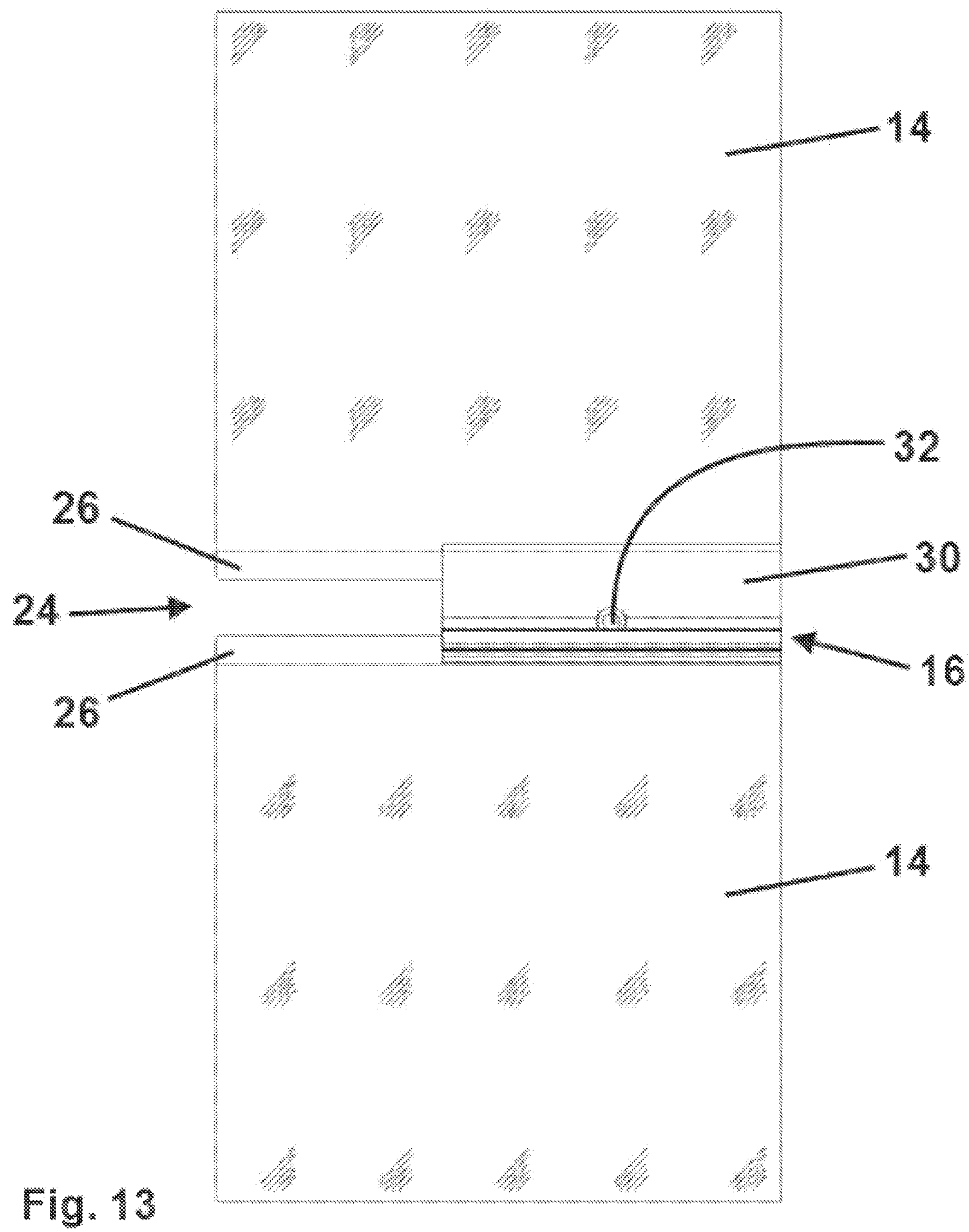
FIG. 13 is a top view of the snow fence mounted on adjacent solar panels of FIG. 11.
Figure 14:
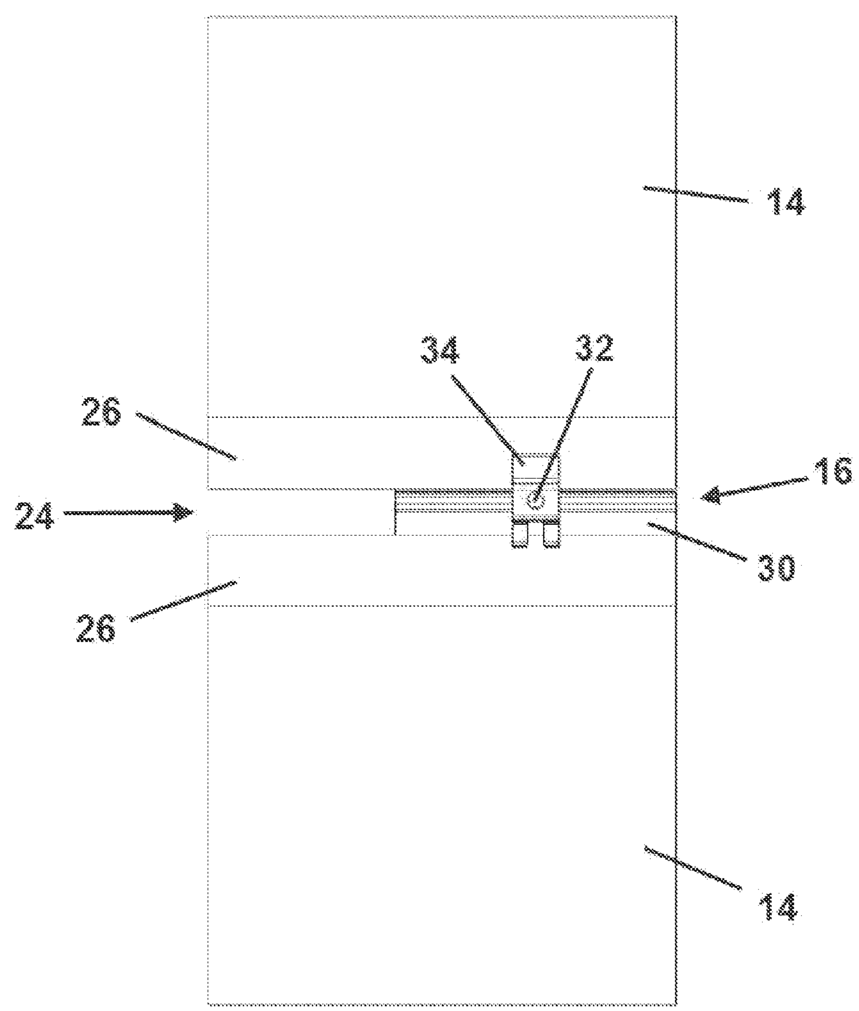
FIG. 14 is a bottom view of the snow fence mounted on adjacent solar panels of FIG. 11.
Figure 15:
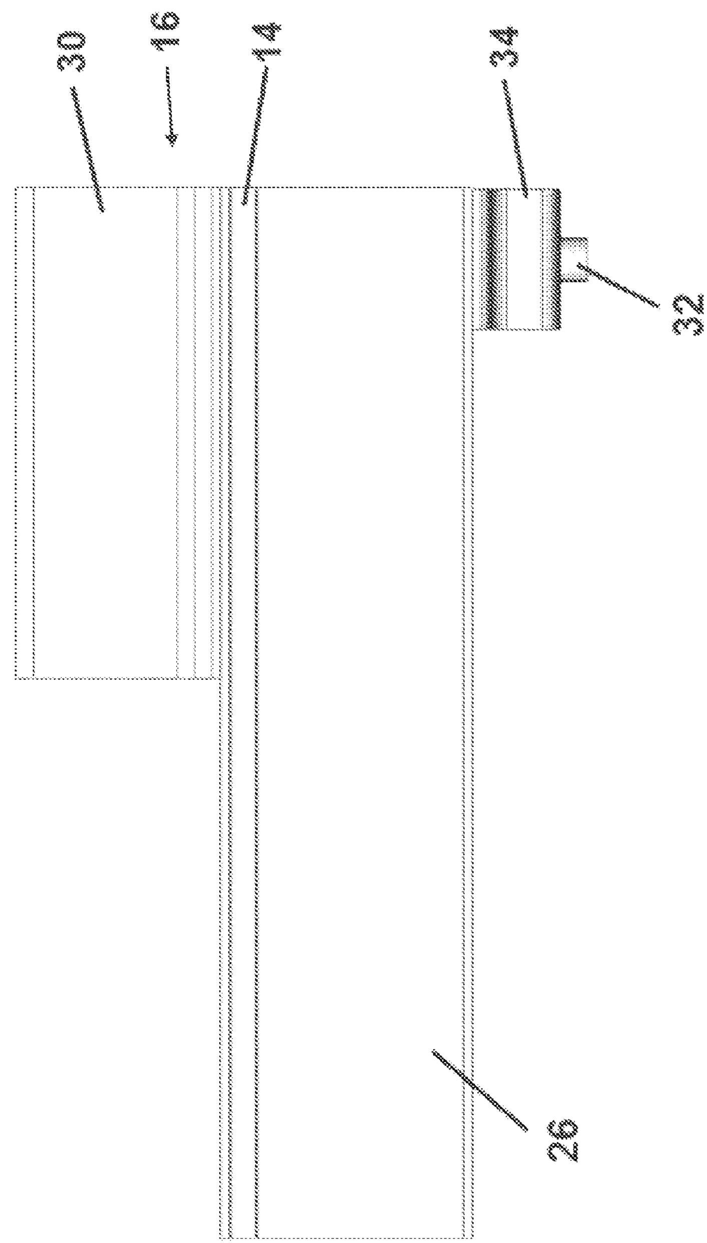
FIG. 15 is an end view of the snow fence mounted on adjacent solar panels of FIG. 11.

In the illustrated embodiment, the portion of the rotating portion 34 that engages the solar panel frames 26 has a roughened surface (see FIGS. 6, 10 and 11). The roughened surface engages the solar panel frames 26 and retain the rotating portion 34 in contact with the solar panel frames 26. In some embodiments, a bottom surface of the bracket 30 may have a textured surface that engages the solar panel frames 26. In some embodiments, the coupling device 28 includes an actuator that is actuated by the user to move the rotating portion 34 into the coupled position. In some embodiments, the coupling device 28 is replaced with a molly bolt or other similar fastener.

Figure 17:
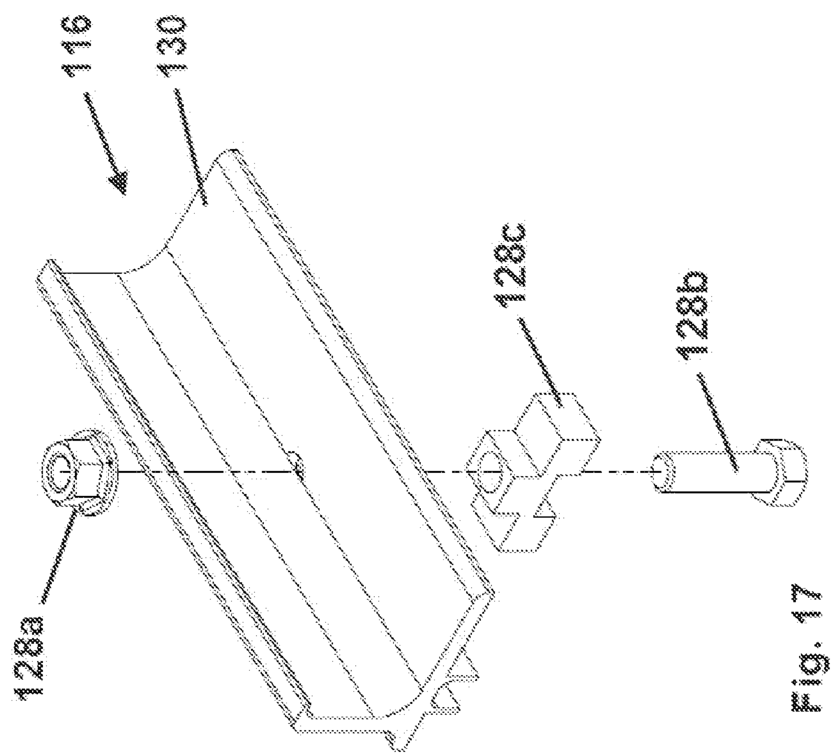
FIG. 17 is an exploded view of the snow fence of FIG. 16.
Figure 16:
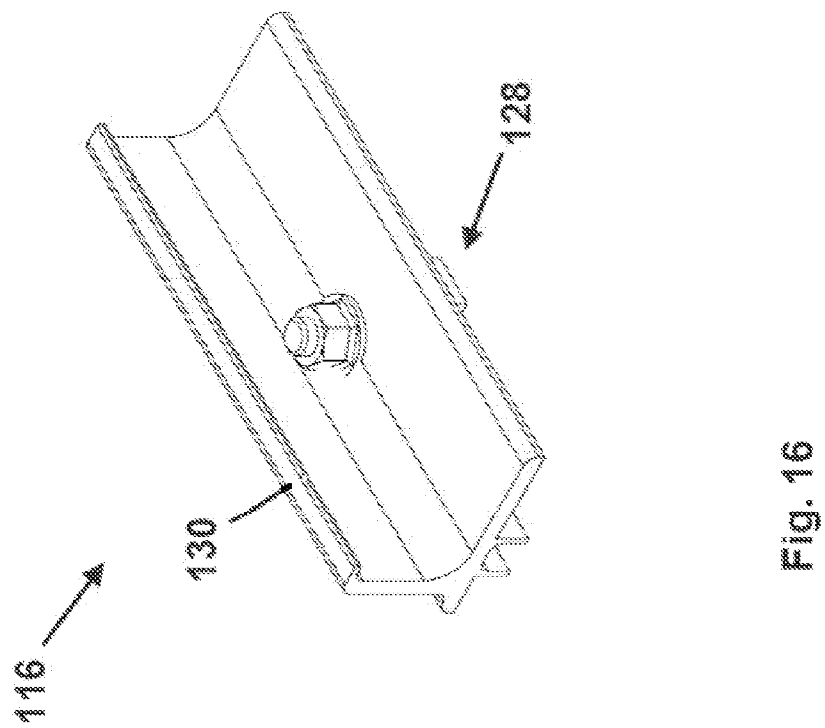
FIG. 16 is a perspective view of a snow fence according to some embodiments of the present invention.

FIGS. 16 and 17 illustrate an alternative snow fence 116 including a coupling portion 128 and a bracket 130. The coupling portion 128 includes a nut 128*a*, a bolt 128*b* and a bottom component 128*c*. The bracket 130 is similar to the bracket 30 illustrated and described herein. The user can couple the bottom component 128*c* to the bracket 130 by holding the bolt 128*b* and the bottom component 128*c* in place under the solar panel frame, inserting the bolt 128*b* through the bracket 130 and coupling the nut 128*a* to the bolt 128*b*. Although no solar panel frame is illustrated in FIGS. 16 and 17, the bracket 130 and the bottom component 128*c* are sized to clamp a solar panel frame therebetween.

Figure 18:
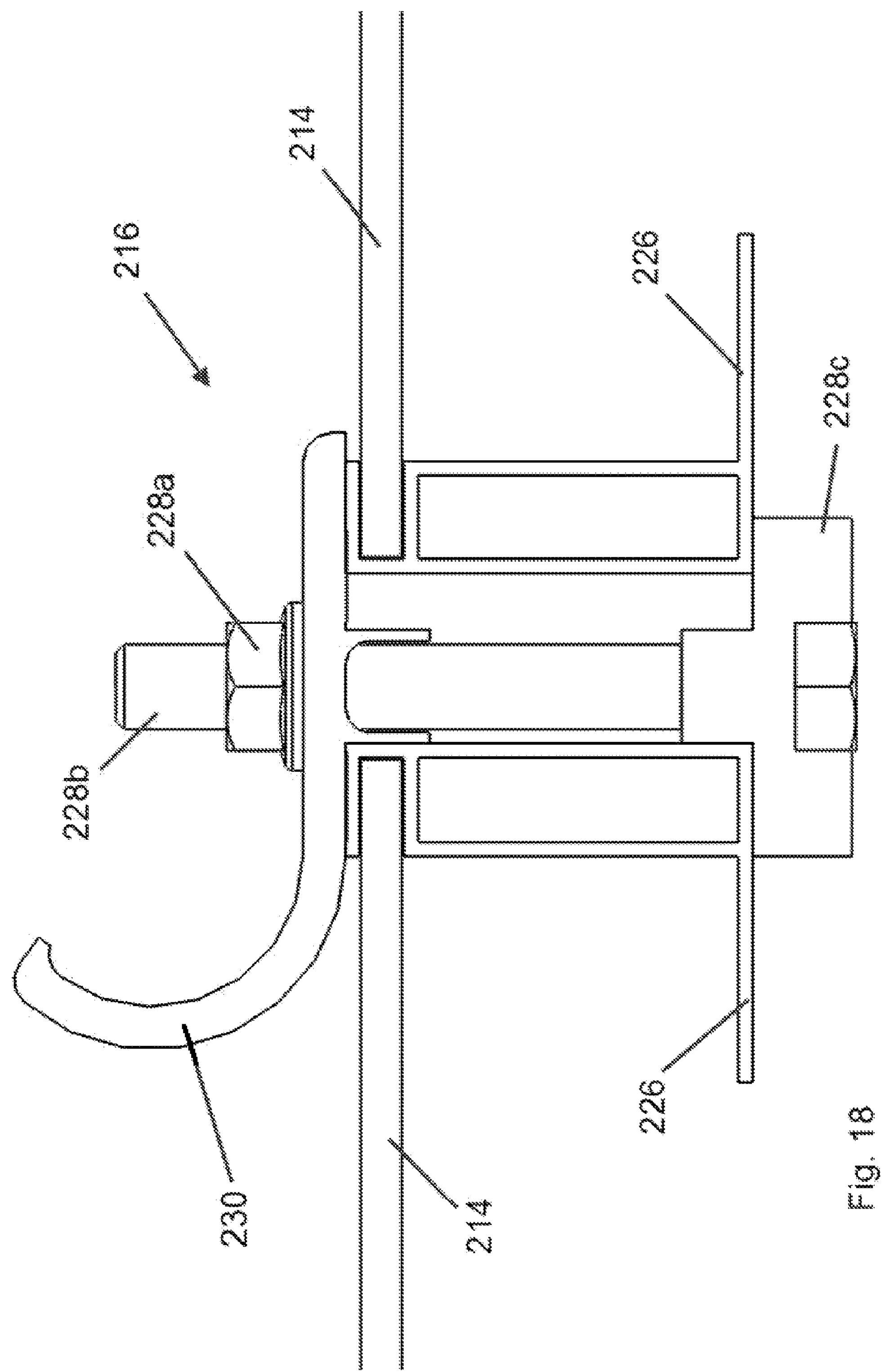
FIG. 18 is a side view of a snow fence according to some embodiments of the present invention.

FIG. 18 illustrates a snow fence 216 including a coupling portion 228 and a bracket 230 coupled to solar panel frames 226 of adjacent solar panels 214. The illustrated coupling portion 228 is similar to the coupling portion 128 and has a nut 228*a*, a bolt 228*b* and a bottom component 228*c*. The bracket 230 has a substantially J-shape in which a straight portion rests on the solar panel frames 226 and a curved portion extends upward (with respect to a roof surface) from the solar panel frames 226. The bracket 230 also includes a third portion extending downwardly (with respect to the roof surface) and abuts the solar panel frame 226 to inhibit movement of the bracket 230 with respect to the solar panel frames 226.

Figure 19:
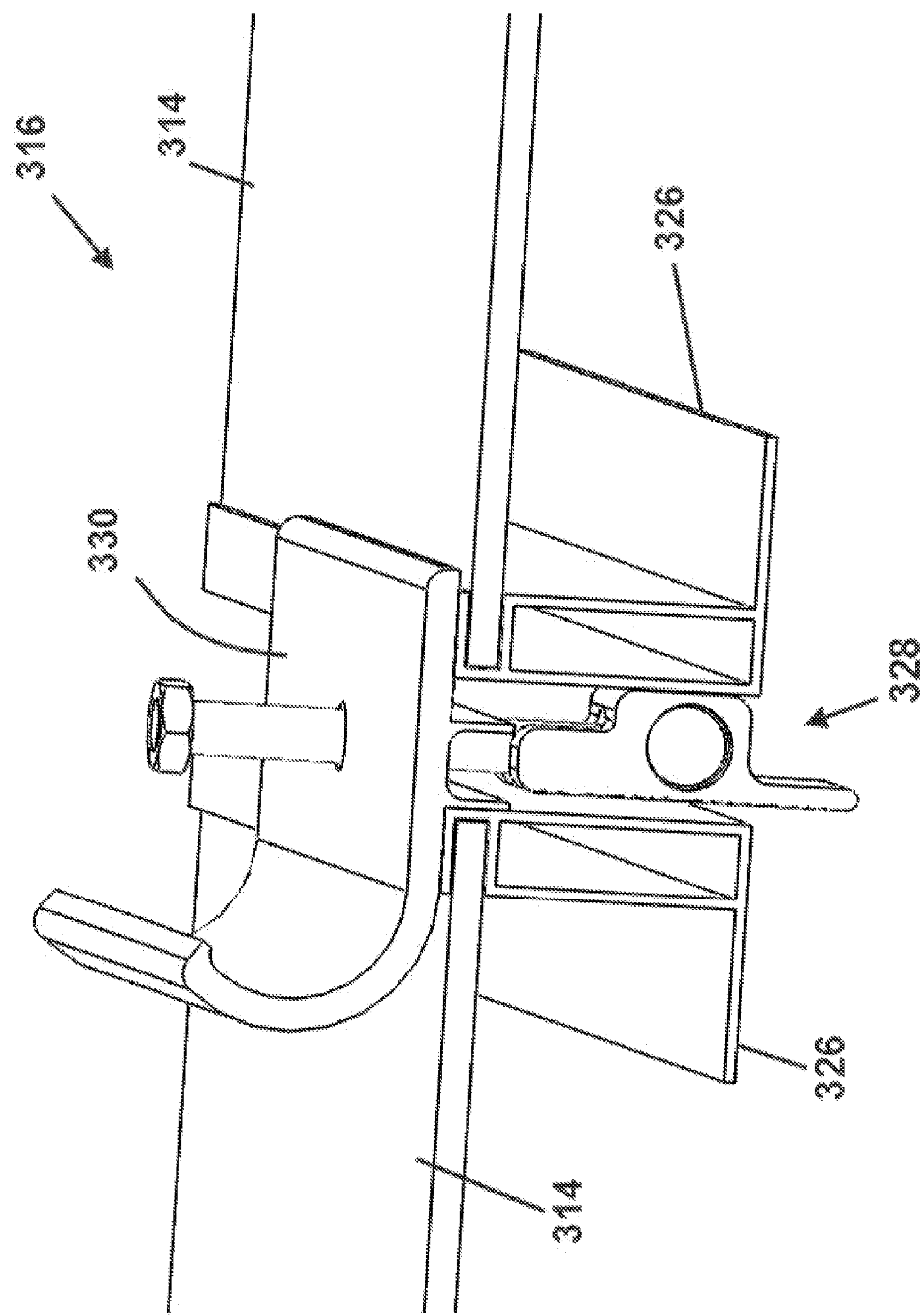
FIG. 19 is a perspective view of a snow fence according to some embodiments mounted on adjacent solar panels with the fastener in the first, unlatched position.
Figure 20:
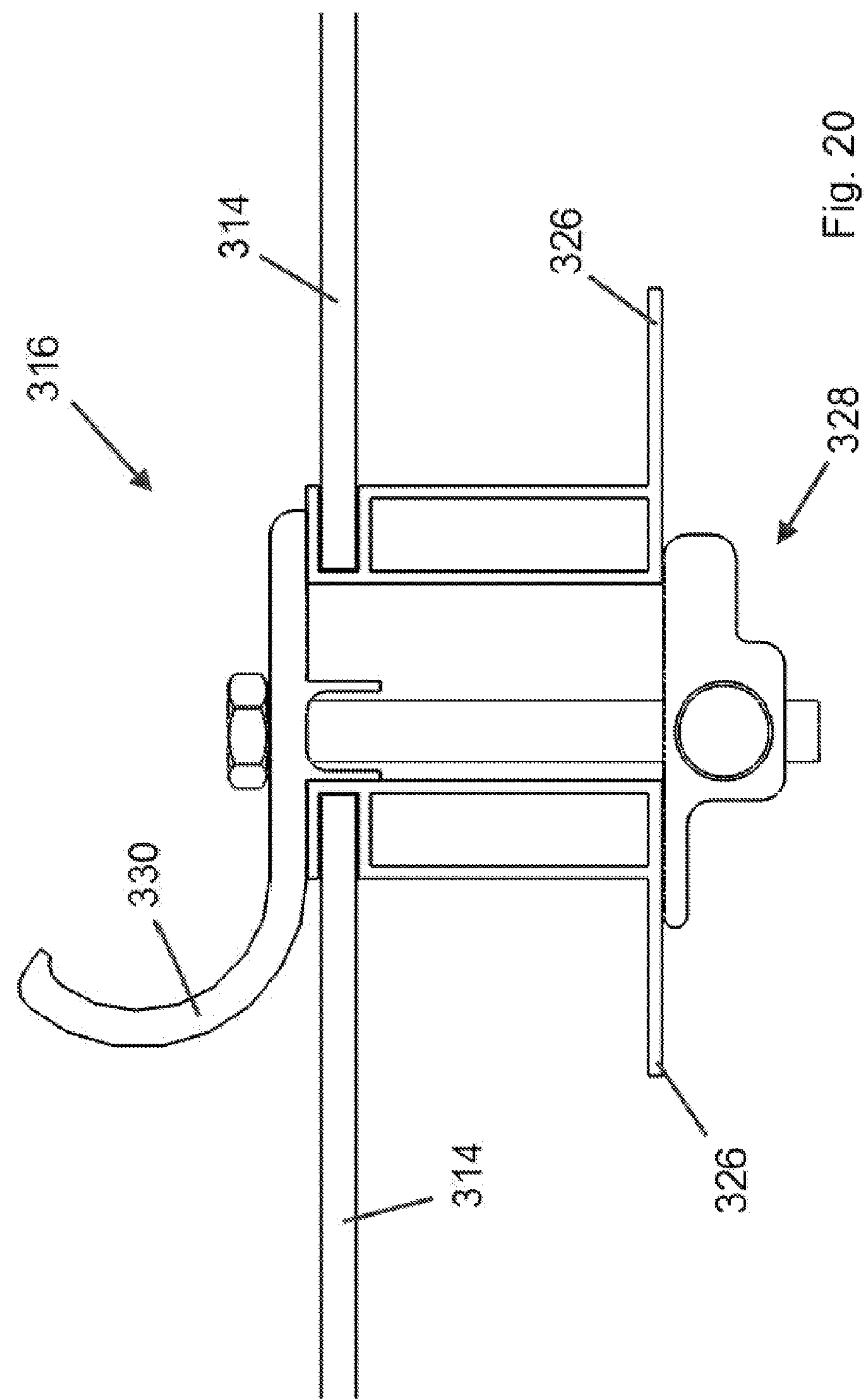
FIG. 20 is a side view of the snow fence of FIG. 19 with the fastener in the second, latched position.

FIGS. 19 and 20 illustrate a snow fence 316 including a coupling portion 328 and a bracket 330 coupled to solar panel frames 326 of adjacent solar panels 314. The coupling portion 328 is similar to the coupling portion 28 illustrated in FIGS. 6-15 and the bracket 330 is similar to the bracket 230 of FIG. 18. Other shapes, configurations and arrangements of brackets are possible and the L-shaped and J-shaped brackets are given by way of example only. Additionally, any suitable fastener or fastener assembly can be utilized to couple the bracket to the solar panel frame and the embodiments described and illustrated herein are given by way of example only.

Figure 21:
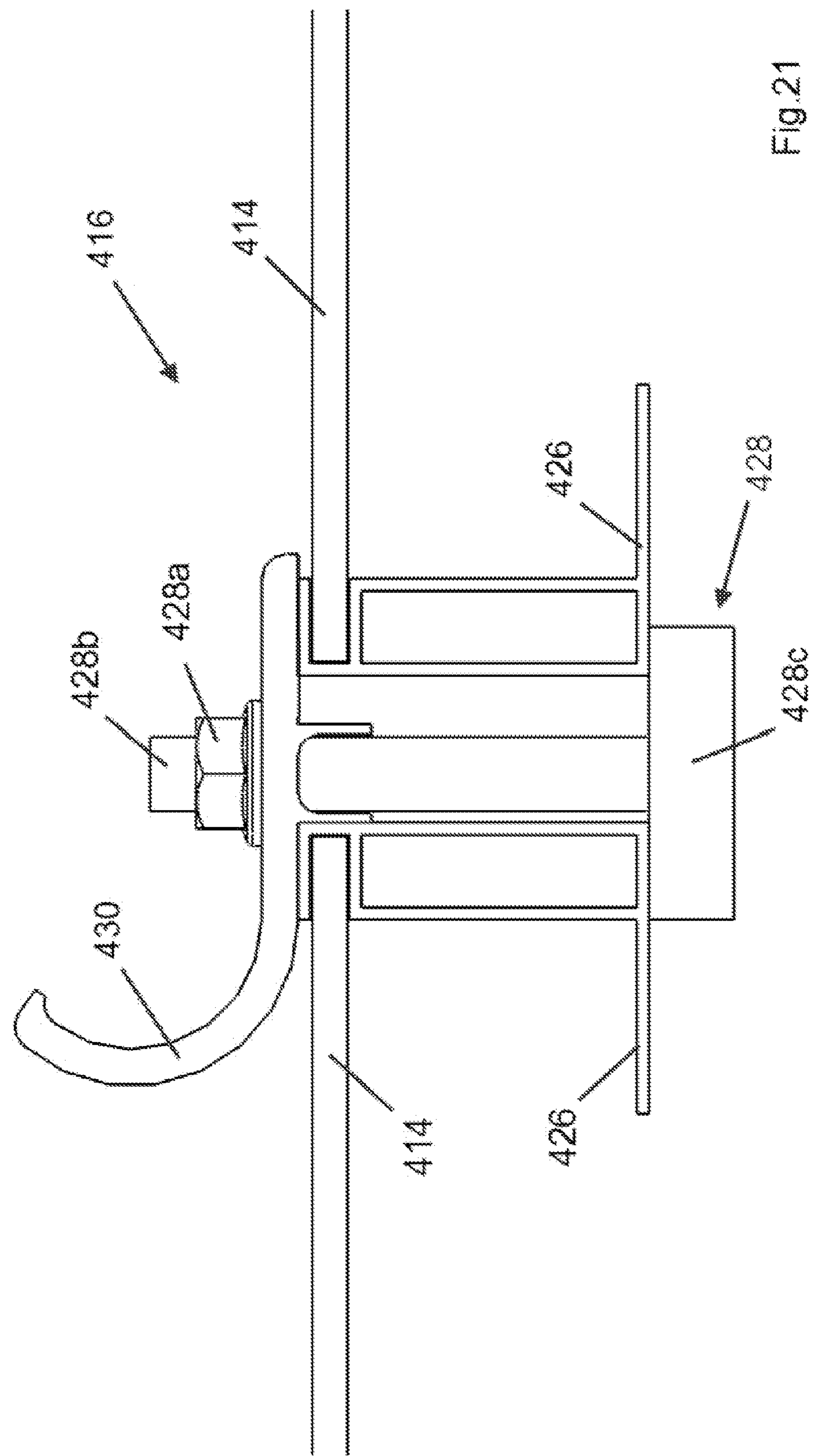
FIG. 21 is side view of a snow fence according to some embodiments of the present invention.

FIG. 21 illustrates a snow fence 416 including a coupling portion 428 and a bracket 430 coupled to solar panel frames 426 of adjacent solar panels 414. The bracket 430 is similar to the brackets 230 and 330 of FIGS. 18-20. The coupling portion 428 includes a nut 428*a*, a bolt 428*b* and a bottom plate 428*c*. The bolt 428*b* and the bottom plate 428*c* can be integrally formed or can be two separate components joined by threads, press-fit or other suitable joining configuration. The bottom plate 428*c* can be long (extending into the page) and extend between multiple snow fences 416 to thereby couple multiple snow fences 416 to the solar panels 414 with only one bottom plate 428*c*.

Any of the brackets 30, 130, 230, 330 and 430 illustrated herein can be used to inhibit the movement of water, snow and ice along the respective solar panels. Additionally, or alternatively, the brackets 30, 130, 230, 330 and 430 can be used for attaching conduit to the solar panels. The brackets 30, 130, 230, 330 and 430 can have any suitable height extending above the respective solar panels. In some configurations, the brackets 30, 130, 230, 330 and 430 are of a size that will not allow the sun to cast a substantial shadow over an uppermost point of the brackets 30, 130, 230, 330 and 430 on the solar panels. Shadows cast on solar panels can diminish the efficiency of the solar panels.

An example is given herein which outlines the steps taken to determine how much shade is present outside the footprint of our solar panel snow guard or guard during the Summer Solstice and Winter Solstice. This example will show that there is minimal shading of the solar array during the peak operating hours of the solstice. Therefore, there is minimal shading of the peak operating hours during the rest of the year. The Summer Solstice Sun Elevation Angle (SSA) is the peak Angle (in degrees) between the sun and horizon during the Summer Solstice, whereas the Winter Solstice Sun Elevation Angle (WSA) is the Peak Angle (in degrees) between the sun and horizon during the Winter Solstice. The Roof Pitch (RP) is the angle of a given roof (in degrees). "S" stands for the length of the shaded portion of the solar array on the down-slope side of the solar panel snow guard during the Summer Solstice and "W" stands for the length of the shaded portion of the solar array on the up-slope side of the solar panel snow guard during the Winter Solstice If a shadow occurs on the Solar Array during the peak of the Summer Solstice, it will only be present on the down-slope side of the solar panel snow guard. Please note that the calculations in this example may not be accurate examples of solstice angles or roof pitch situations, the numbers are given for explanation purposes only.

Figure 22:
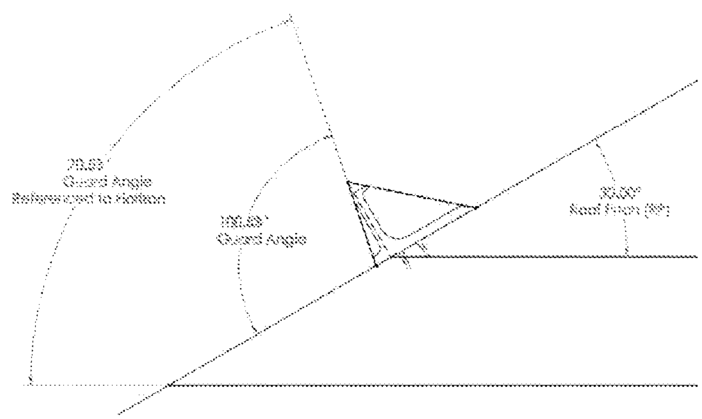
FIGS. 22-25 show various diagrams for calculating the geometry of the snow fences.

FIG. 22 shows the geometry that determines the maximum elevation angle the sun can be before casting a shadow on the down-slope side of the solar panel snow guard. (Down-slope S solar panel snow guard Angle—Roof Pitch) is the maximum elevation angle the sun can be before shading occurs. In this case, if sun elevation angle exceeds 70.53 degrees, shading will occur on the down-slope side of the solar panel snow guard.

Figure 23:
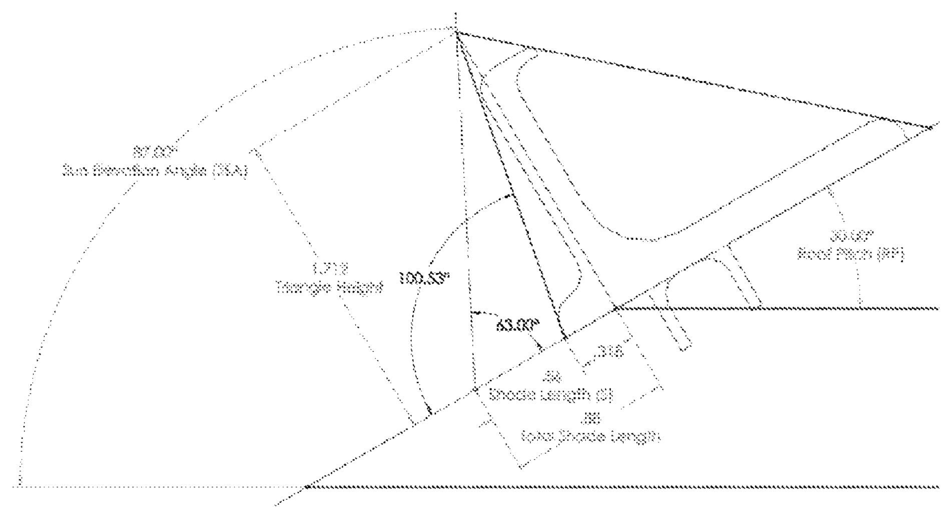

FIG. 23 shows the geometry that determines the sun elevation angle relationship to the roof pitch and solar panel snow guard angle. This angle is the shade angle. The formula is shade angle=180°−(solar panel snow guard angle+roof pitch). The following calculation shows how the 63° shade angle was determined in FIG. 23: 63.00°=180°−(100.53°+30.00°).

The formula for total shade length (1.712" is triangle height) is TAN(180.00°−(100.53°+30.00°))=1.712"/Total Shade Length. Therefore, 1.712"/(TAN(63.00°))=Total Shade Length=0.88". Since the Total Shaded Length includes the portion of the solar panel snow guard that is shaded, the actual Shade Length is calculated using the following formula: Actual Shade Length (S)=Total Shade Length−Shaded Portion of solar panel snow guard. Specifically, the Actual Shade Length (S)=0.88"−0.318". Therefore, the Actual Shade Length (S)=0.56".

If a shadow occurs on the solar array during the peak of the Winter Solstice, it will likely only be present on the up-slope side of the solar panel snow guard. Please note that the calculations in the following pages may not be accurate examples of solstice angles or roof pitch situations, the numbers are given for explanation purposes only.

Figure 24:
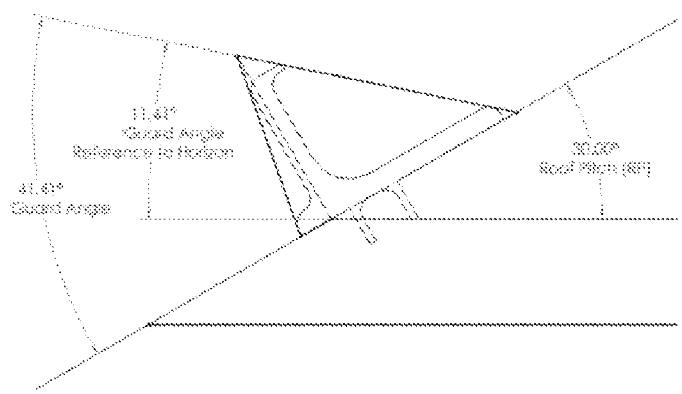

FIG. 24 shows the geometry that determines the lowest point the sun may be before casting a shadow on the up-slope side of the solar panel snow guard. (Up-Slope Snow Guard Angle—Roof Pitch) is the lowest maximum elevation angle the sun can be before shading occurs.

Figure 25:
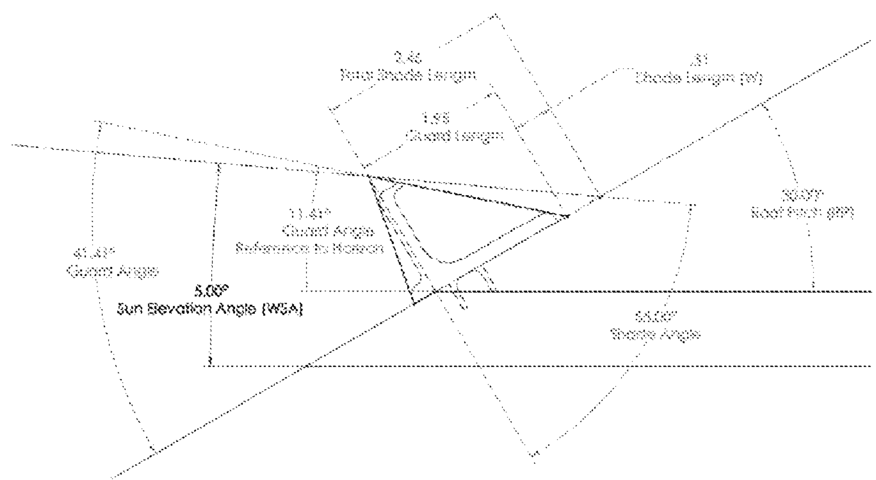

FIG. 25 shows the geometry that determines the Sun Elevation Angle relationship to the Roof Pitch and solar panel snow guard angle. This angle is the shade angle. The formula is Shade Angle=90°−(Sun Elevation Angle+Roof Pitch). The 55.00° shade angle was determined in FIG. 25 with the calculation of 55.00°=90°−(5.00°+30.00°). The formula for total shade length when 1.712" is triangle height is TAN (Shade Angle)=Total Shaded Length/1.712". Therefore, Total Shaded Length=1.712"×TAN(55°)=2.46".

Because the Total Shaded Length includes the portion of the solar panel snow guard that is shaded, the actual Shade Length (w) is calculated using the formula: Actual Shade Length=Total Shade Length—Shaded Portion of solar panel snow guard. Specifically, the Actual Shade Length=2.46"−1.95". Therefore, the Actual Shade Length (w)=0.51".

The sun elevation angle for the Summer and Winter Solstice is determined using the following formulas: Summer Solstice Sun Elevation Angle=90°−(Latitude(degrees)−23.5°) and Winter Solstice Sun Elevation Angle=90°−(Latitude(degrees)+23.5°.

Figure 26A:
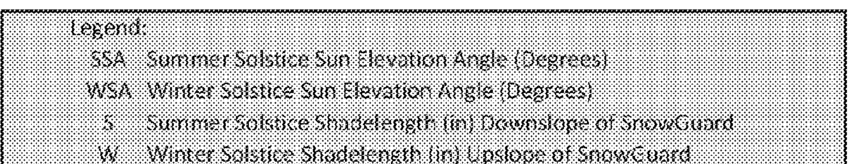
FIG. 26 is a table showing the results of the calculations of FIGS. 22-25.
Figure 27A:
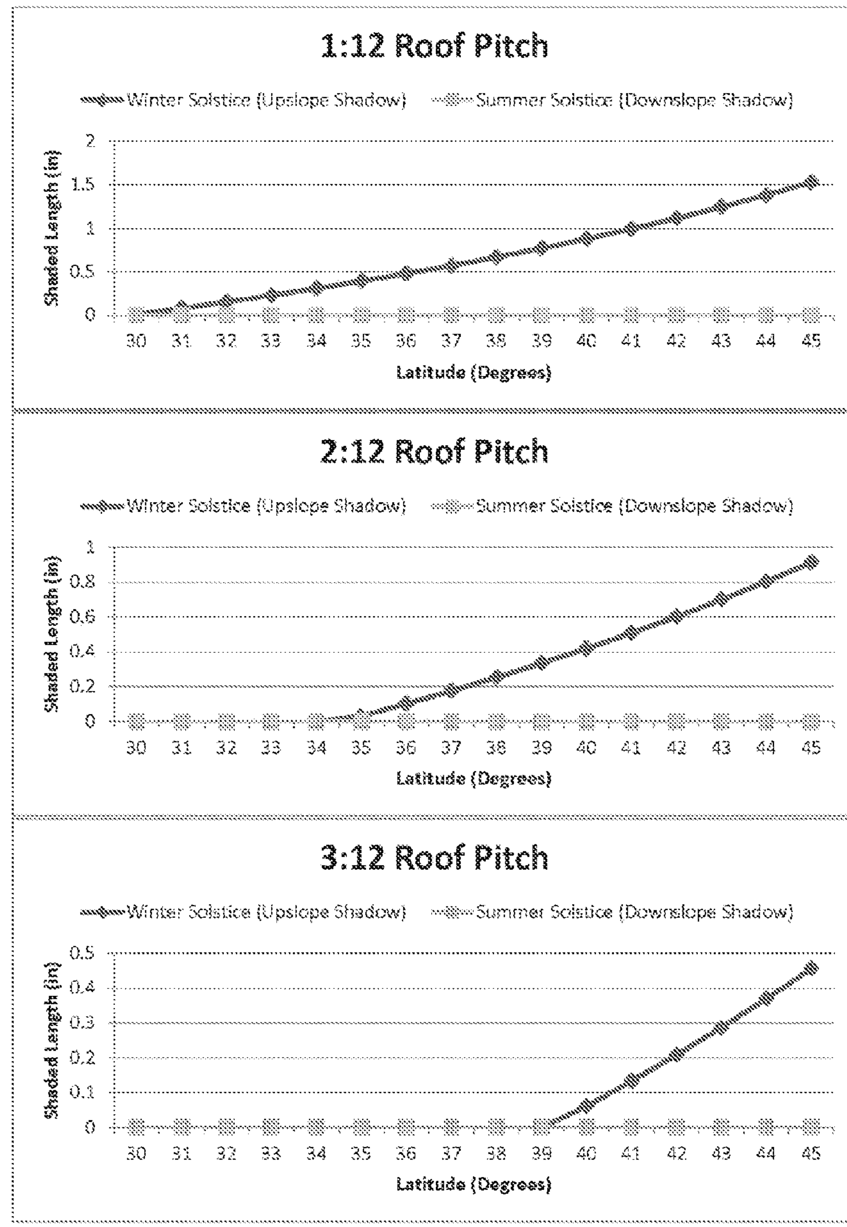
FIG. 27 is a compilation of graphs showing the results of the calculations of FIGS. 22-25.
Figure 27B:
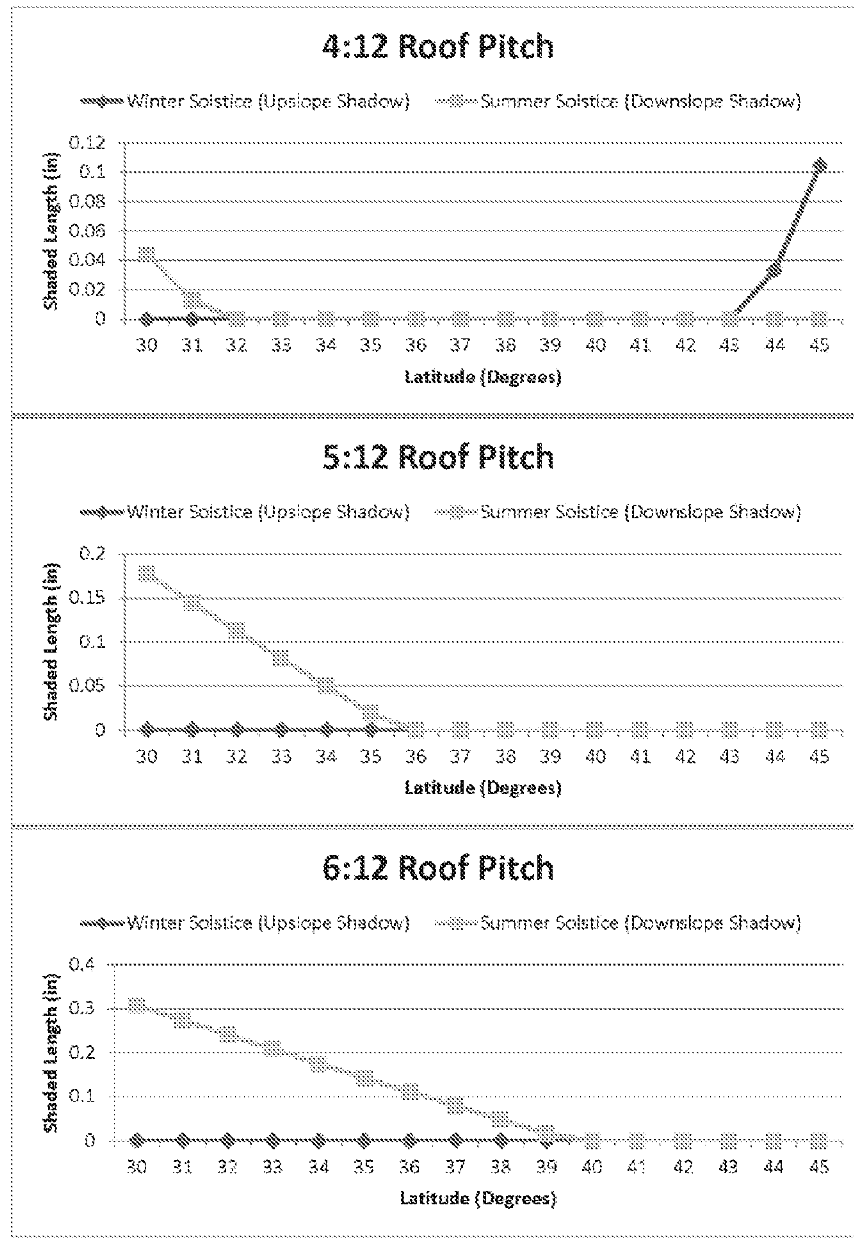
Figure 27C:
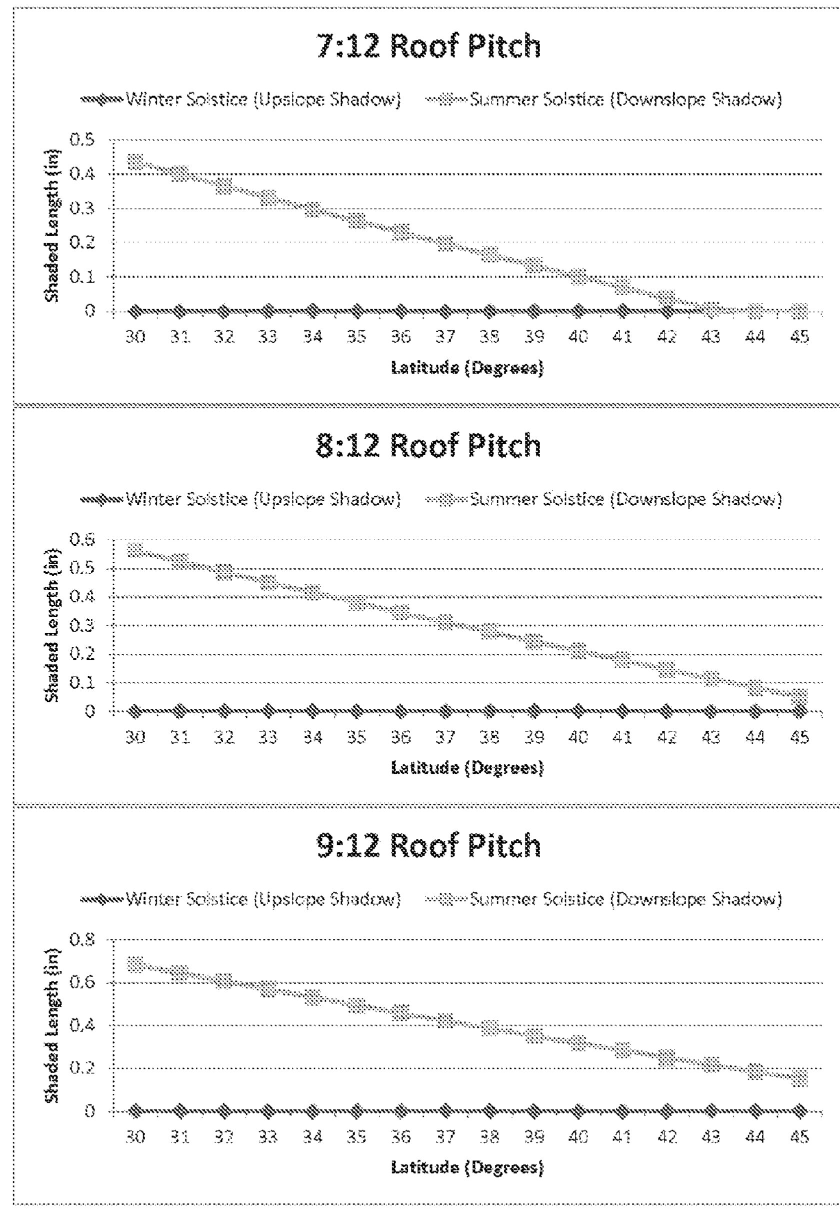
Figure 27D:
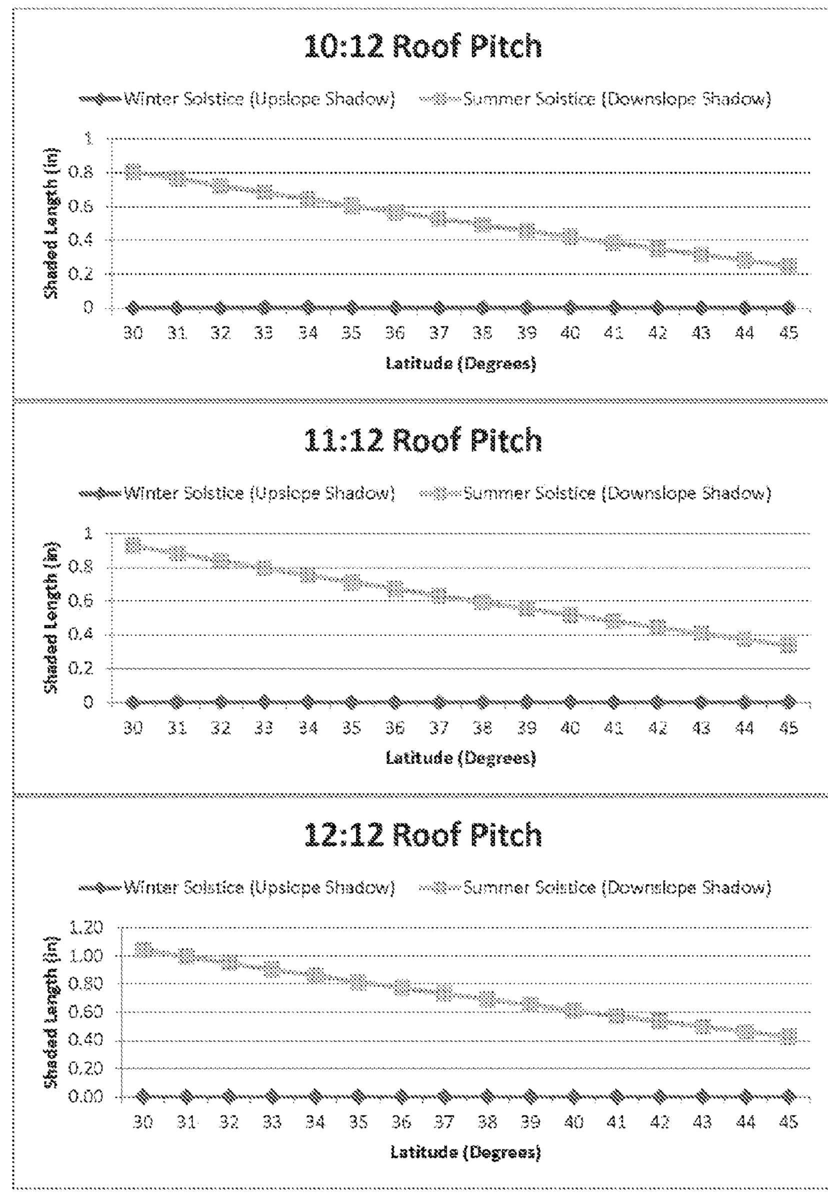

FIG. 26 is a table showing the results of the calculations of FIGS. 22-25. FIG. 27 is a compilation of graphs showing the results of the calculations of FIGS. 22-25.

In some embodiments, the snow fence can be dark in color. In some embodiments, the snow fence is black to absorb more heat and thereby, encourage any snow on the snow fence to melt. The snow fences described and illustrated herein may be used as small individual components that increase friction to inhibit the movement of snow and ice. The snow fences may also be used in continuous runs for the same purpose or to function as a rain water diverter.

Figure 28:
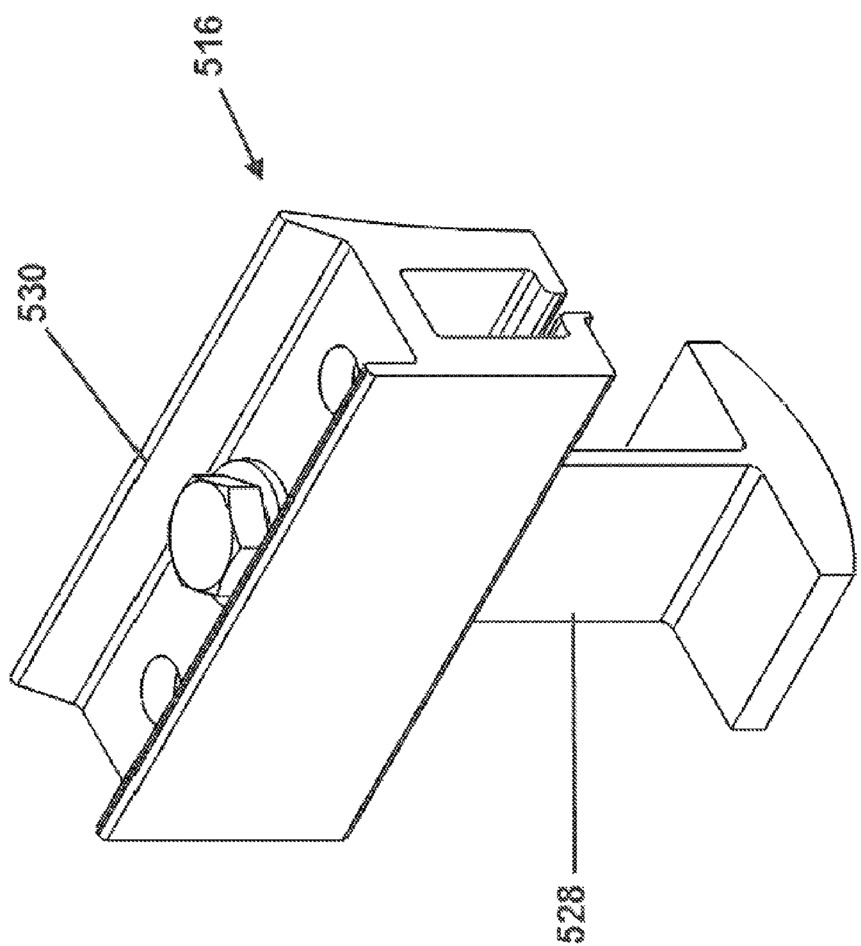
FIG. 28 is a perspective view of a snow fence according to some embodiments of the present invention.
Figure 29:
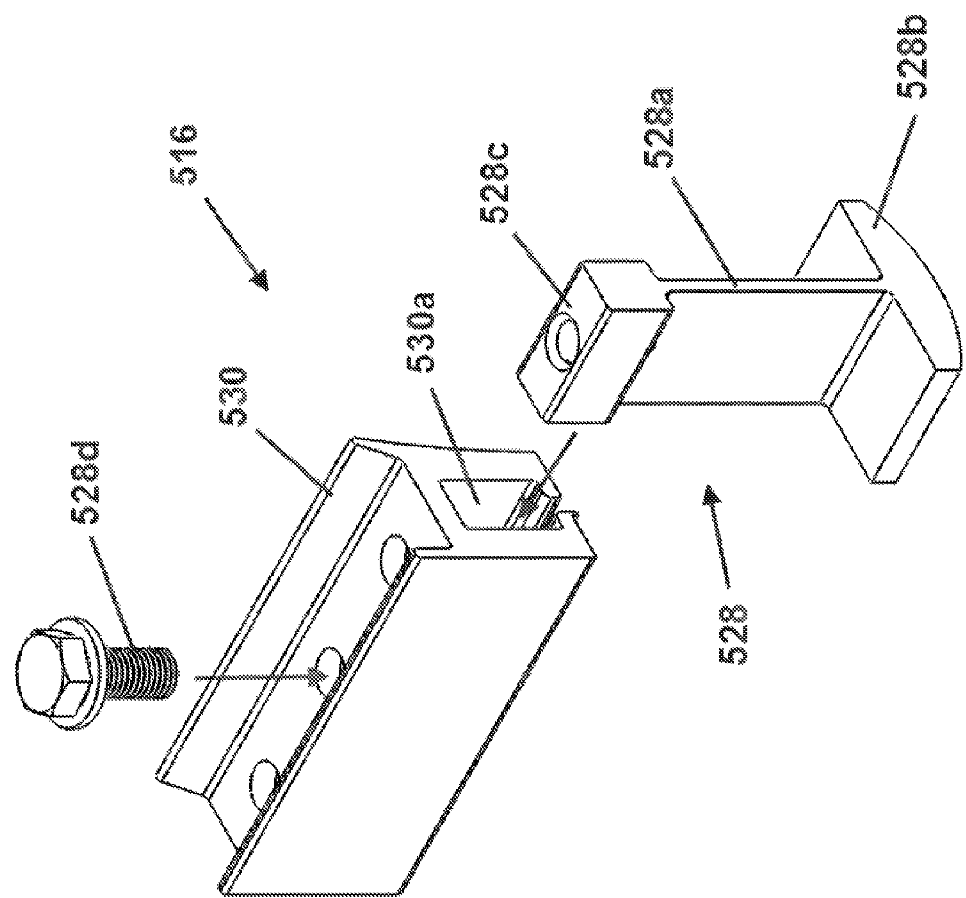
FIG. 29 is an exploded view of the snow fence of FIG. 28.
Figure 30:
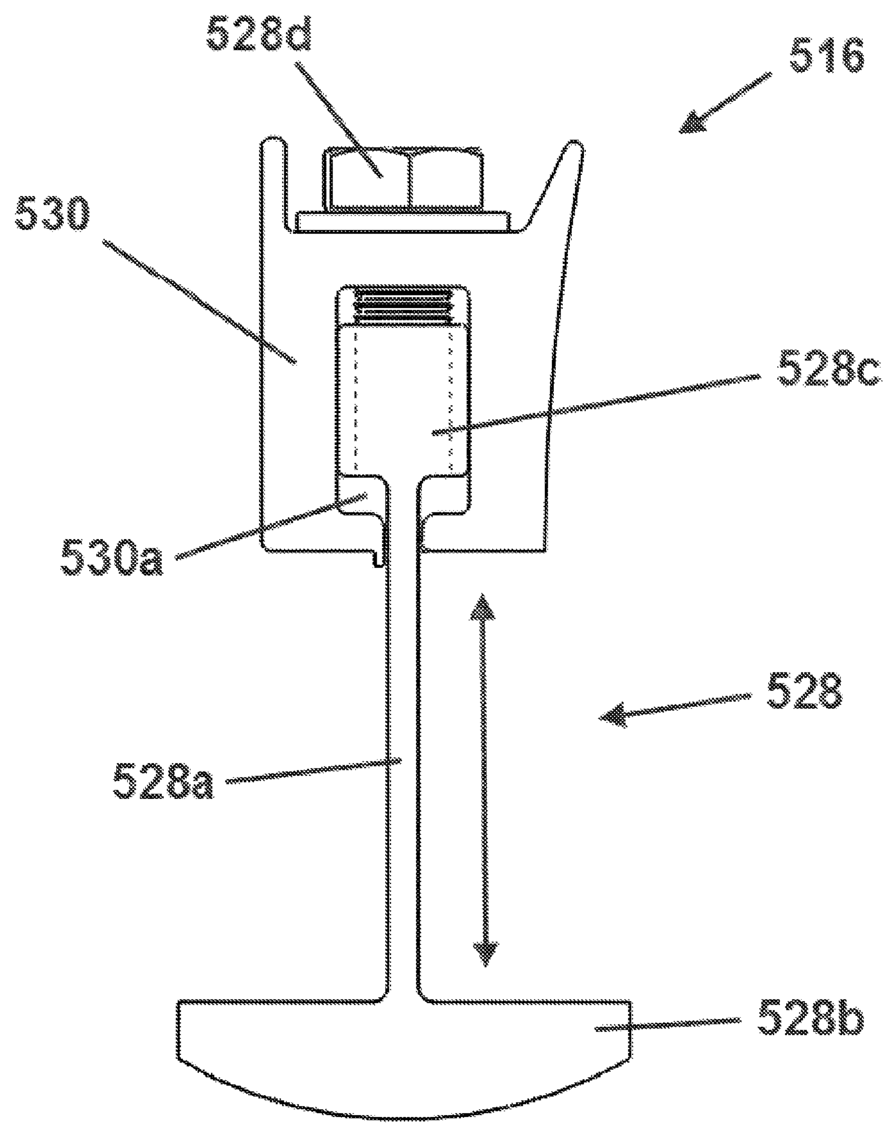
FIG. 30 is a side view of the snow fence of FIGS. 28 and 29.

FIGS. 28-30 illustrate a snow fence 516 including a coupling portion 528 and a bracket 530 couplable to solar panel frames of adjacent solar panels. The illustrated coupling portion 528 includes an elongate shaft 528*a*, a bottom wide portion 528*b*, a top wide portion 528*c* and a fastener 528*d*. The bracket 530 has a channel 530*a* sized to receive the top wide portion 528*c*. The elongate shaft 528*a* is sized to fit between adjacent solar panels and the bottom wide portion 528*b* is sized to engage a bottom side of the solar panels. The bracket 530 rests on top of the solar panels. The elongate shaft 528*a* permits the snow fence 516 to slide along a gap between adjacent solar panels to a desired location. The fastener 528*d* permits the user to move the top wide portion 528*c* vertically in the channel 530*a* (see FIG. 30) to thereby adjust the distance between a bottom of the bracket 530 and the bottom wide portion 528*b*. Therefore, the snow fence 516 can fixedly engage the solar panels.

Figure 31:
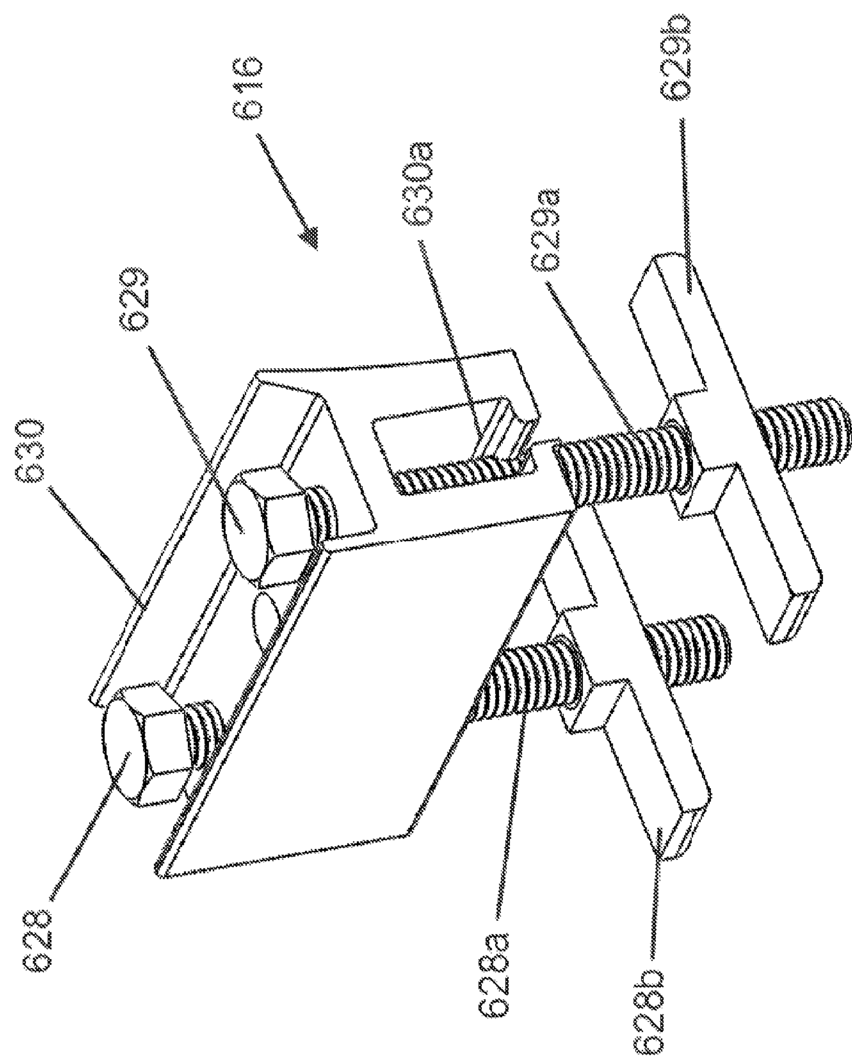
FIG. 31 is a perspective view of a snow fence according to some embodiments of the present invention.

FIG. 31 illustrates a snow fence 616 including first and second coupling portions 628, 629 and a bracket 630 couplable to solar panel frames of adjacent solar panels. The bracket 630 is substantially identical to the bracket 530 of FIGS. 28-30. The first and second coupling portions 628, 629 include a fastener 628*a*, 629*a* and an elongate nut 628*b*, 629*b*. The bracket 630 has a channel 630*a* sized to receive the fasteners 628*a*, 629*a*. The elongate nuts 628*b*, 629*b* are threaded onto the respective fastener 628*a*, 628*b* to adjust a distance between the elongate nuts 628*b*, 629*b* and a bottom of the bracket 630. The elongate nuts 628*b*, 629*b* can engage a solar panel bottom portion and the bottom of the bracket 630 can engage a solar panel top portion to thereby clamp the snow fence 616 onto the solar panel.

Additionally, any suitable fastener or fastener assembly can be utilized to couple the bracket to the solar panel frame and the embodiments described and illustrated herein are given by way of example only.

An example given herein outlines the steps taken to determine how much shade is present outside the footprint of our solar panel snow guard or guard during daylight hours in 30 minute increments. This information will show that there is minimal shading of the solar array during the peak operating hours throughout the year for various latitudes. The Sun Elevation Angle (SEA) is the peak Angle (in degrees) between the sun and horizon. The Roof Pitch (RP) is the angle of a given roof (in degrees). "Down" as used in FIGS. 36-39 is the length of the shaded portion of the solar array on the down-slope side of the guard. "Up" as used in FIGS. 36-39 is the length of the shaded portion of the solar array on the Up-Slope side of the guard.

The following formulas and description show how large the Down-Slope Shaded Length is. Please note that the calculations in the following pages may not be accurate examples of solar elevation angles or roof pitch situations, the numbers are given for explanation purposes only.

Figure 32:
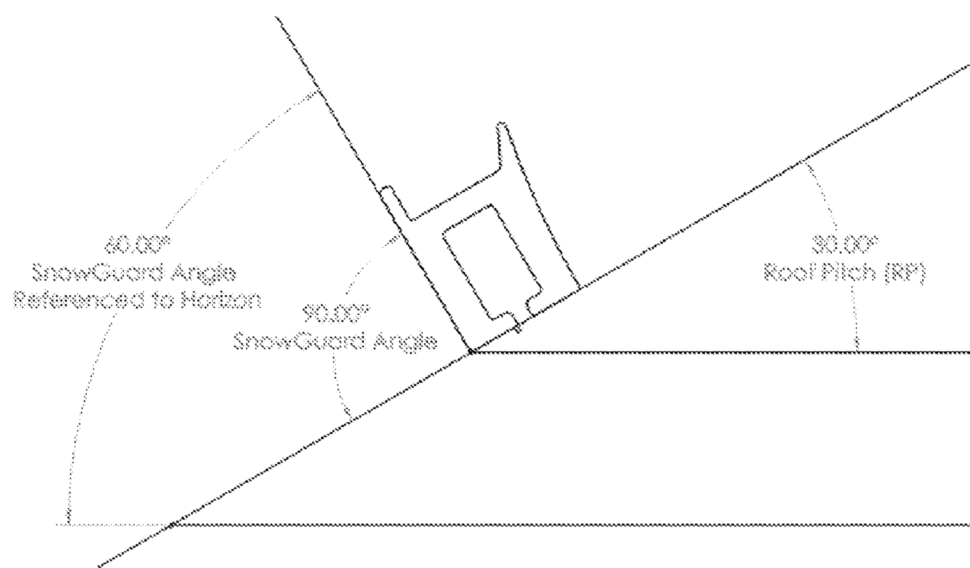
FIGS. 32-35 show various diagrams for calculating the geometry of the snow fences.

FIG. 32 shows the geometry that determines the maximum elevation angle the sun can be before casting a shadow on the down-slope side of the guard. (Down-Slope Snow Guard Angle—Roof Pitch) is the maximum elevation angle the sun can be before shading occurs. In this case, if sun elevation angle exceeds 60 degrees, shading will occur on the down-slope side of the Solar Snow Guard.

Figure 33:
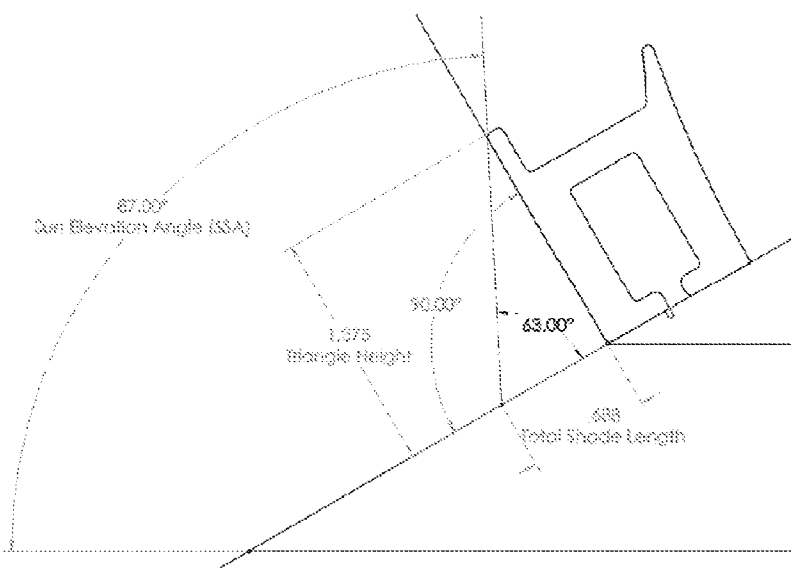

FIG. 33 shows the geometry that determines the Sun Elevation Angle relationship to the Roof Pitch and Snow Guard Angle. This angle is the shade angle. The formula is Shade Angle=180°−(Snow Guard Angle+Roof Pitch). The 63° shade angle was determined in FIG. 33 with the calculation of 63.00°=180°−(87.00° (SEA)+30.00° (RP)).

The Formula For total shade length if 1.375" is the triangle height, TAN(180.00°−(87.00°+30.00°))=1.375"/Total Shade Length. Therefore, 1.375"/(TAN(63.00°))=Total Shade Length=0.70". Due to the rounded corners of the part, calculation tolerance is +/−0.015".

The following formulas and description solve for the Solar Snow Guard Up-Slope Shaded Distance if applicable. Please note that the calculations in the following pages may not be accurate examples of solar elevation angles or roof pitch situations, the numbers are given for explanation purposes only.

Figure 34:
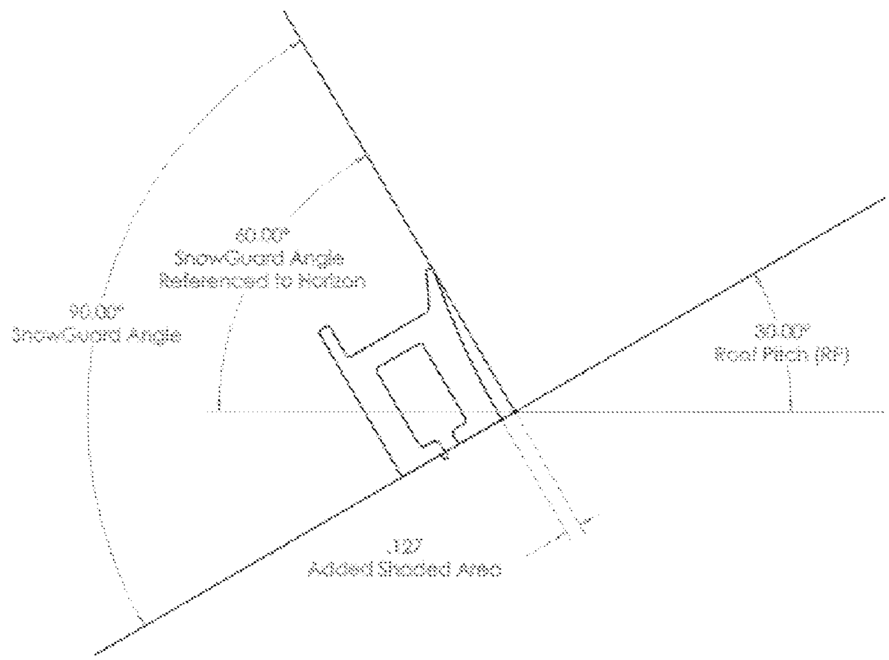

FIG. 34 shows the geometry that determines the lowest point the sun may be before casting a shadow on the up-slope side of the Solar Snow Guard. (Up-Slope Snow Guard Angle—Roof Pitch) is the lowest maximum elevation angle the sun can be before shading occurs.

Figure 35:
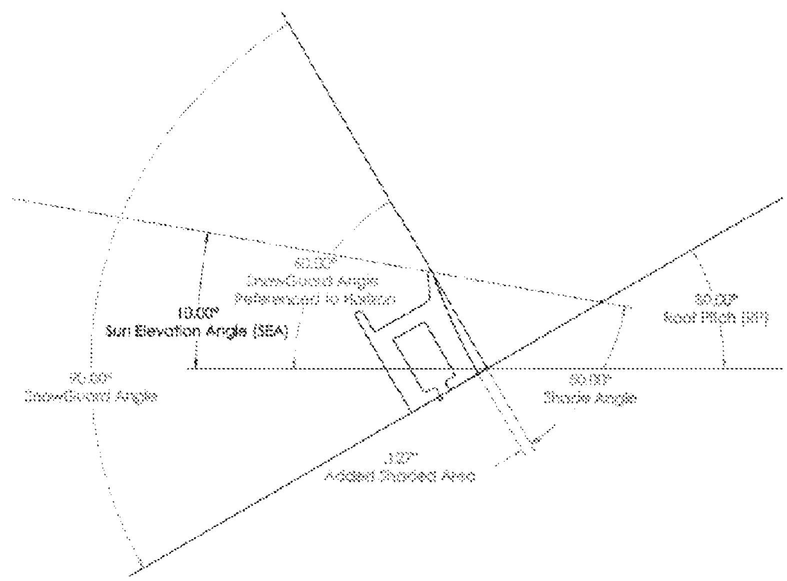
Figure 40:
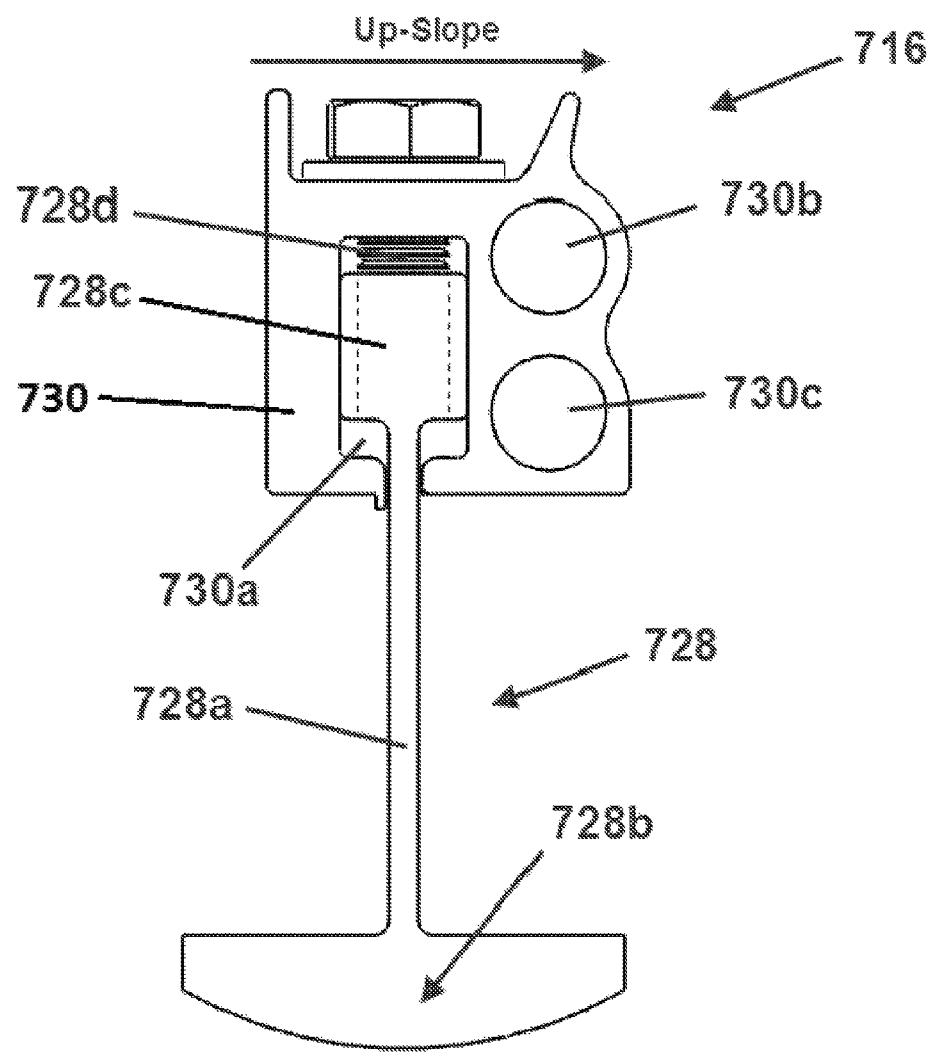
FIG. 40 is a side view of a snow fence according to some embodiments of the present invention.
Figure 41:
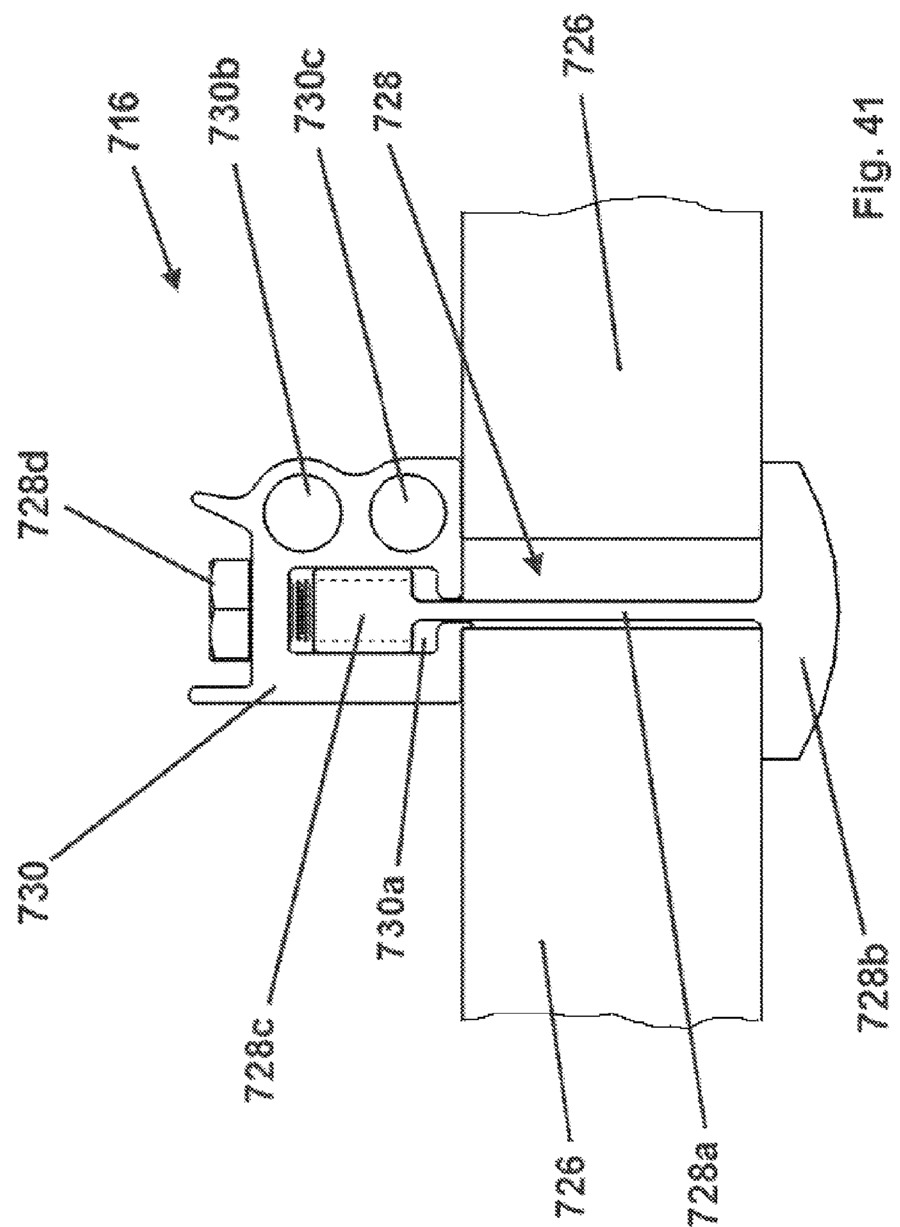
FIG. 41 is a side view of the snow fence of FIG. 40 when installed on solar panels.
Figure 42:
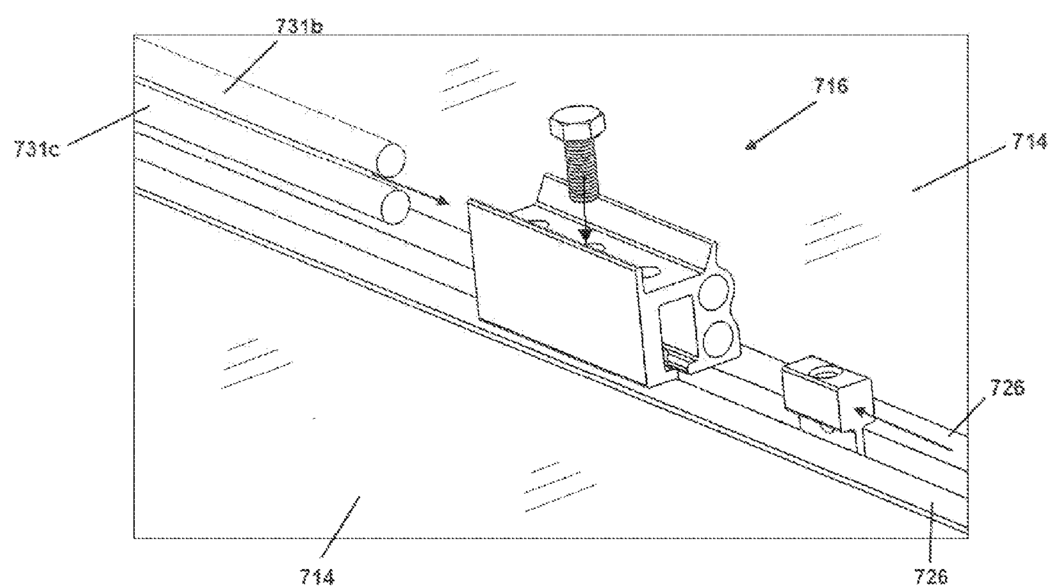
FIG. 42 is an exploded view of the snow fence of FIGS. 40-41.
Figure 43:
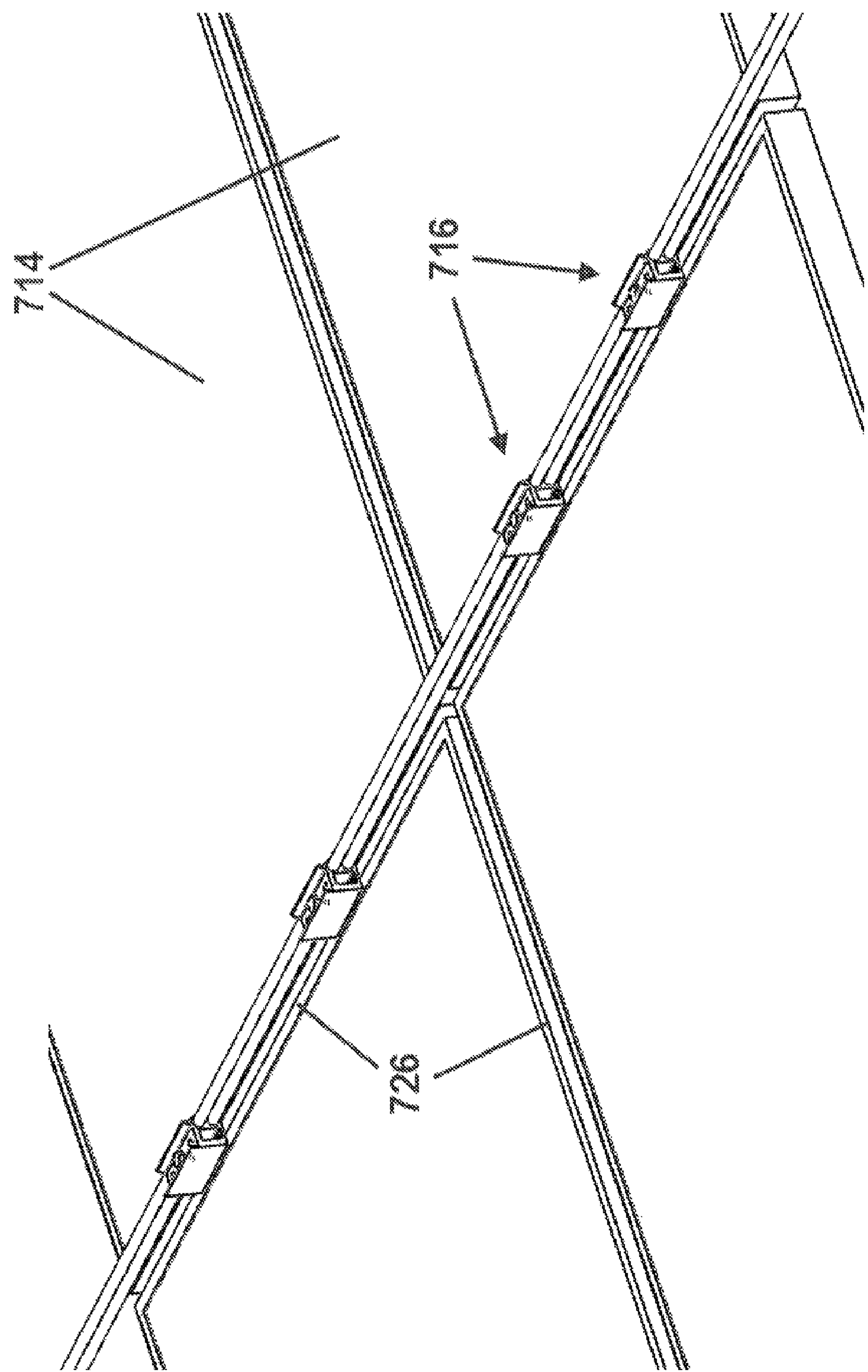
FIG. 43 is a top perspective view of the snow fence of FIGS. 40-42.
Figure 44:
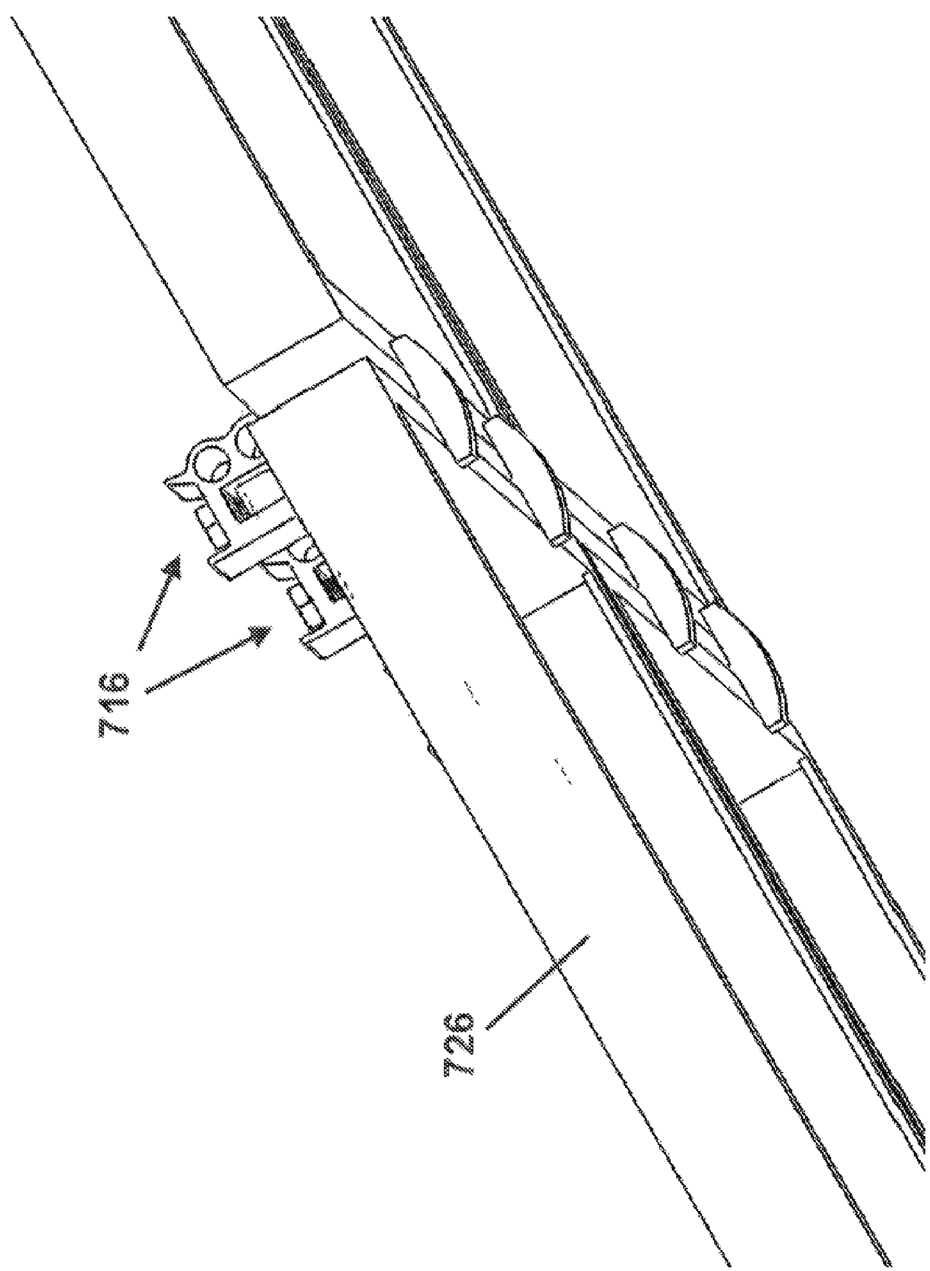
FIG. 44 is bottom perspective view of the snow fence of FIGS. 40-43.

FIG. 35 shows the geometry that determines the Sun Elevation Angle relationship to the Roof Pitch and Snow Guard Angle. This angle is the shade angle. The formula is Shade Angle=90°−(Sun Elevation Angle+Roof Pitch). The 50.00° shade angle was determined with the formula Shade Angle=50.00°=90°−(10.00°+30.00°).

The formula for total shade length if 1.375" is triangle height is TAN(Shade Angle)=Total Shaded Length/1.375". The Total Shaded Length=1.375"×TAN(50°)=1.64". Since the Total Shaded Length does not include the portion of the Solar Snow Guard that is shaded when the sun is directly overhead, 0.127" must be added to the Total Shaded length in the Up-Slope direction only. Therefore, 1.64"+0.127"=Total Shaded Area=1.77".

One important thing to note about this study is that most solar panels do not generate electricity along their outer edges. This means that the shaded length listed in the charts is actually less by the amount of space on the panel edges not generating electricity. The Solar Snow Guard was designed to cause minimal shading during the peak power production hours as seen in FIGS. 36-39.

FIGS. 40-44 illustrate a snow fence 716 including a coupling portion 728 and a bracket 730 coupled to solar panel frames 726 of adjacent solar panels 714. The illustrated coupling portion 728 includes an elongate shaft 728*a*, a bottom wide portion 728*b*, a top wide portion 728*c* and a fastener 728*d*. The bracket 730 has a channel 730*a* sized to receive the top wide portion 728*c*, and two lateral apertures 730*b*, 730*c* sized to receive pipes 731*b*, 731*c* therethrough. The pipes 731*b*, 731*c* can function as a snow fence to retain snow on the roof surface, as conduit to protect wires electrically coupled to the solar panels 714 and/or to support other structures above the roof surface. The elongate shaft 728*a* is sized to fit between adjacent solar panels 714 and the bottom wide portion 728*b* is sized to engage a bottom side of the solar panel frames 726. The bracket 730 rests on top of the solar panel frames 726. The elongate shaft 728*a* permits the snow fence 716 to slide along a gap between adjacent solar panels 714 to a desired location. The fastener 728*d* permits the user to move the top wide portion 728*c* vertically in the channel 730*a* to thereby adjust the distance between a bottom of the bracket 730 and the bottom wide portion 728*b*. Therefore, the snow fence 716 can fixedly engage the solar panel frames 726.

Figure 45:
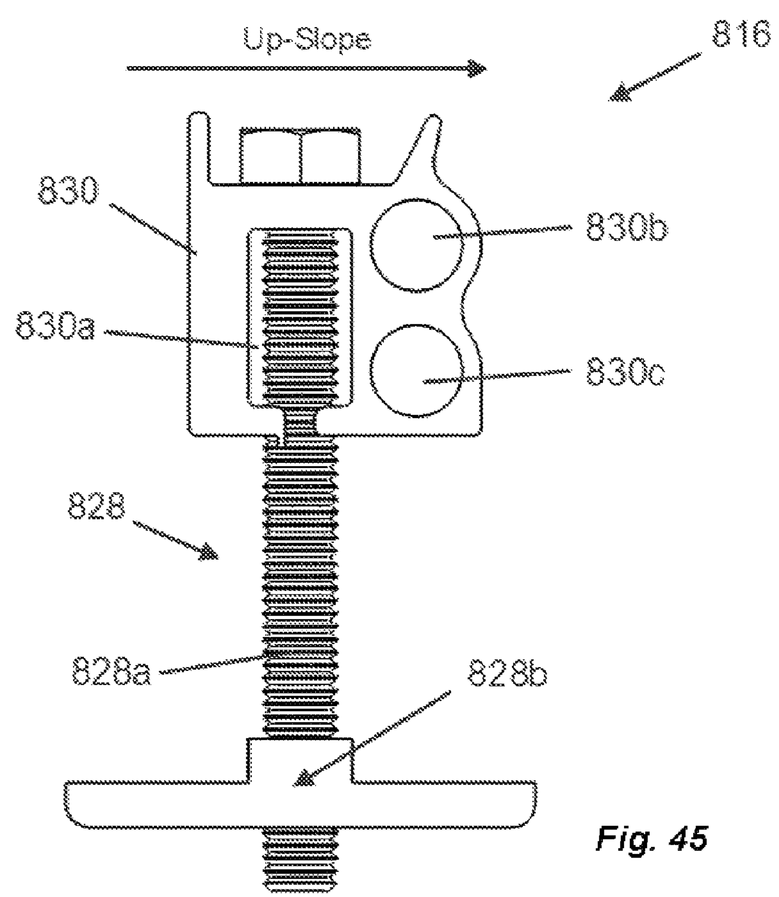
FIG. 45 is a side view of a snow fence according to some embodiments of the present invention.
Figure 46:
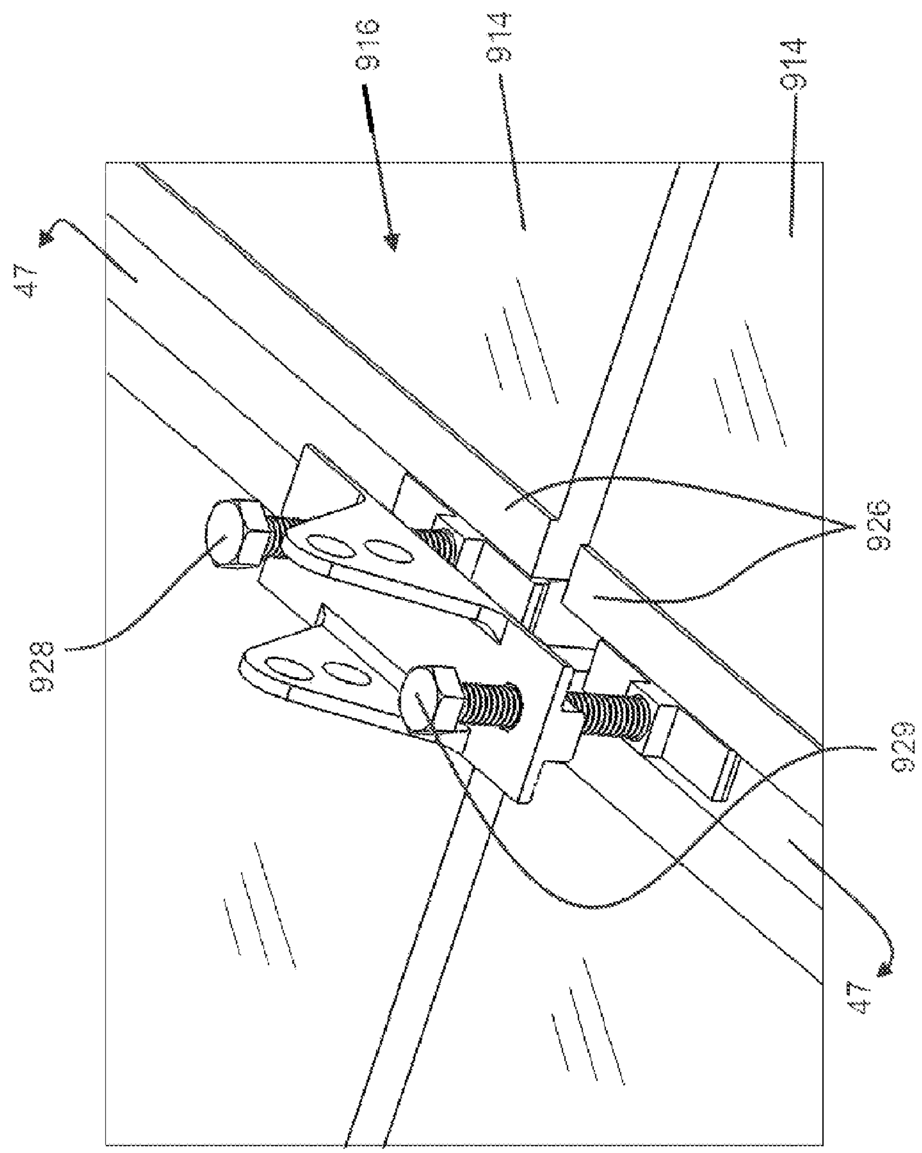
FIG. 46 is a perspective view of a snow fence according to some embodiments of the present invention.
Figure 47:
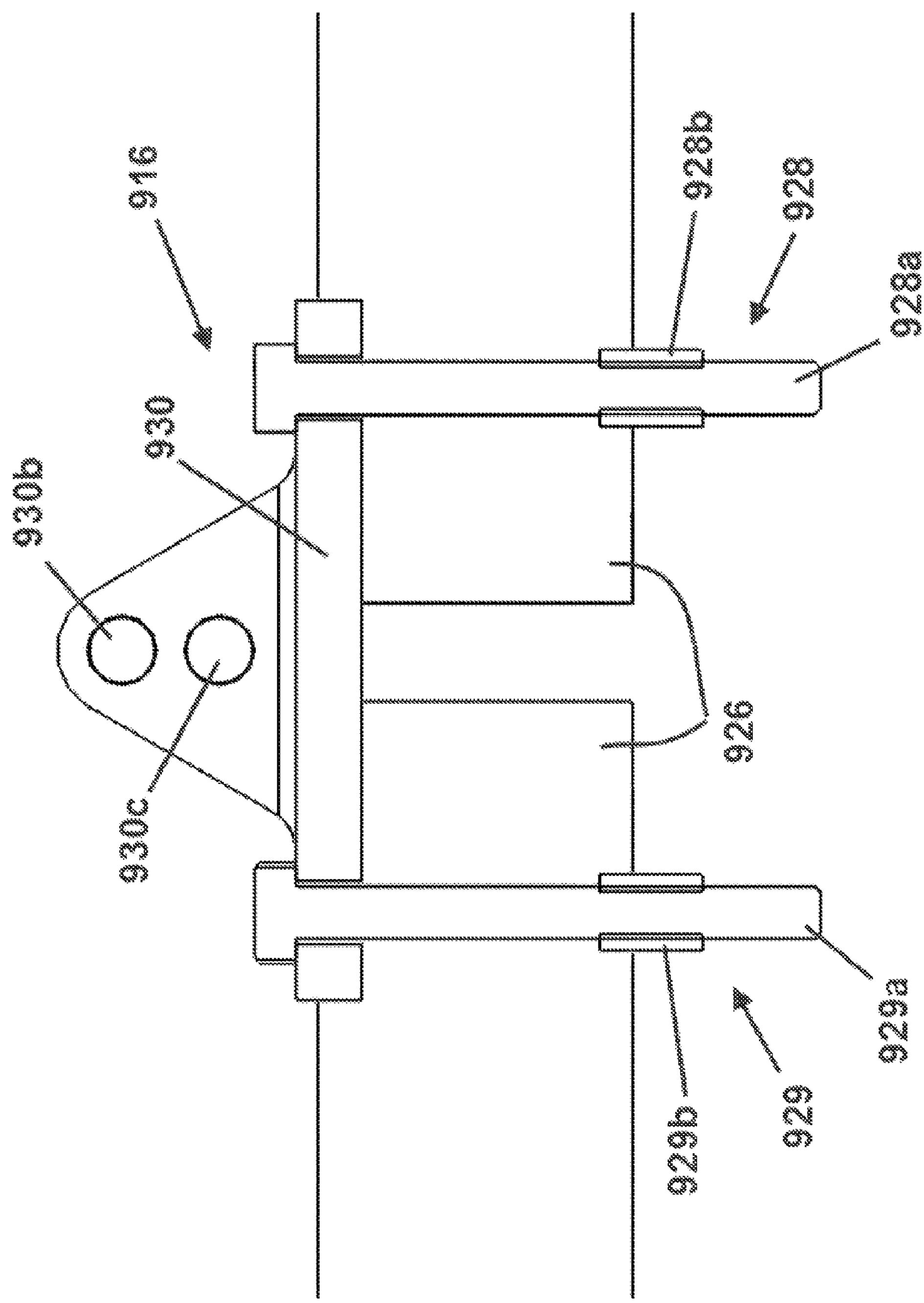
FIG. 47 is a cross-sectional view of the snow fence of FIG. 46 taken along lines 47-47 of FIG. 46.
Figure 48:
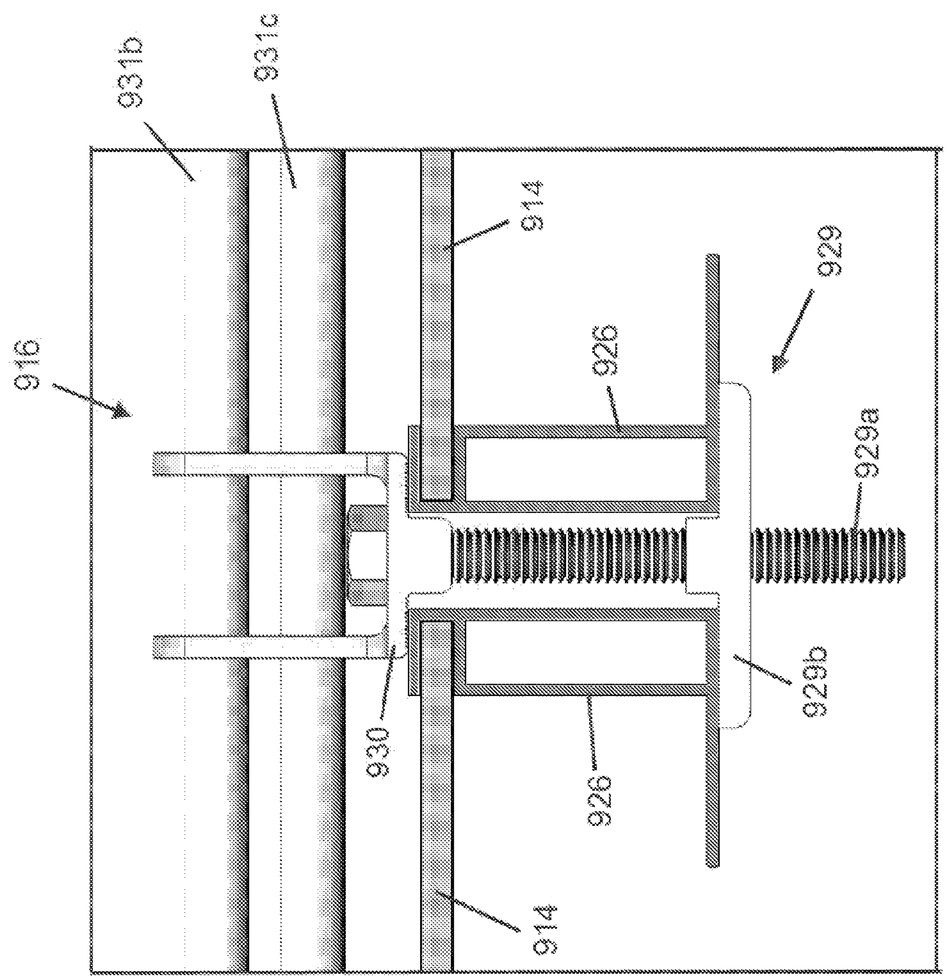
FIG. 48 is an end view of the snow fence of FIGS. 46 and 47.
Figure 49:
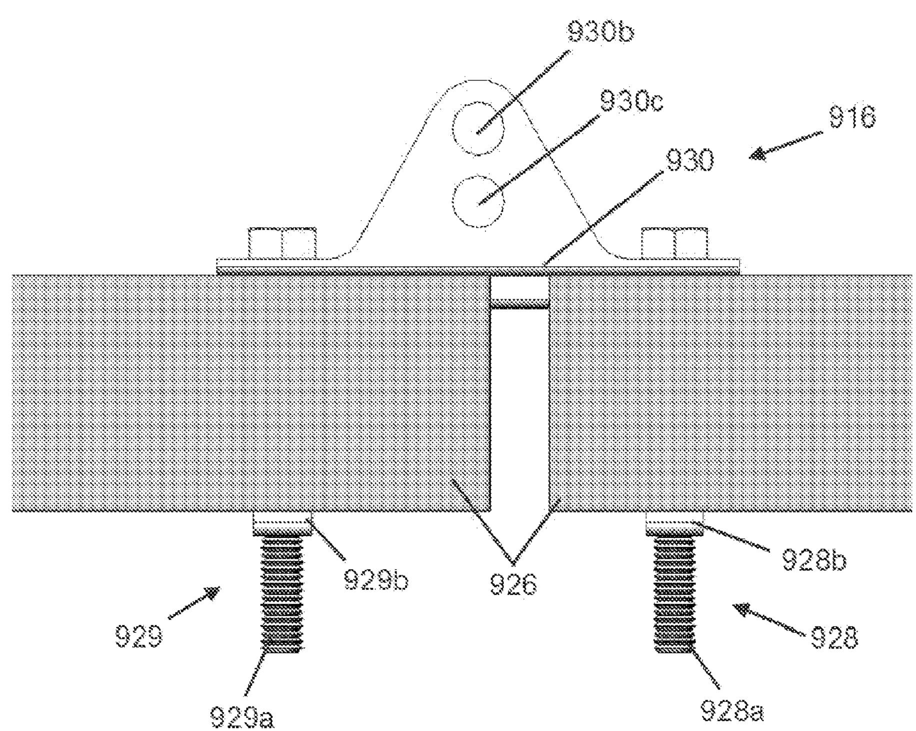
FIG. 49 is a side view of the snow fence of FIGS. 46-48.
Figure 50:
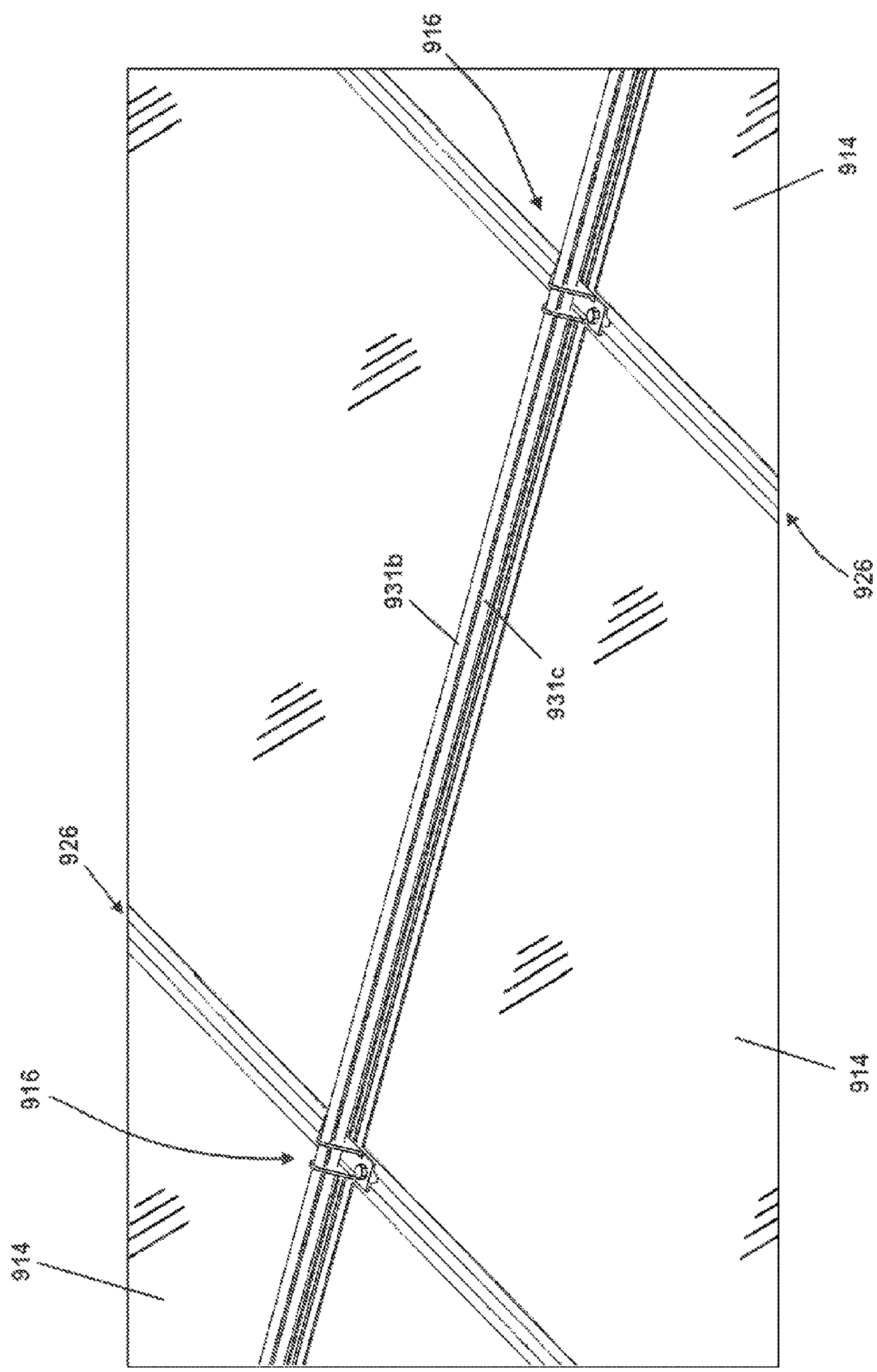
FIG. 50 is a perspective view of two snow fences of FIGS. 46-49 shown installed on a roof.

FIG. 45 illustrates a snow fence 816 including a coupling portion 828 and a bracket 830 couplable to solar panel frames of adjacent solar panels. The coupling portion 828 includes a fastener 828*a* and an elongate nut 828*b*. The bracket 830 has a channel 830*a* sized to receive the fastener 828*a*, and two lateral apertures 830*b*, 830*c* sized to receive pipes therethrough or to support other structures. The elongate nut 828*b* is threaded onto the fastener 828*a* to adjust a distance between the elongate nut 828*b* and a bottom of the bracket 830. The elongate nut 828*b* can engage a solar panel bottom portion and the bottom of the bracket 830 can engage a solar panel top portion to thereby clamp the snow fence 816 onto the solar panel.

FIGS. 46-50 illustrate a snow fence 916 including coupling portions 928 and 929 and a bracket 930 couplable to solar panel frames 926 of adjacent solar panels 914. The coupling portions 928 and 929 each include a fastener 928*a*, 929*a* and an elongate nut 928*b*, 929*b*. The fasteners 928*a*, 929*a* are sized to fit between adjacent solar panels 914 to thereby permit the snow fence 916 to slide along a gap between adjacent solar panels 914 to a desired location. The elongate nuts 928*b*, 929*b* are threaded onto the respective fasteners

928*a*, 929*a* to adjust a distance between the elongate nuts 928*b*, 929*b* and a bottom of the bracket 930. The bracket 930 rests on top of the solar panel frames 926. The elongate nuts 928*b*, 929*b* engage a bottom of the solar panel frame 926 and a bottom of the bracket 930 engages a top of the solar panel frame 926 to thereby clamp the snow fence 916 onto the solar panel 914. The bracket 930 has two flanges each of which includes two lateral apertures 930*b*, 930*c* sized to receive pipes 931*b*, 931*c* therethrough. The pipes 931*b*, 931*c* can function as a snow fence to retain snow on the roof surface, as conduit to protect wires electrically coupled to the solar panels 914 and/or to support other structures above the roof surface.

Figure 51:
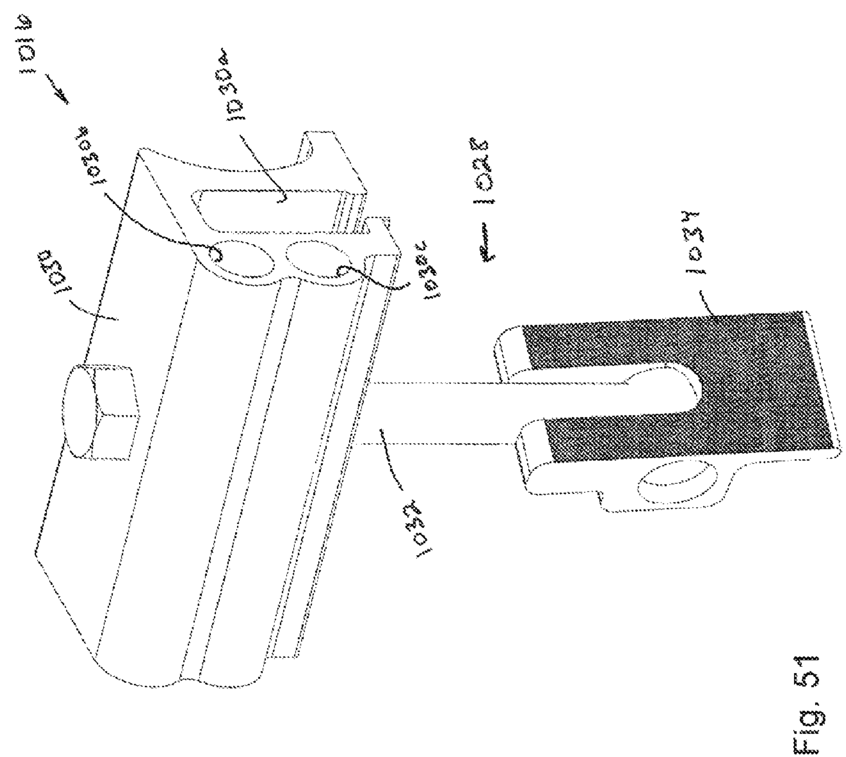
FIG. 51 is a perspective view of a snow fence according to some embodiments of the present invention
Figures 52, 53:
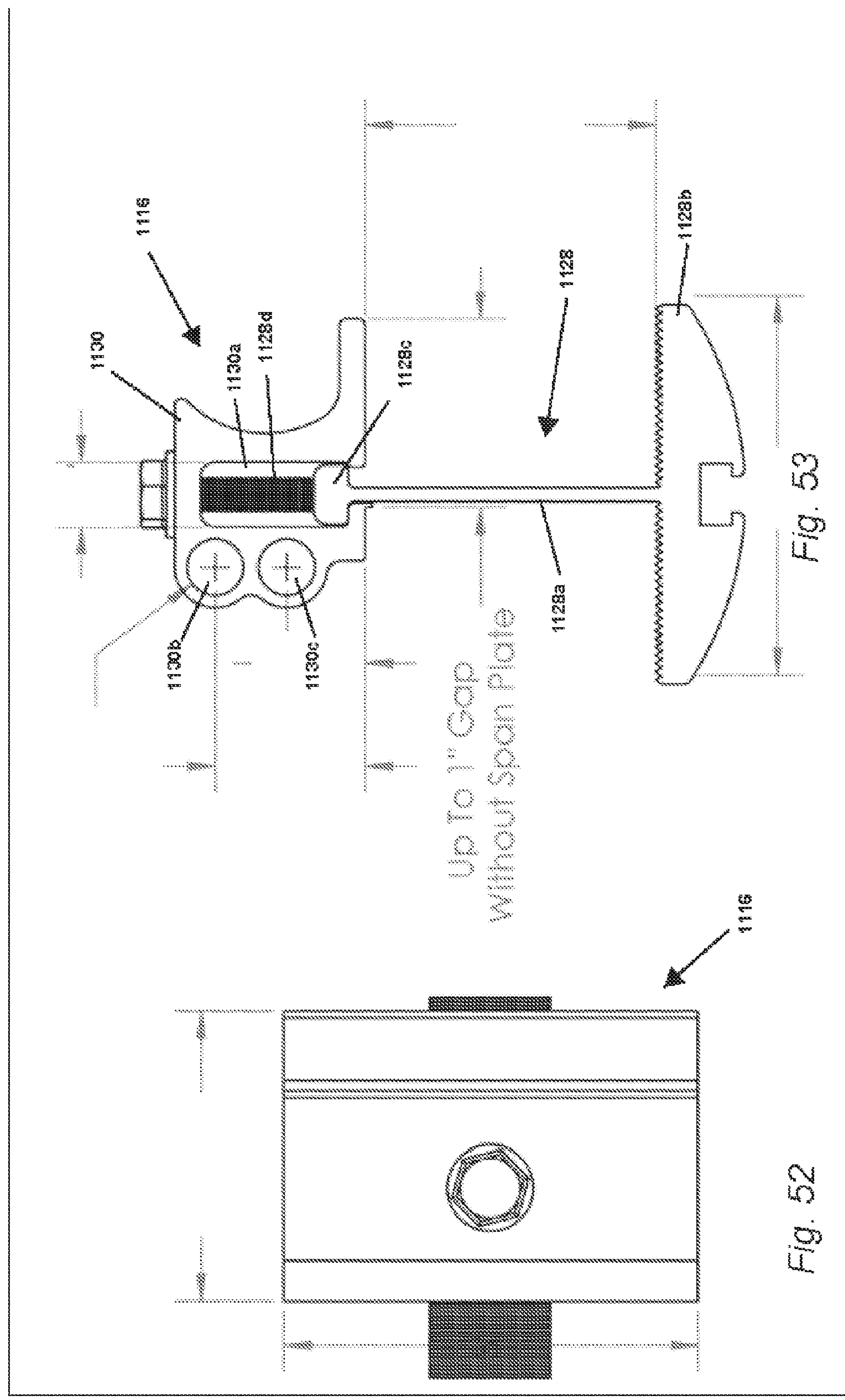
FIG. 52 is a top view of a snow fence according to some embodiments of the present invention.
FIG. 53 is a side view of the snow fence of FIG. 52.
Figures 54, 55:
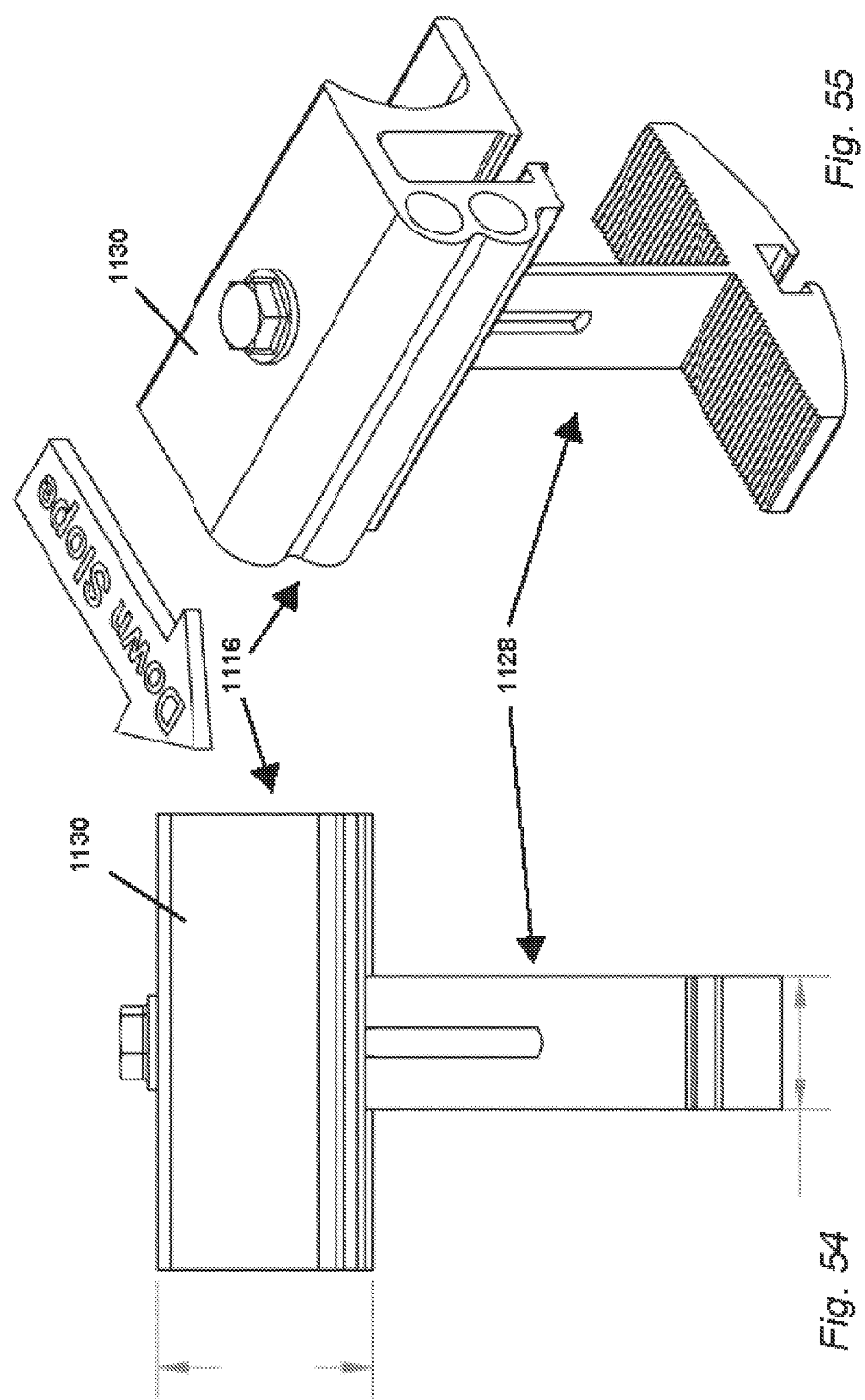
FIG. 54 is a front view of the snow fence of FIGS. 52-53.
FIG. 55 is a perspective view of the snow fence of FIGS. 52-54.

FIG. 51 illustrates a snow fence 1016 including a coupling device 1028 and a bracket 1030 that can be coupled to solar panel frames of adjacent solar panels. The coupling portion 1028 includes an elongate portion 1032 and a rotating portion 1034. The bracket 1030 has a channel 1030*a* sized to receive the elongate portion 1032, and two lateral apertures 1030*b*, 1030*c* sized to receive pipes therethrough. The rotating portion 1034 is shown in an uncoupled position, but can be rotated to engage the solar panel frames. The rotating portion 1034 has a roughened portion that engages the solar panel frames in the coupled position. The coupling device 1028 is similar to the coupling device 28 shown in FIGS. 6-15 and described in detail above. Reference is made to the coupling device 28 for a more detailed description of the coupling device 1028.

FIGS. 52-55 illustrate a snow fence 1116 including a coupling portion 1128 and a bracket 1130 that can be coupled to solar panel frames of adjacent solar panels. The illustrated coupling portion 1128 includes an elongate shaft 1128*a*, a bottom wide portion 1128*b*, a top wide portion 1128*c* and a fastener 1128*d*. The bracket 1130 has a channel 1130*a* sized to receive the top wide portion 1128*c*, and two lateral apertures 1130*b*, 1130*c* sized to receive pipes therethrough. The pipes can function as a snow fence to retain snow on the roof surface, as conduit to protect wires electrically coupled to the solar panels and/or to support other structures above the roof surface. The elongate shaft 1128*a* is sized to fit between adjacent solar panels and the bottom wide portion 2228*b* is sized to engage a bottom side of the solar panel frames. The bracket 2230 rests on top of the solar panel frames. The elongate shaft 2228*a* permits the snow fence 1116 to slide along a gap between adjacent solar panels to a desired location. The fastener 118*d* permits the user to move the top wide portion 1128*c* vertically in the channel 1130*a* to thereby adjust the distance between a bottom of the bracket 1130 and the bottom wide portion 1128*b*. Therefore, the snow fence 1116 can fixedly engage the solar panel frames.

Figures 56, 57, 58:
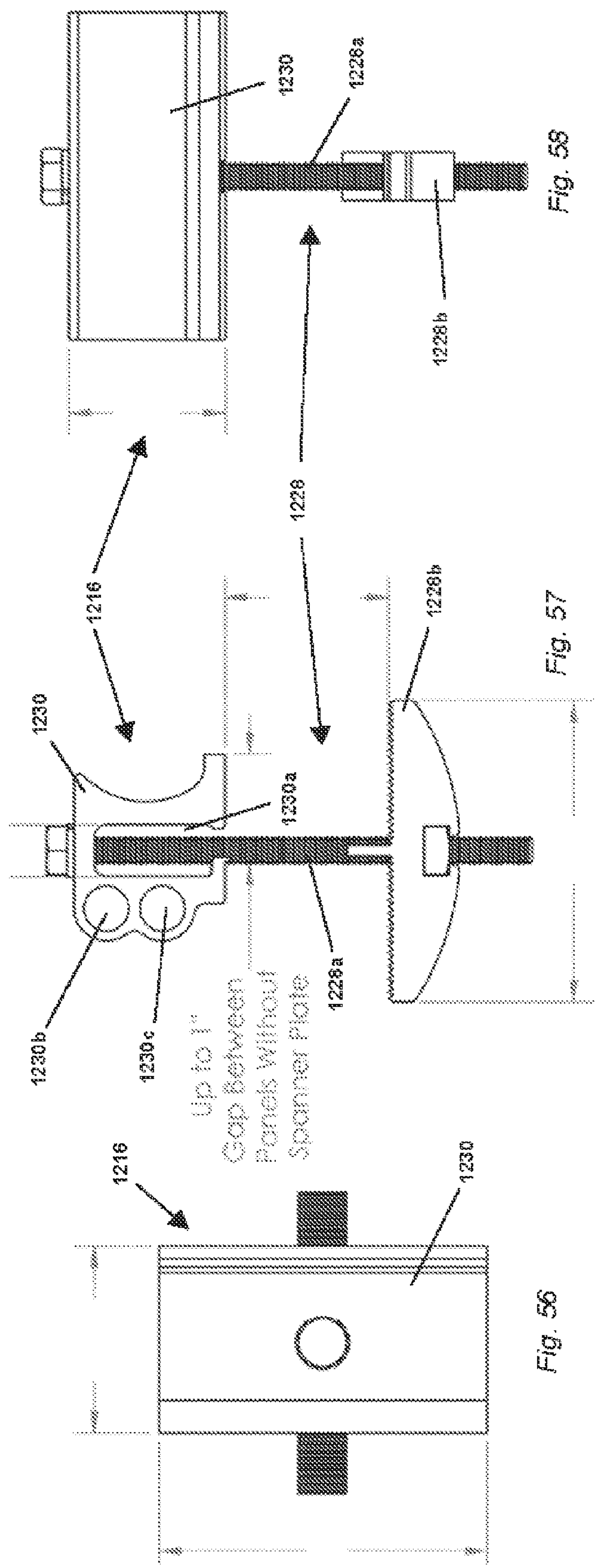
FIG. 56 is a top view of a snow fence according to some embodiments of the present invention.
FIG. 57 is a side view of the snow fence of FIG. 56.
FIG. 58 is a front view of the snow fence of FIGS. 55-56.
Figure 59:
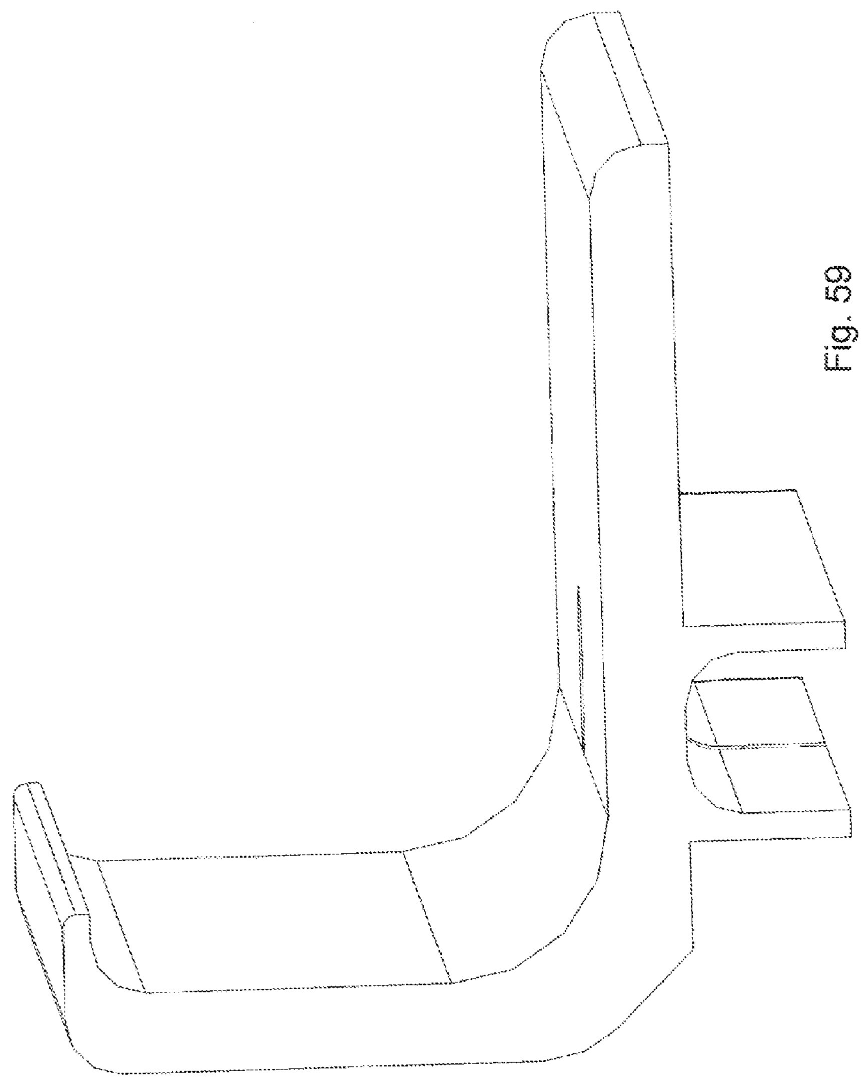
FIGS. 59-67 illustrate various brackets according to some embodiments of the invention.
Figure 60:
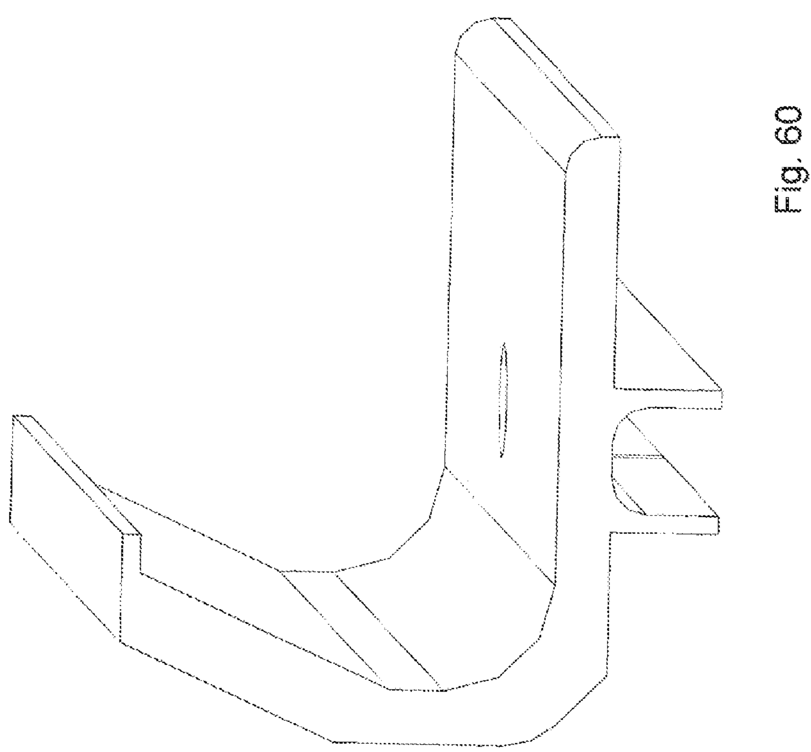
Figure 61:
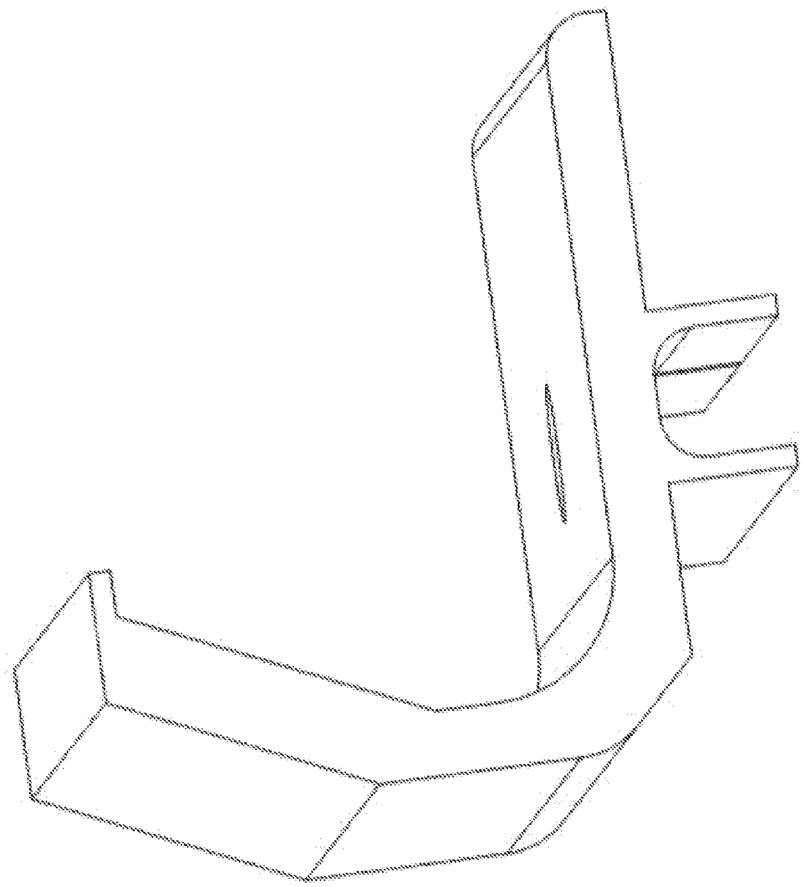
Figure 62:
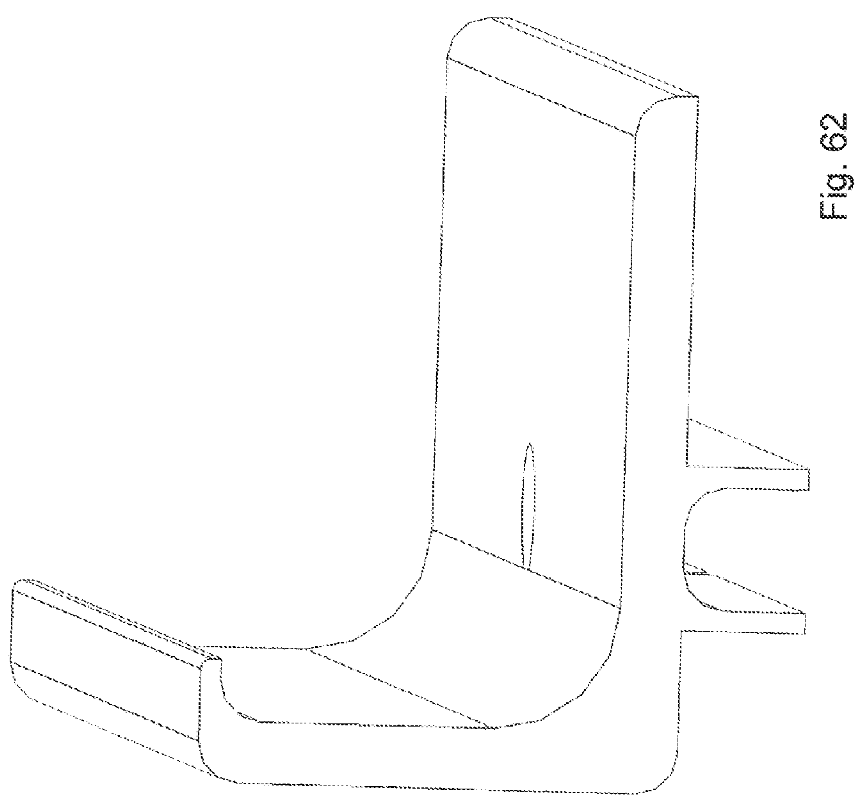
Figure 63:
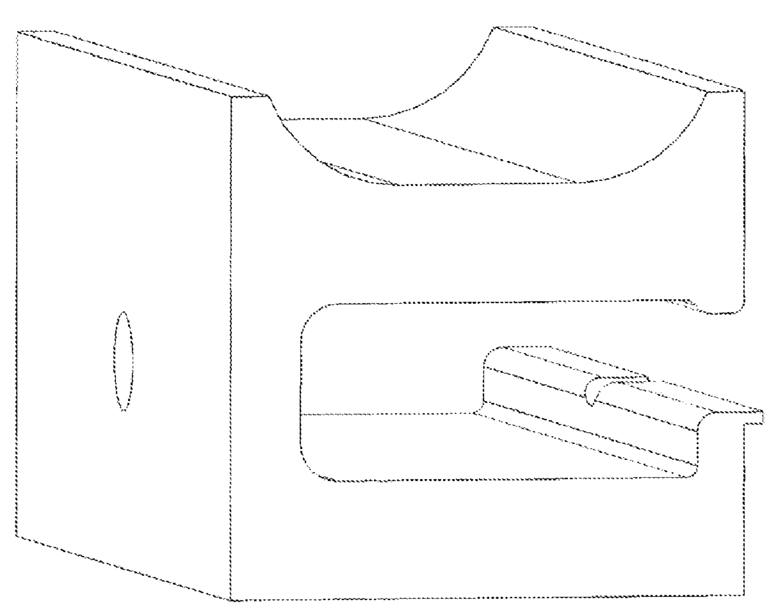
Figure 64:
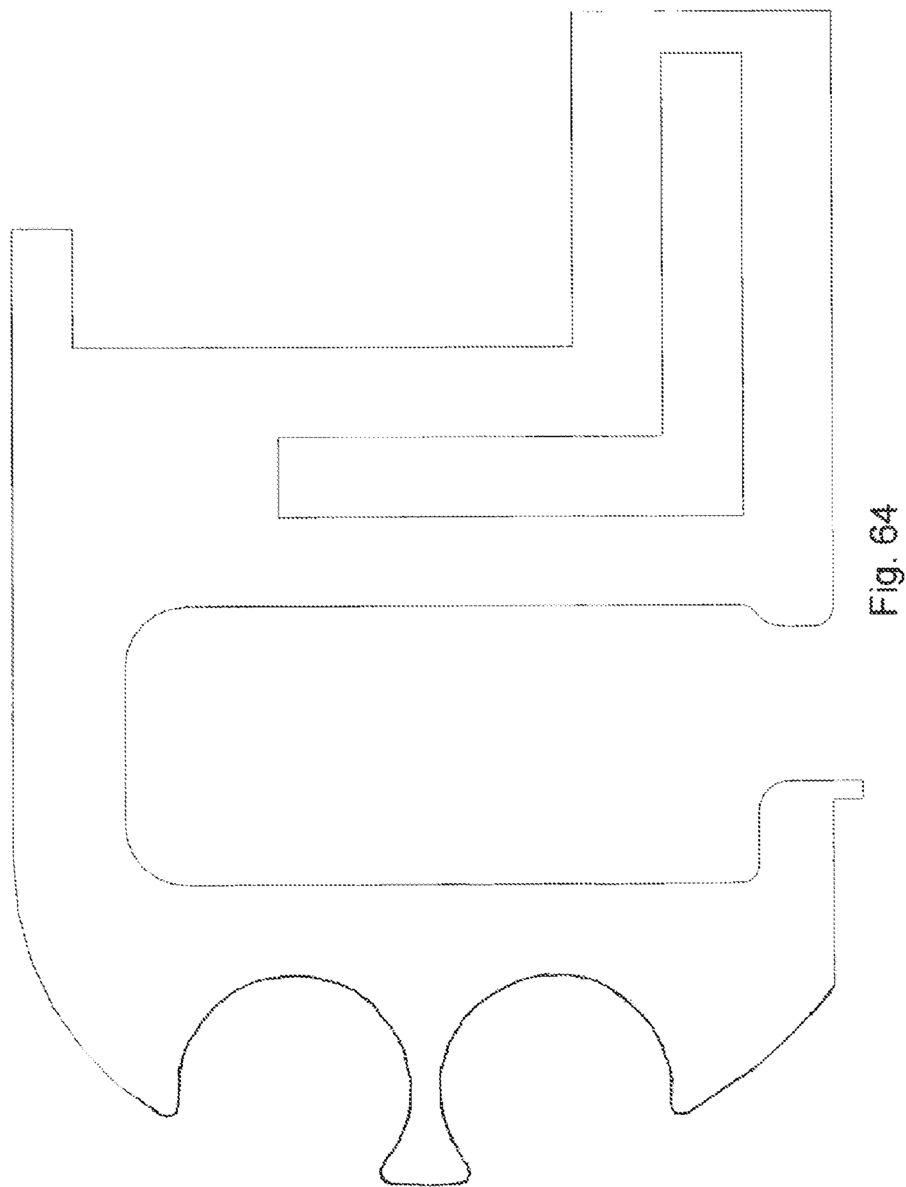
Figure 65:
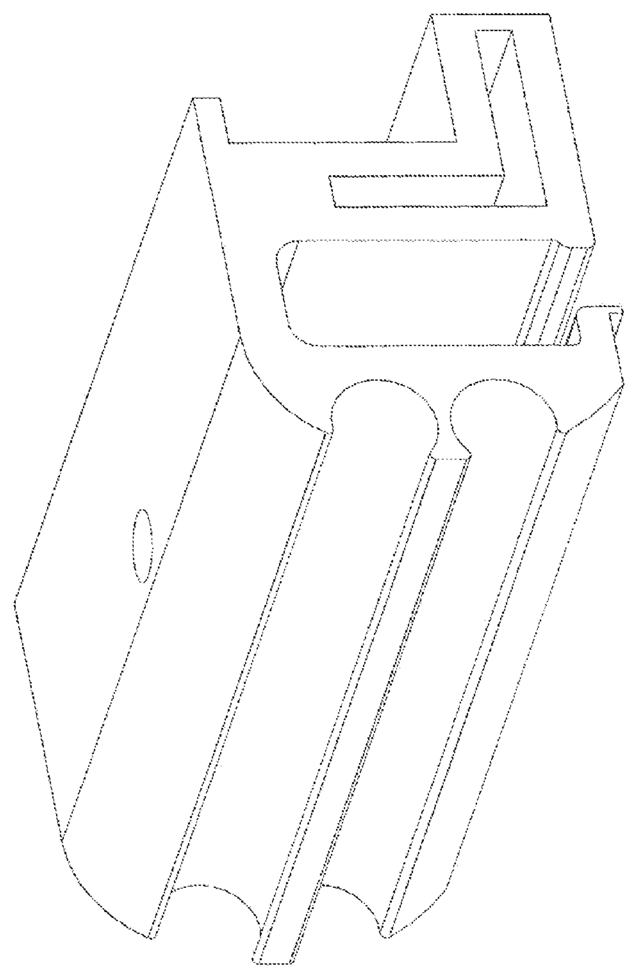
Figure 66:
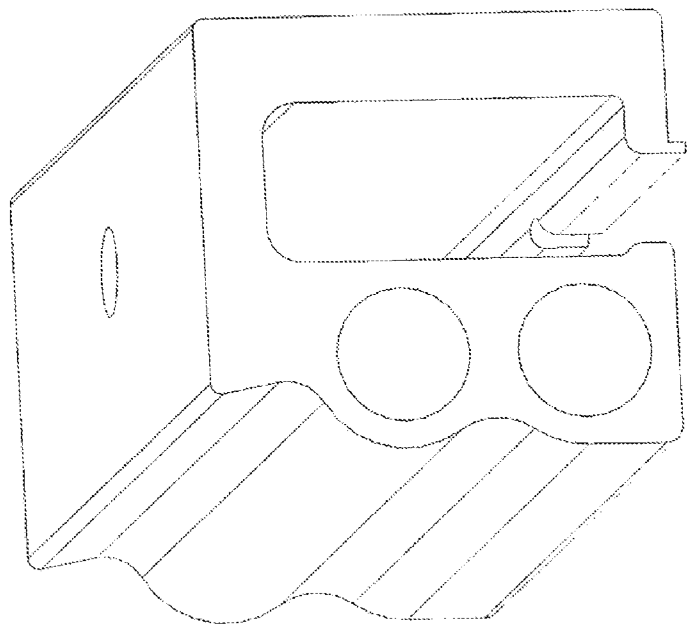
Figure 67:
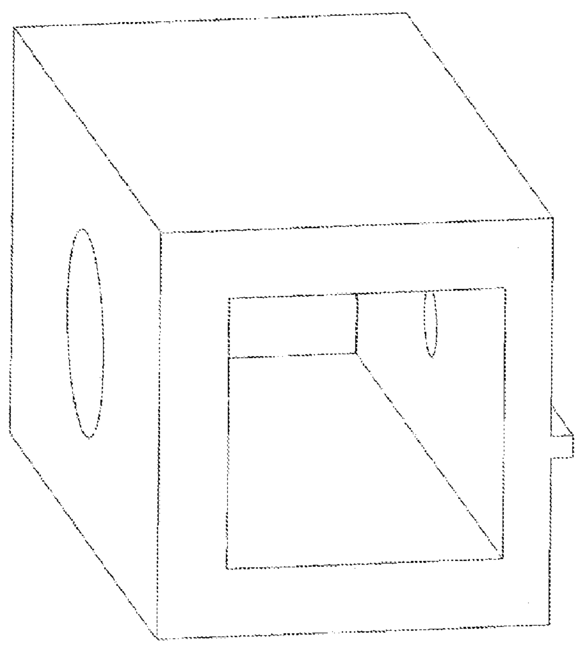

FIGS. 56-58 illustrate a snow fence 1216 including a coupling portion 1228 and a bracket 1230 couplable to solar panel frames of adjacent solar panels. The coupling portion 1228 includes a fastener 1228*a* and an elongate nut 1228*b*. The bracket 1230 has a channel 1230*a* sized to receive the fastener 1228*a*, and two lateral apertures 1230*b*, 1230*c* sized to receive pipes therethrough or to support other structures. The elongate nut 1228*b* is threaded onto the fastener 1228*a* to adjust a distance between the elongate nut 1228*b* and a bottom of the bracket 1230. The elongate nut 1228*b* can engage a solar panel bottom portion and the bottom of the bracket 1230 can engage a solar panel top portion to thereby clamp the snow fence 1216 onto the solar panel.

FIGS. 59-67 illustrate various brackets according to some embodiments of the invention. These brackets include a horizontal portion and a vertical portion. The vertical portions have different shapes and angles designed to retain snow on roof having various angles. These brackets can be interchanged with any of the embodiments illustrated and described herein.

Figure 68:
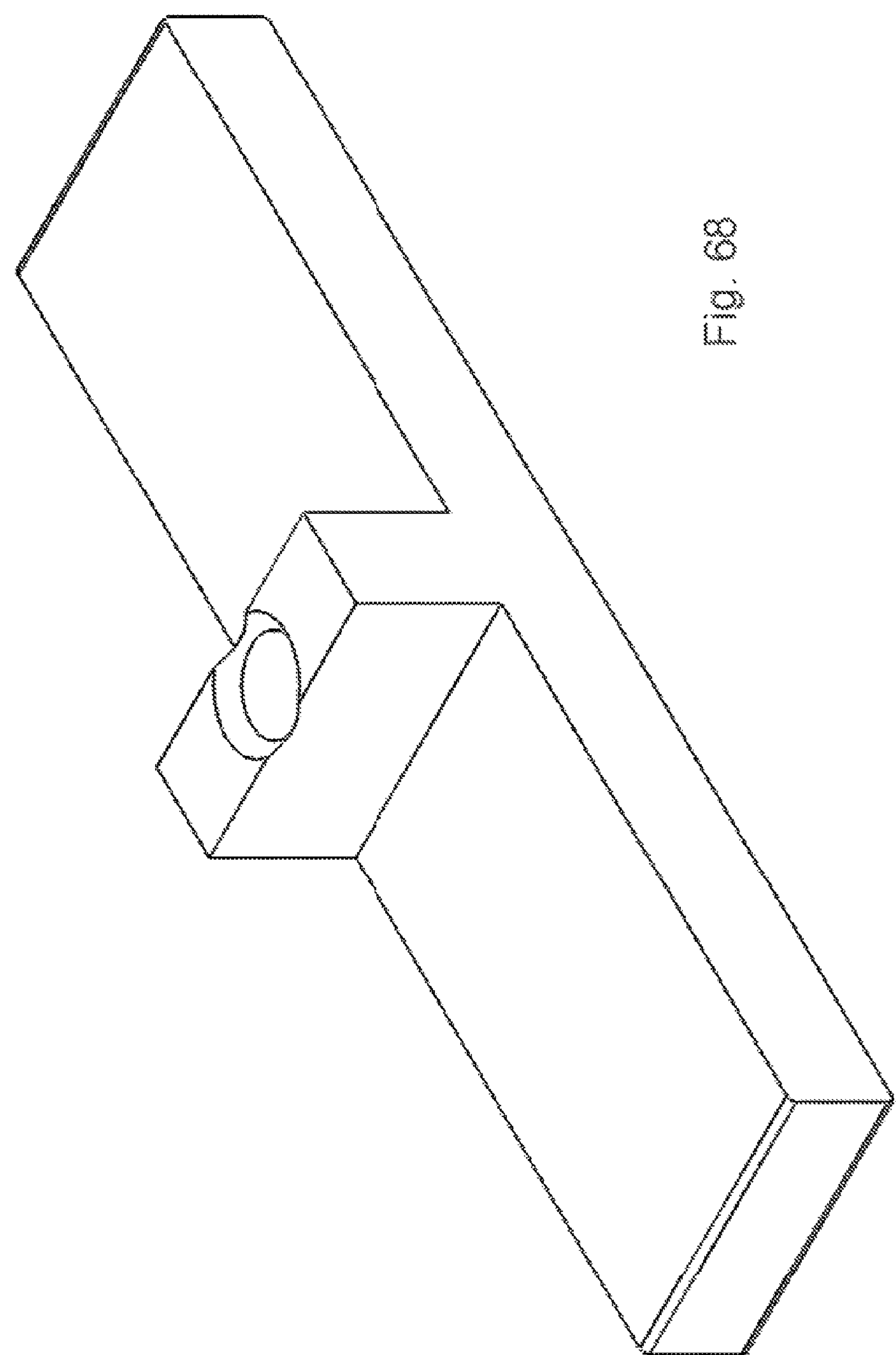
FIGS. 68 and 69 illustrate different bottom portions according to some embodiments of the present invention.
Figure 69:
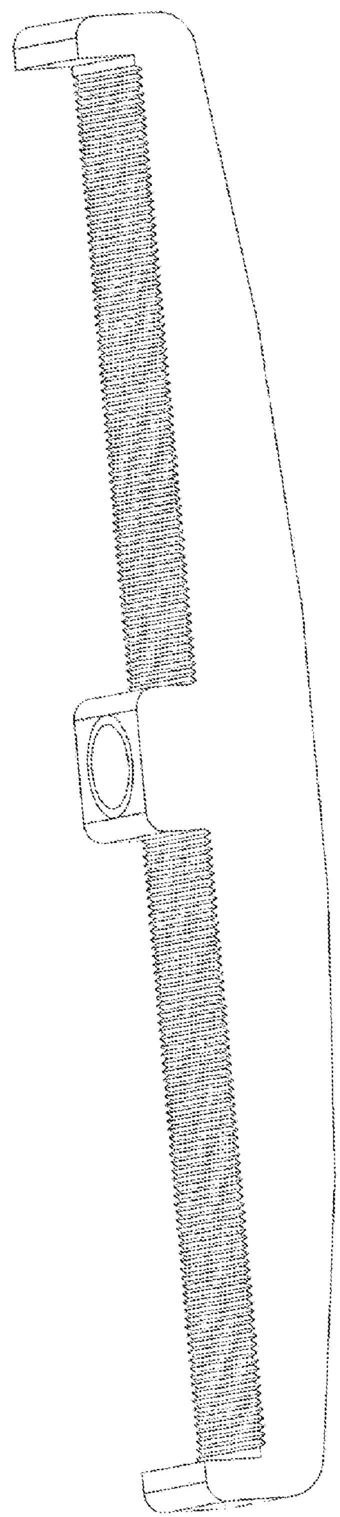

FIGS. 68 and 69 illustrate different bottom portions according to some embodiments of the present invention. These bottom portions include an aperture that can be threaded or can be coupled to the bracket with a nut. The bottom portion of FIG. 68 includes substantially smooth wings, whereas the bottom portion of FIG. 69 includes rough toothed wings. These bottom portions can be interchanged with any of the embodiments of the bottom portions or elongate nuts illustrated and described herein.

Figure 70:
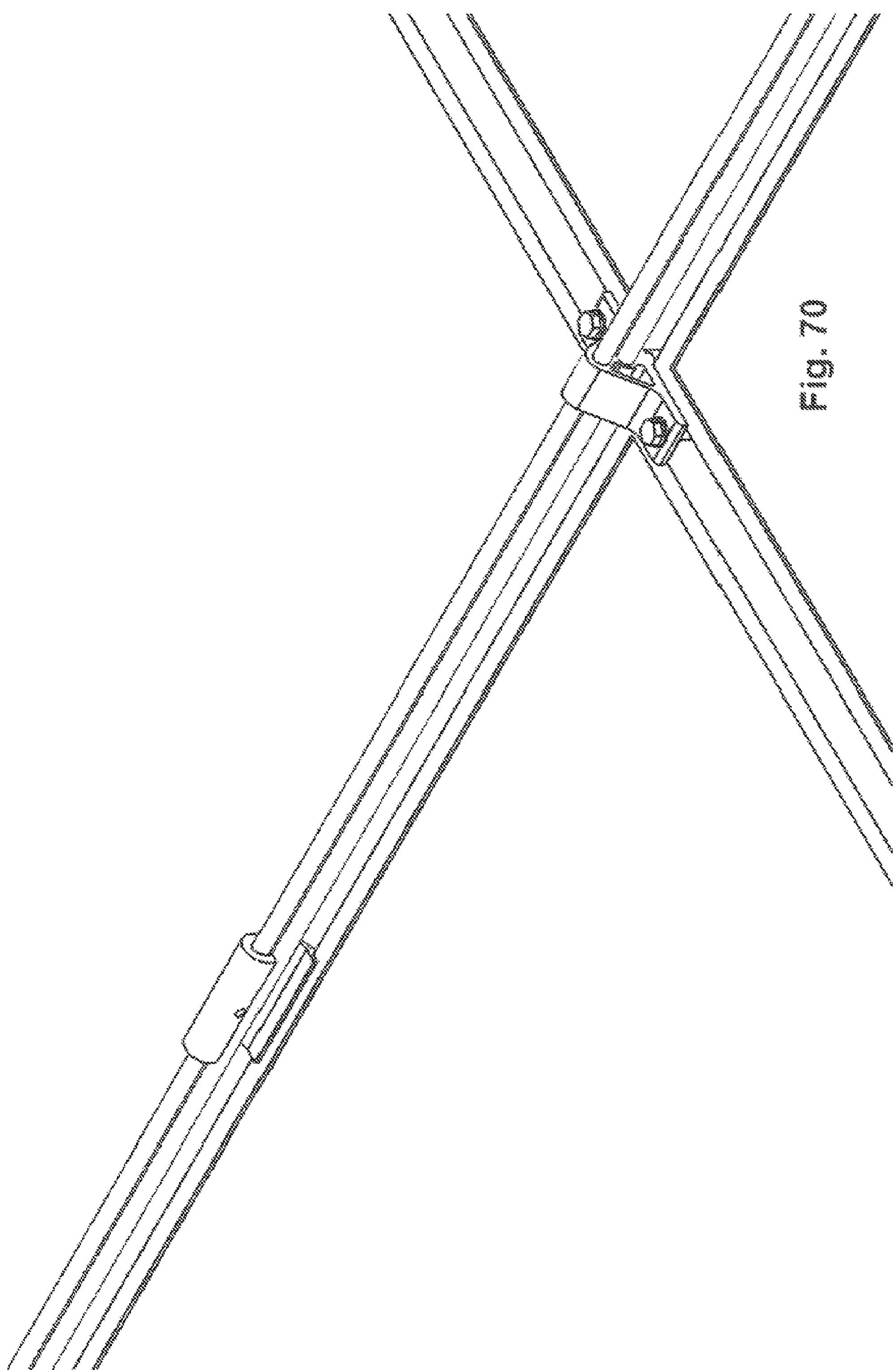
FIG. 70 is a perspective view of a snow fence according to some embodiments of the present invention.
Figure 71:
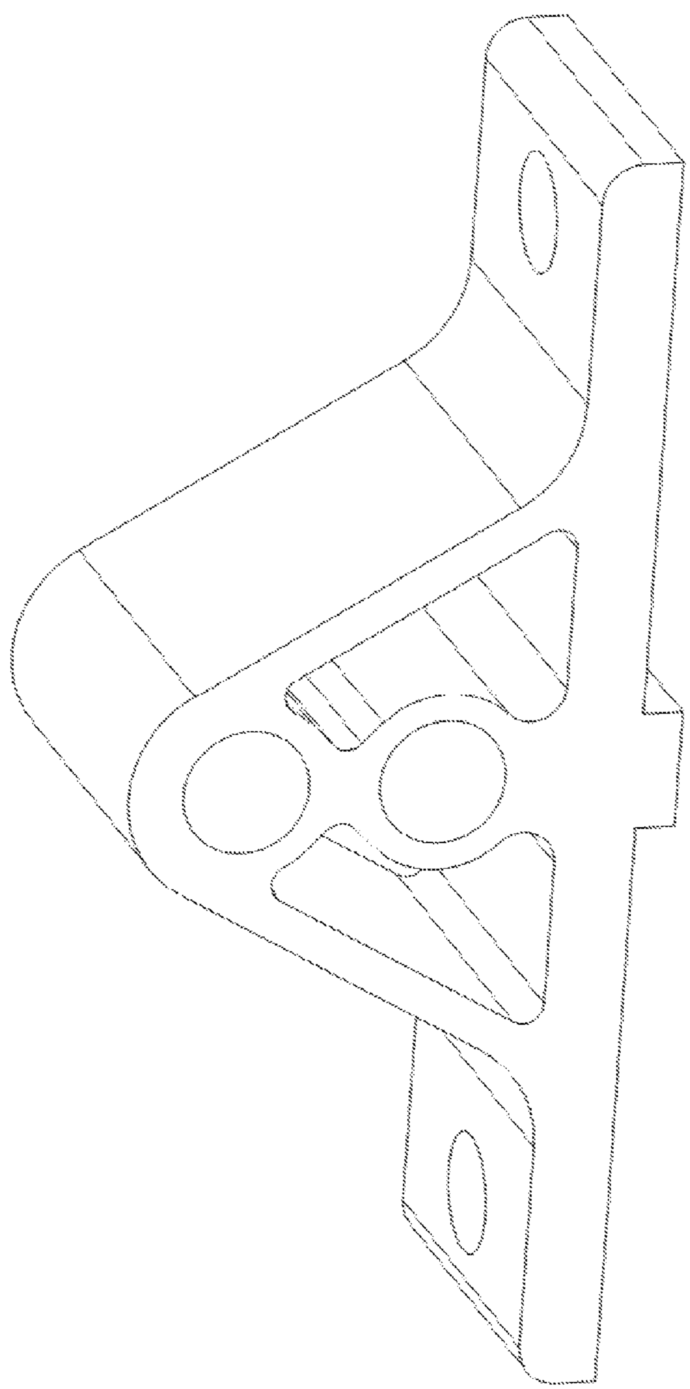
FIG. 71 illustrates a bracket of the snow fence of FIG. 70.
Figure 72:
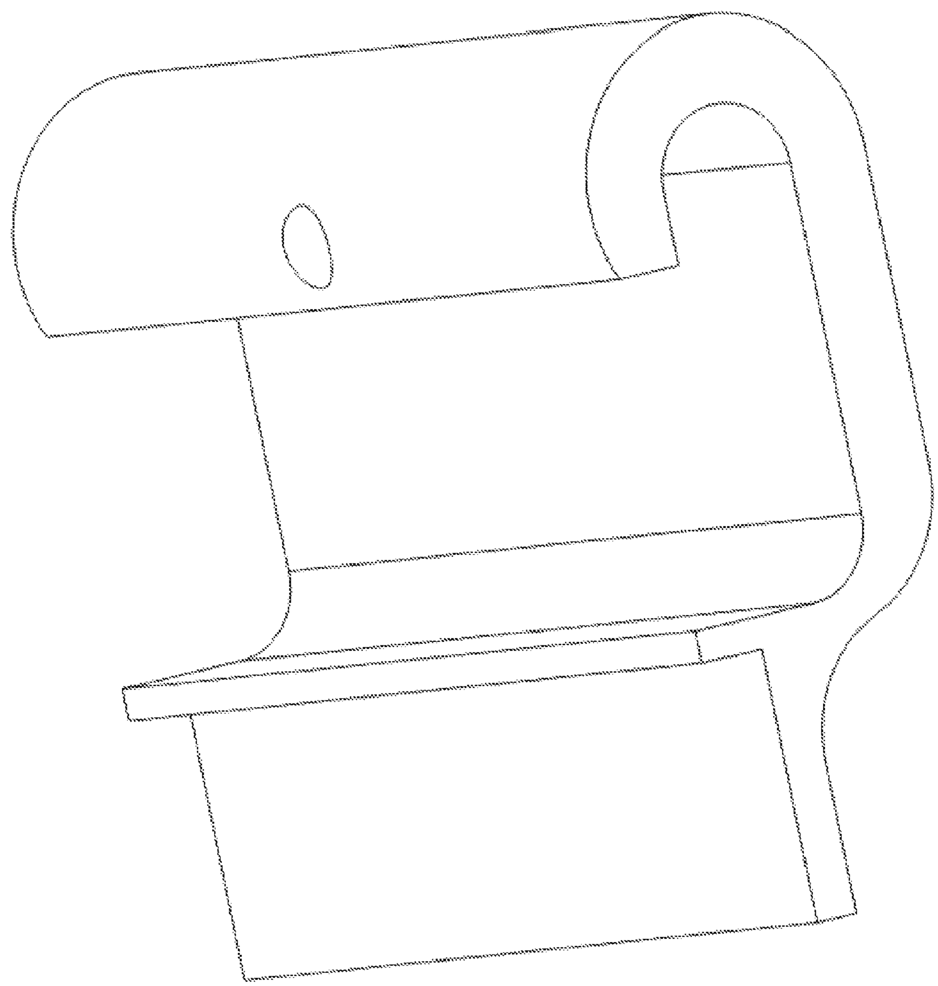
FIG. 72 illustrates a mid-panel support of the snow fence of FIG. 70.

FIGS. 70-72 illustrate a snow fence according to some embodiments of the present invention. The snow fence includes a bracket (also shown in FIG. 71) and a mid-panel support (also shown in FIG. 71). Pipes are supported by the bracket and the mid-panel support. The bracket and/or mid-panel support can be utilized with any of the embodiments illustrated and described herein.

Figure 73:
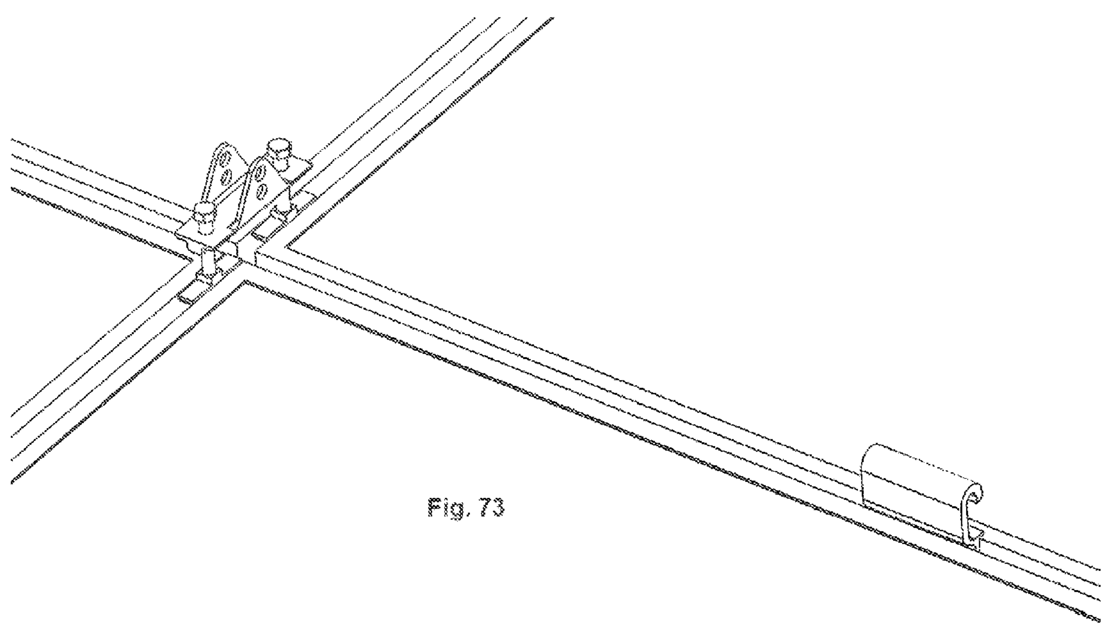
FIG. 73 is a perspective view of a snow fence according to some embodiments of the present invention.
Figure 74:
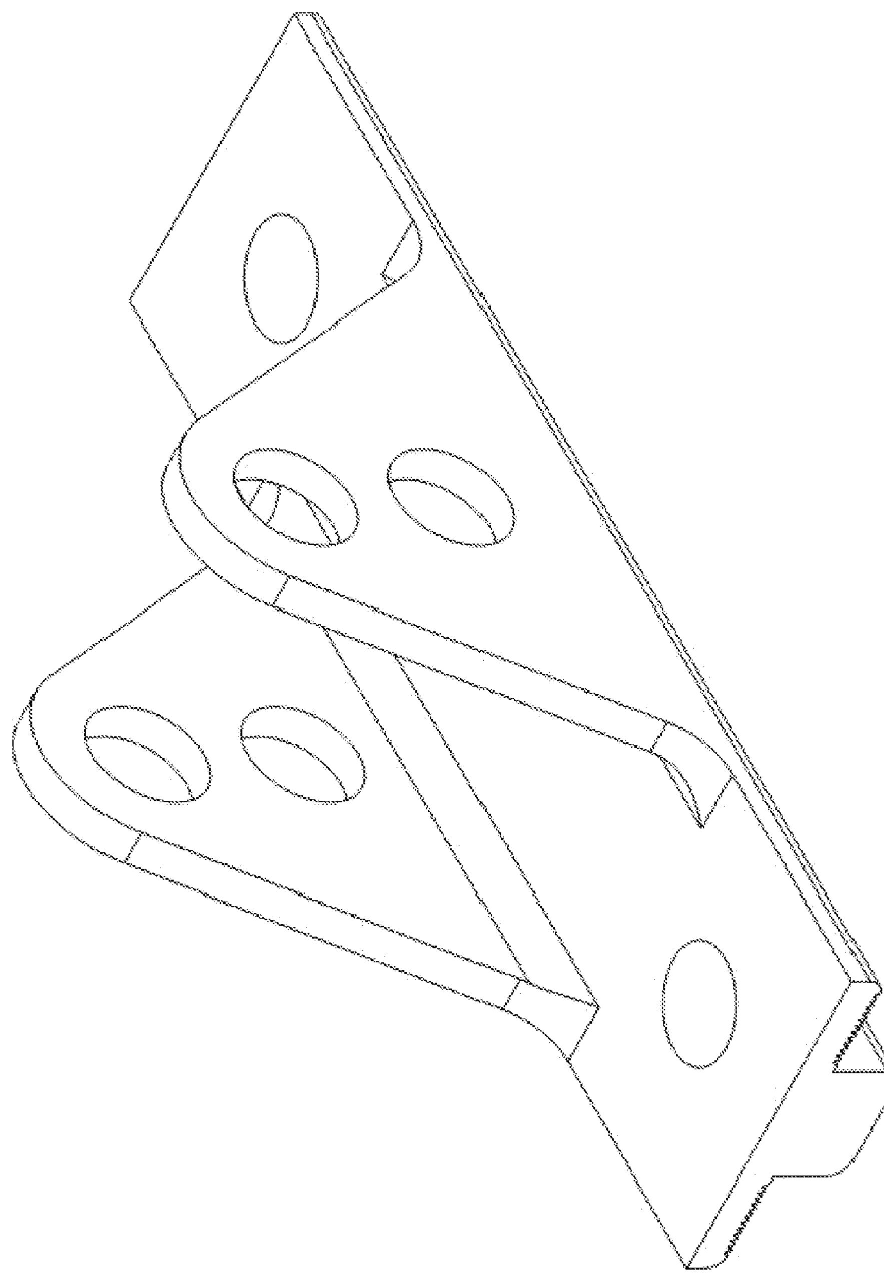
FIG. 74 illustrates a bracket of the snow fence of FIG. 73.
Figure 75:
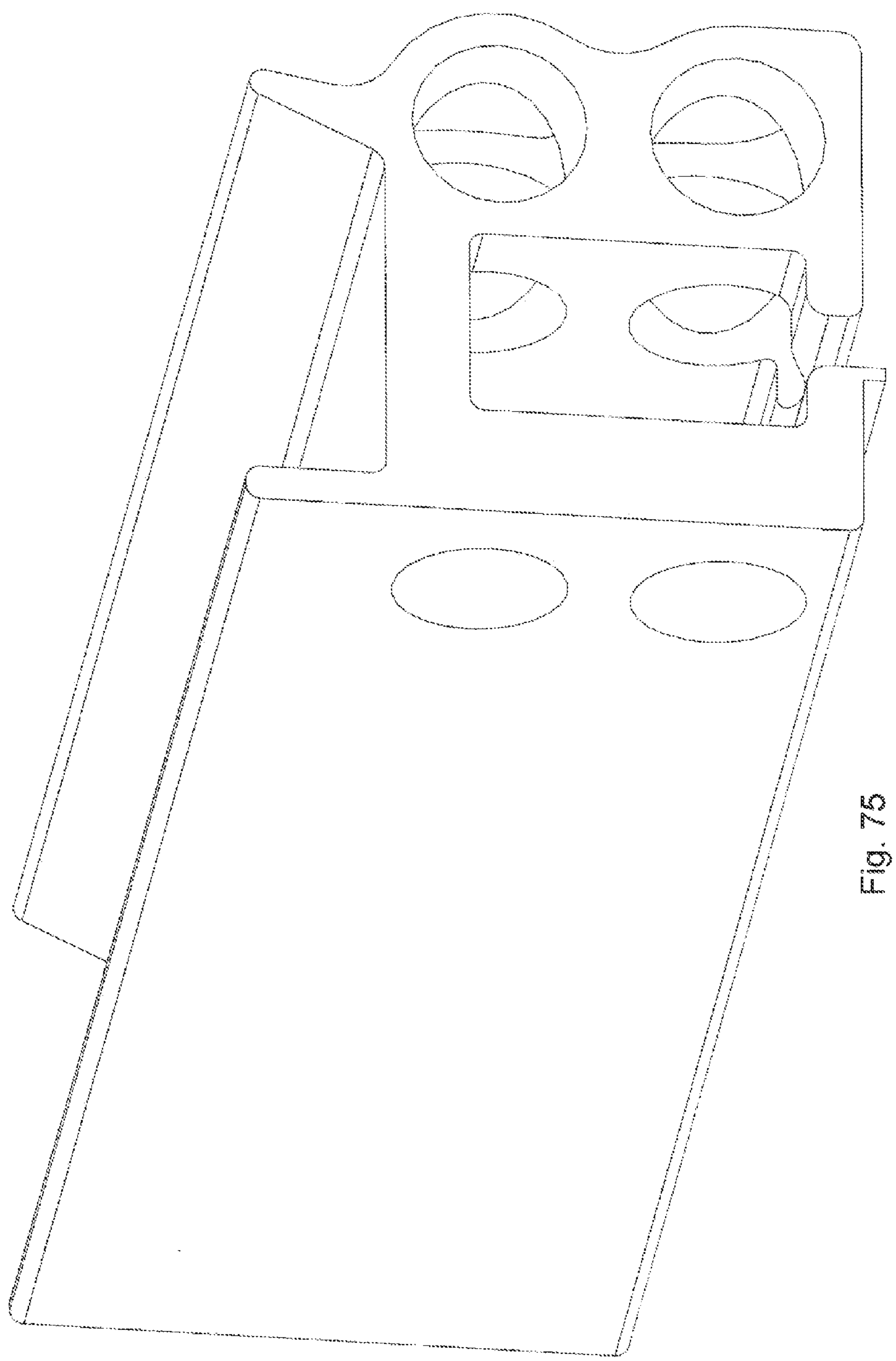
FIGS. 75-79 illustrate various end clamps according to some embodiments of the present invention.
Figure 76:
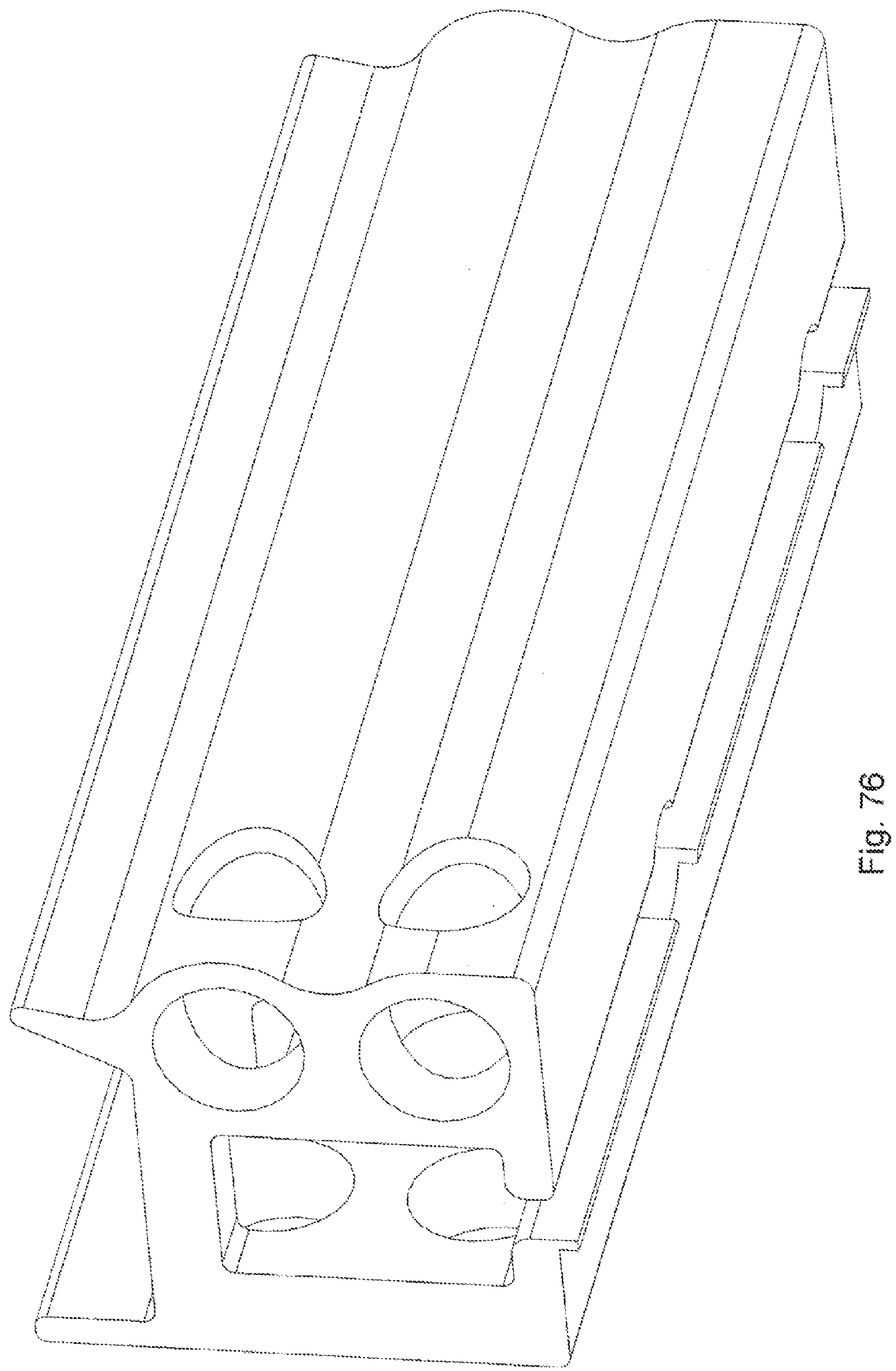
Figure 77:
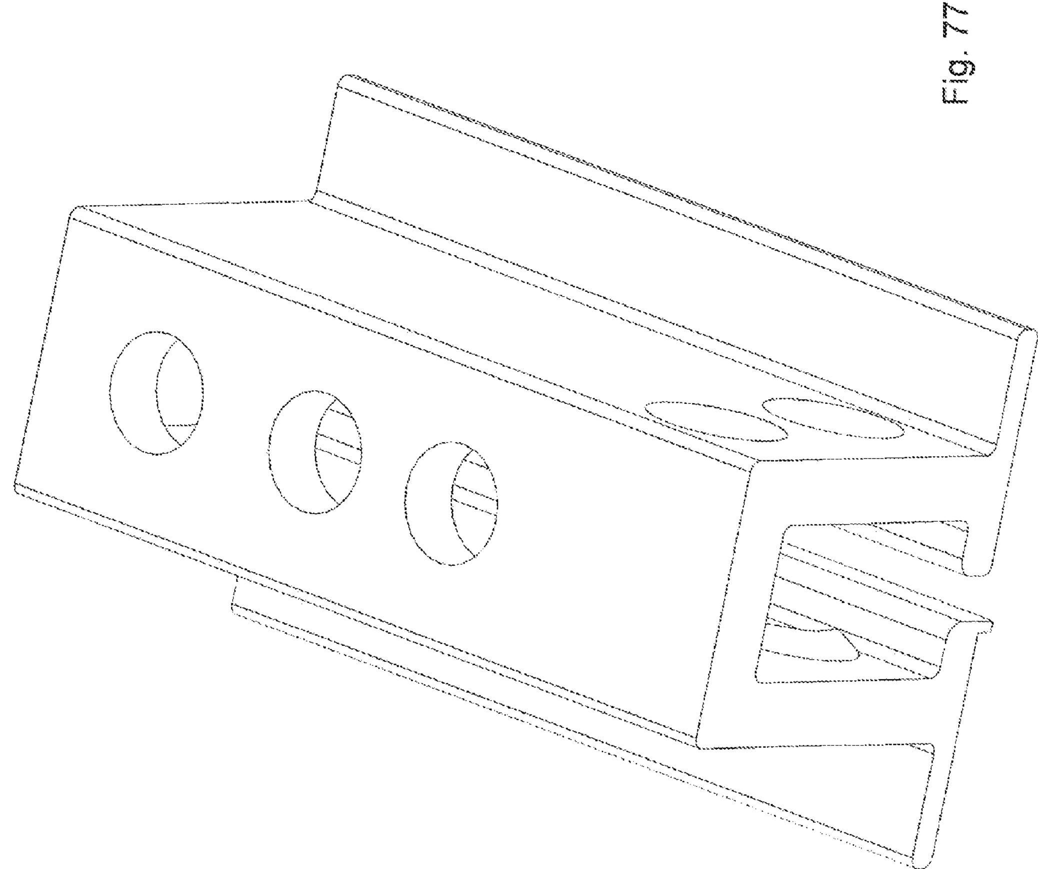
Figure 78:
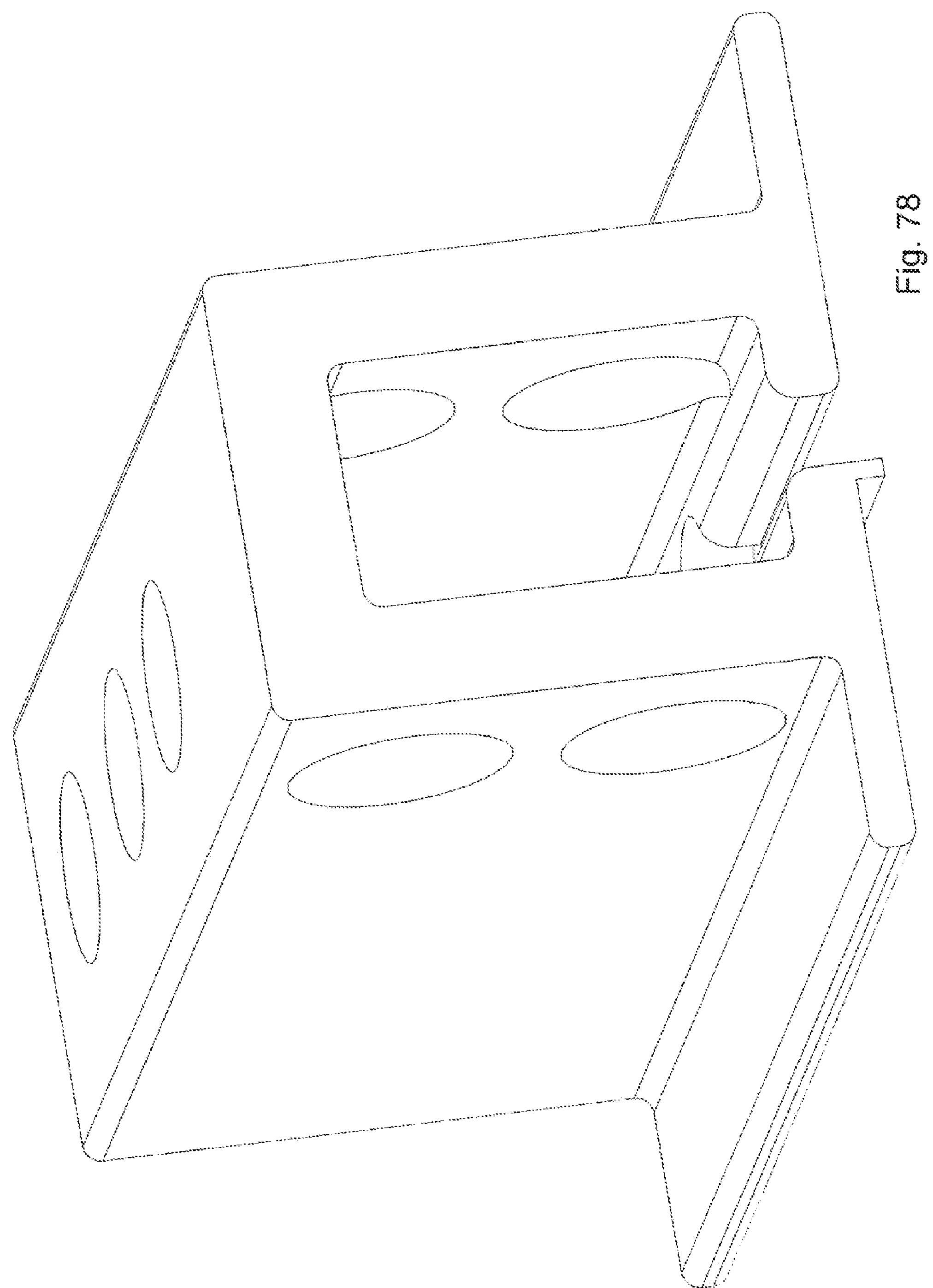
Figure 79:
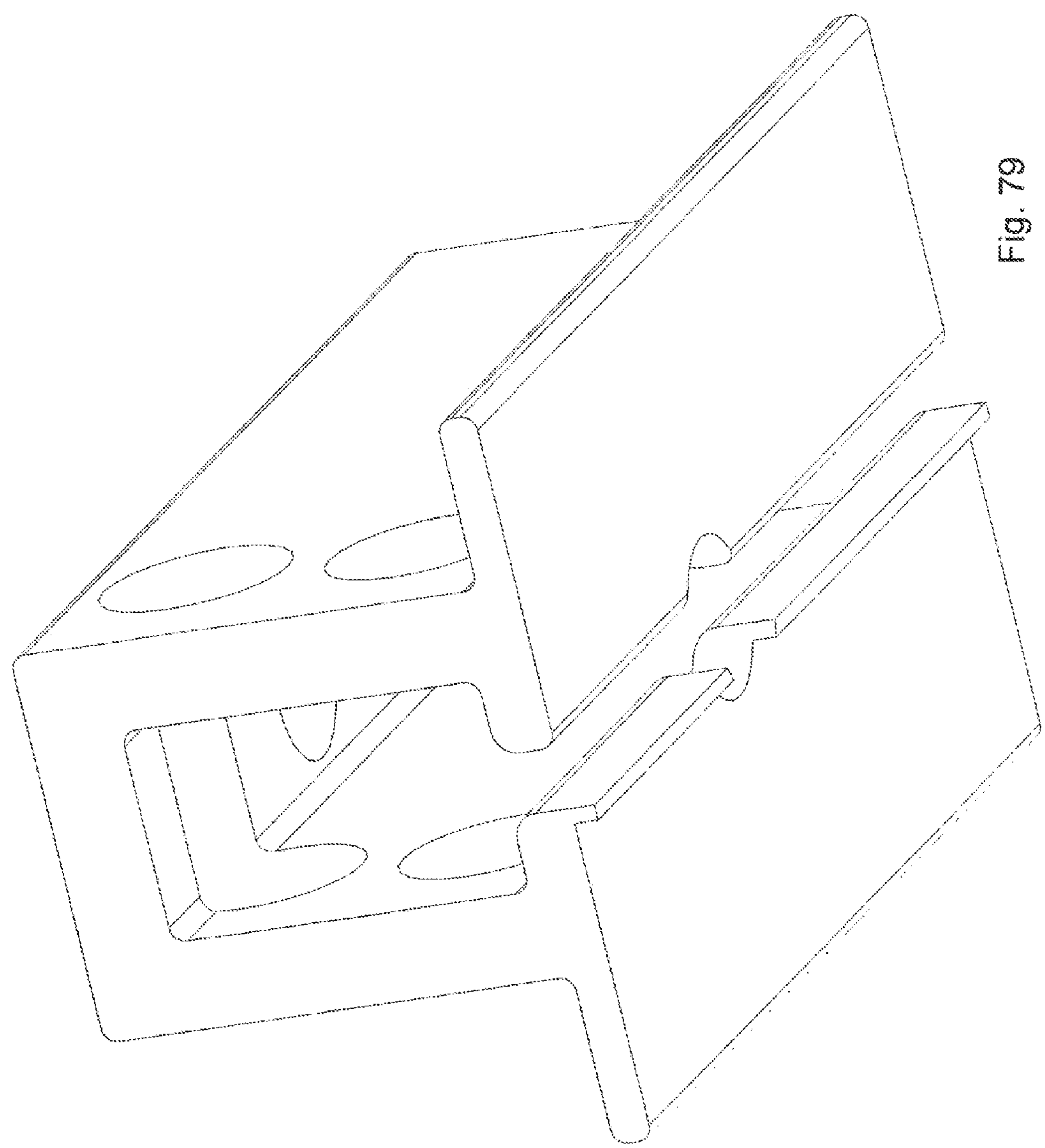

FIGS. 73 and 74 illustrate a snow fence according to some embodiments of the present invention. The snow fence includes a bracket (also shown in FIG. 73) and a mid-panel support (similar to the mid-panel support shown in FIG. 71). Pipes are supported by the bracket and the mid-panel support. The bracket and/or mid-panel support can be utilized with any of the embodiments illustrated and described herein.

FIGS. 75-79 illustrate various end clamps according to some embodiments of the present invention. The end clamps can be utilized at the outer edges of the solar panel array at first and second ends of the pipes. If desired, the end clamps can be utilized in the middle of a run of solar panels if the snow fence does not extend across an entire length of the solar panel array. The end clamps offer support to the pipes and can be coupled to the solar panels in a similar manner as the brackets of the present invention.

Any of the brackets illustrated herein can be interchanged with any of the coupling devices or portions illustrated herein to create a snow fence in accordance with the present invention. The illustrated combinations are given by way of example only.

What is claimed is:

1. A roof mount apparatus for mounting on a roof surface, the roof mount apparatus comprising:

a first solar panel having a first frame secured to the roof surface, the first solar panel having a top surface;

a second solar panel having a second frame secured to the roof surface, the second solar panel spaced from the first solar panel and defining a slot between the first frame and the second frame; and a snow fence secured to the first frame and the second frame, the snow fence including a bracket positioned adjacent to a top of the first frame and a top of the second frame, the bracket protruding from the first frame and the second frame to inhibit sliding of snow along at least one of the first solar panel and the second solar panel, the bracket defining at least one aperture, a coupling device including an elongated portion positioned in the slot and extending substantially perpendicular to the roof surface and a wide portion positioned within a channel to couple the bracket to the first frame and the second frame, and at least one pipe extending through the at least one aperture of the bracket, the at least one pipe extending substantially parallel to the top surface of the first solar panel.

2. The roof mount apparatus of claim 1, wherein the channel is defined by the bracket.

3. The roof mount apparatus of claim 1, wherein the snow fence further includes a flange and wherein the coupling device further includes a fastener extending through the bracket and engaging the flange.

4. The roof mount apparatus of claim 3, wherein the fastener is moveable relative to bracket to change a distance between the bracket and the flange, such that the first frame and the second frame can be clamped between the bracket and the flange to position the snow fence adjacent to the first solar panel and the second solar panel.

5. The roof mount apparatus of claim 1, wherein the wide portion includes a first wide portion and the coupling device further comprises a second wide portion spaced from the first wide portion, the second wide portion engaging a bottom of the first frame and a bottom of the second frame.

6. The roof mount apparatus of claim 1, further comprising a third solar panel, wherein the bracket is a first bracket and the coupling device is a first coupling device, the snow fence further comprising a second bracket, a second coupling device and at least one pipe, wherein the second bracket and the second coupling device are secured to the second solar panel and the third solar panel, and wherein the at least one pipe extends between the first bracket and the second bracket to retain snow on at least one of the first solar panel, the second solar panel and the third solar panel.

7. A roof mount apparatus for mounting on a roof surface, the roof mount apparatus comprising:

a first solar panel having a first frame secured to the roof surface, the first solar panel having a top surface;

a second solar panel having a second frame secured to the roof surface, the second solar panel spaced from the first solar panel and defining a slot between the first frame and the second frame; and a snow fence secured to the first frame and the second frame, the snow fence including a bracket positioned adjacent to a top of the first frame and a top of the second frame, the bracket protruding from the first frame and the second frame to inhibit sliding of snow along at least one of the first solar panel and the second solar panel, the bracket including at least one aperture, a coupling device including an elongated portion positioned in the slot and extending substantially perpendicular to the roof surface and a flange secured to the elongated portion, the flange engaging the first frame at a location spaced from the top of the first frame and the second frame at a location spaced from the top of the second frame to secure the bracket to the first frame and the second frame, and at least one pipe extending through the at least one aperture of the bracket, the at least one pipe extending substantially parallel to the top surface of the first solar panel.

8. The roof mount apparatus of claim 7, wherein the flange engages a bottom of the first frame and a bottom of the second frame.

9. The roof mount apparatus of claim 7, wherein the elongated portion is a fastener and wherein the flange is threaded to move along a correspondingly threaded portion of the fastener.

10. The roof mount apparatus of claim 9, wherein the fastener facilitates adjustment of a distance between the bracket and the flange, to clamp the first frame and the second frame between the bracket and the flange to secure the snow fence to the first frame of the first solar panel and the second frame of the second solar panel.

11. The roof mount apparatus of claim 7, further comprising a third solar panel, wherein the bracket is a first bracket and the coupling device is a first coupling device, the snow fence further comprising a second bracket, a second coupling device and at least one pipe, wherein the second bracket and the second coupling device are secured to the second solar panel and the third solar panel, and wherein the at least one pipe extends between the first bracket and the second bracket to retain snow on at least one of the first solar panel, the second solar panel and the third solar panel.

12. A roof mount apparatus for mounting on a roof surface, the roof mount apparatus comprising:

a first solar panel having a first frame secured to the roof surface, the first solar panel defining a first top surface, a first bottom surface and a first side surface;

a second solar panel having a second frame secured to the roof surface, the second solar panel defining a second top surface, a second bottom surface and a second side surface, the second solar panel spaced from the first solar panel and defining a slot between the first side surface and the second side surface; and a snow fence secured to the first frame and the second frame, the snow fence including a bracket positioned adjacent to the first top surface and the second top surface, the bracket protruding from the first frame and the second frame to inhibit sliding of snow along at least one of the first solar panel and the second solar panel, the bracket including at least one aperture, a coupling device including an elongated portion positioned in the slot and a flange securable to the elongated portion, the elongated portion extending substantially perpendicular to the roof surface and substantially parallel to the first side surface and the second side surface, and at least one pipe extending through the at least one aperture in a direction substantially parallel to the first top surface.

13. The roof mount apparatus of claim 12, wherein the flange is rotatable with respect to the elongated portion to secure the bracket to the first solar panel and the second solar panel.

14. The roof mount apparatus of claim 13, wherein the elongated portion defines an axis extending along the length of the elongated portion, and wherein the flange is rotatable with respect to the elongated portion about the axis.

15. The roof mount apparatus of claim 12, wherein the flange engages the first bottom surface and the second bottom surface.

16. The roof mount apparatus of claim 12, wherein the elongated portion defines a first axis extending along the length of the elongated portion, wherein the flange is rotatable about a second axis, and wherein the second axis is perpendicular to the first axis.

17. The roof mount apparatus of claim 12, wherein the elongated portion permits adjustment of a distance between the bracket and the flange, such that the first frame and the second frame can be clamped between the bracket and the flange to secure the snow fence to the first solar panel and the second solar panel.

18. The roof mount apparatus of claim 12, further comprising a third solar panel, wherein the bracket is a first bracket and the coupling device is a first coupling device, the snow fence further comprising a second bracket, a second coupling device and at least one pipe, wherein the second bracket and the second coupling device are secured to the second solar panel and the third solar panel, and wherein the at least one pipe extends between the first bracket and the second bracket to retain snow on at least one of the first solar panel, the second solar panel and the third solar panel.

* * * * *